US008267523B2

(12) United States Patent
Kondo et al.

(10) Patent No.: US 8,267,523 B2
(45) Date of Patent: Sep. 18, 2012

(54) IMAGE PROJECTING SYSTEM, METHOD, COMPUTER PROGRAM AND RECORDING MEDIUM

(75) Inventors: Tetsujiro Kondo, Tokyo (JP); Hitoshi Mukai, Kanagawa (JP); Masanori Iwasaki, Kanagawa (JP); Kenji Tanaka, Kanagawa (JP); Tetsushi Kokubo, Kanagawa (JP); Hirofumi Hibi, Kanagawa (JP); Kazumasa Tanaka, Chiba (JP); Hiroyuki Morisaki, Tokyo (JP)

(73) Assignee: Sony Corporation (JP)

( * ) Notice: Subject to any disclaimer, the term of this patent is extended or adjusted under 35 U.S.C. 154(b) by 330 days.

(21) Appl. No.: 12/380,167

(22) Filed: Feb. 24, 2009

(65) Prior Publication Data
US 2009/0213337 A1 Aug. 27, 2009

(30) Foreign Application Priority Data
Feb. 26, 2008 (JP) ................ P2008-045215

(51) Int. Cl.
*G03B 21/00* (2006.01)
(52) U.S. Cl. ....................................... 353/31
(58) Field of Classification Search ............. 353/6, 7, 353/10, 30, 31, 69, 94; 345/1.3, 6, 32, 204, 345/626, 629; 348/744, 745; 359/462, 676; 382/274, 284
See application file for complete search history.

(56) References Cited

U.S. PATENT DOCUMENTS

| | | | | |
|---|---|---|---|---|
| 3,650,614 A | * | 3/1972 | Shimoda et al. | 353/72 |
| 4,734,756 A | * | 3/1988 | Butterfield et al. | 348/43 |
| 6,525,772 B2 | * | 2/2003 | Johnson et al. | 348/383 |
| 7,088,353 B2 | * | 8/2006 | Fujii et al. | 345/204 |
| 2005/0195373 A1 | * | 9/2005 | Feigel et al. | 353/94 |
| 2006/0033890 A1 | * | 2/2006 | Hasegawa | 353/94 |

FOREIGN PATENT DOCUMENTS

| | | |
|---|---|---|
| JP | 2006-109168 | 4/2006 |
| JP | 2007-251294 | 9/2007 |

* cited by examiner

*Primary Examiner* — Georgia Y Epps
*Assistant Examiner* — Renee Naphas
(74) *Attorney, Agent, or Firm* — Lerner, David, Littenberg, Krumholz & Mentlik, LLP

(57) ABSTRACT

A plurality of projector apparatuses project images based on inputted image signals onto a screen so that the images are displaced relative to one another by a predetermined amount and superimposed. The luminances of an image region composed of a plurality of projected images that have been projected onto the screen are observed. Luminance values of pixels that construct an image to be projected by each projector apparatus are adjusted based on an observation result and are supplied to the plurality of projector apparatuses. The image region composed of the plurality of projected images is presented by superimposing a first projected image and a second projected image that has a higher resolution than the first projected image. Predetermined pixels in the image region are presented by superimposing corresponding pixels in the projected images from n adjacent projector apparatuses.

10 Claims, 44 Drawing Sheets

FIG. 19
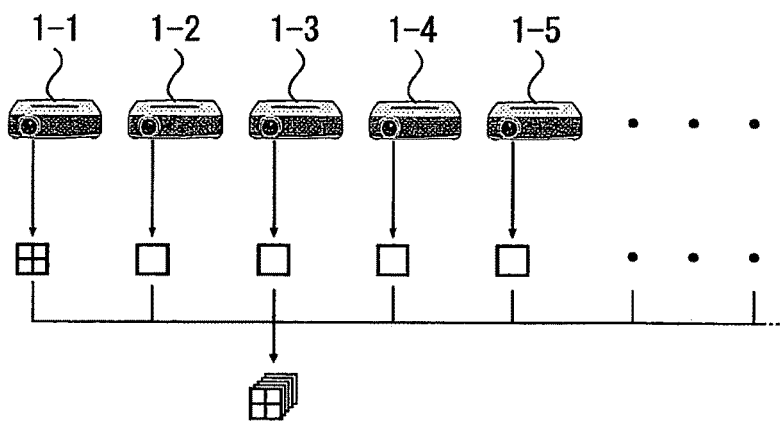
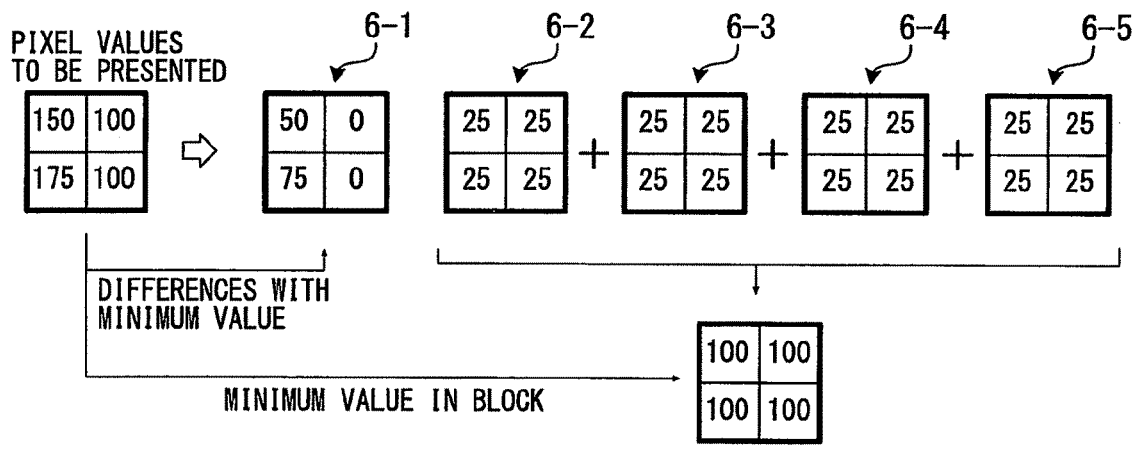

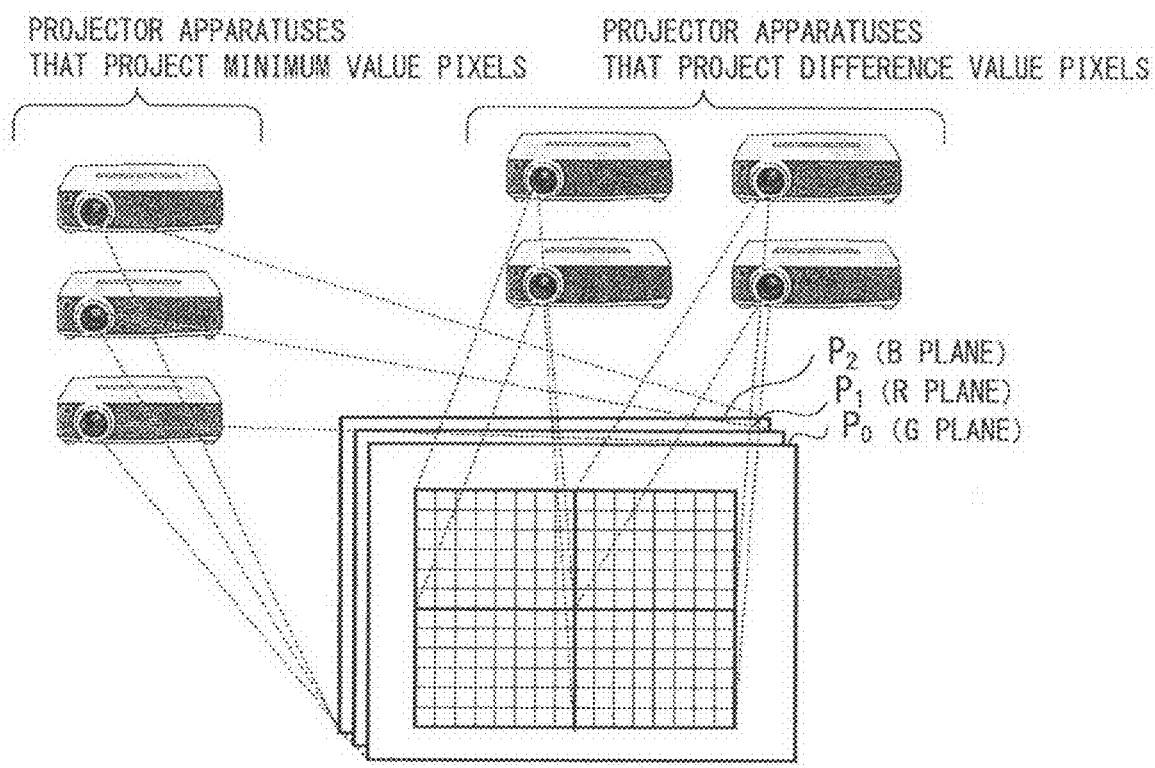

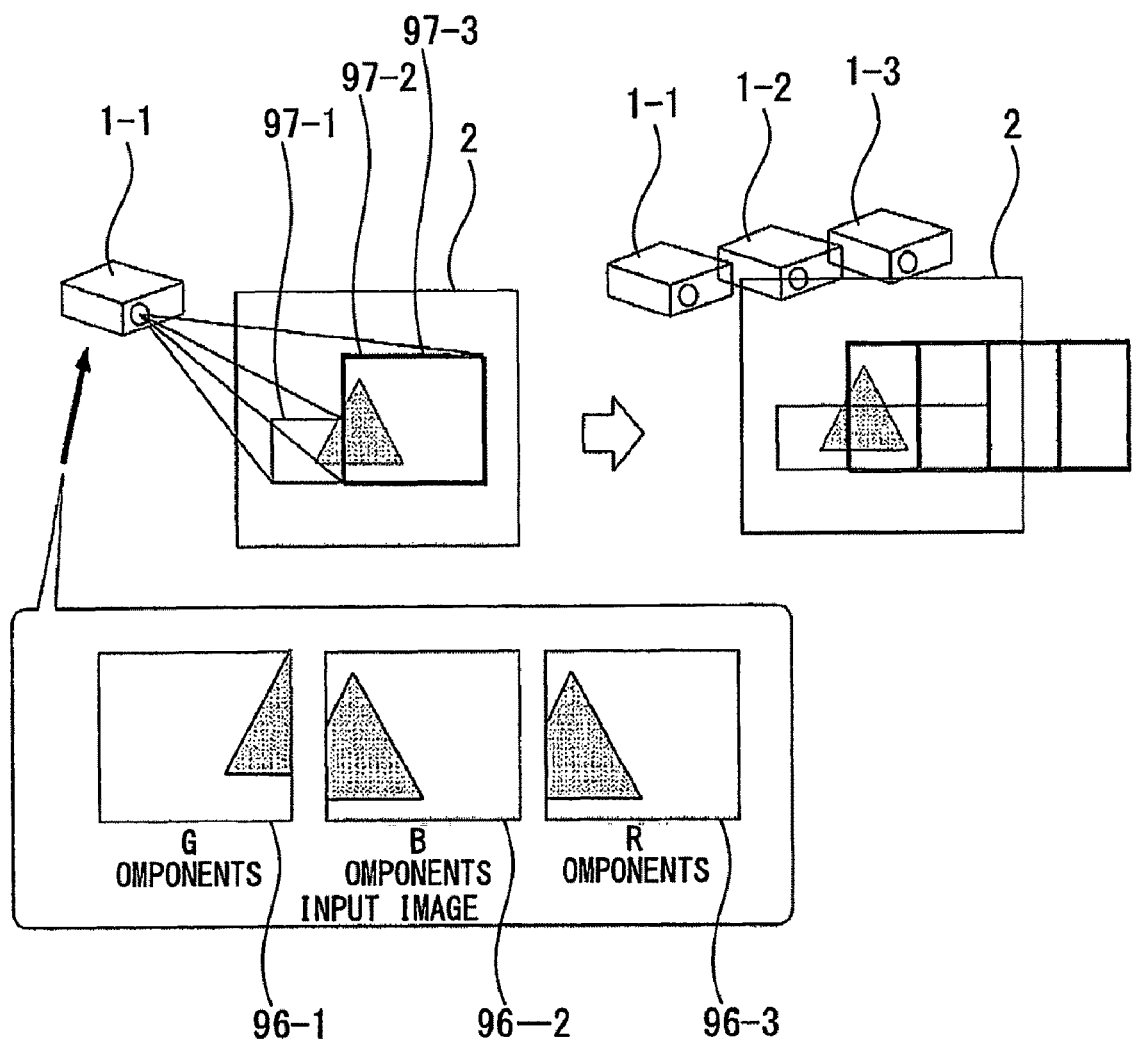

FIG. 44B 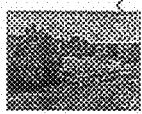 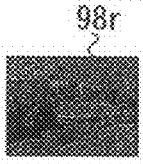 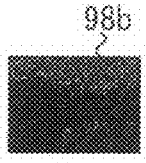

FIG. 44D 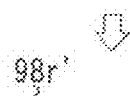 
FIG. 44E 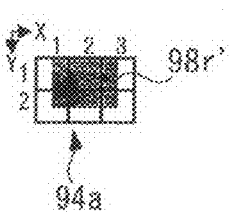 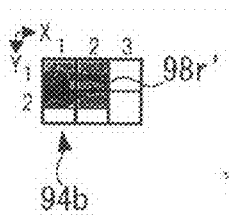 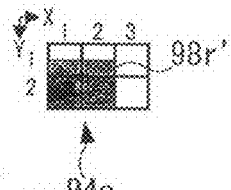 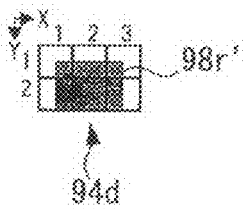

IMAGE PROJECTING SYSTEM, METHOD, COMPUTER PROGRAM AND RECORDING MEDIUM

CROSS REFERENCES TO RELATED APPLICATIONS

The present application claims priority from Japanese Patent Application No. JP 2008-045215, filed with the Japanese Patent Office on Feb. 26, 2008, the entire content of which is incorporated herein by reference.

BACKGROUND OF THE INVENTION

1. Field of the Invention

The present invention relates to an image projecting system and an image projecting method that are favorably applied to projecting images onto a screen using a plurality of projector apparatuses, a computer program applied to a processing method thereof, and to a recording medium that stores such computer program.

2. Description of the Related Art

In the past, to realize a large-screen display that has high resolution, a method of projecting a large image by arranging a plurality of projector apparatuses in a grid has been proposed.

FIG. 1 shows an example construction of an existing image projecting system 100 constructed of a plurality of projector apparatuses. The image projecting system 100 includes N projector apparatuses, a screen 102 as a display screen for projected images, an observation unit 104 that observes the images projected onto the screen 102, and a control apparatus 105 that receives information observed by the observation unit 104 and supplies image signals to the projector apparatuses. However, in FIG. 1 only the projector apparatuses 101-1 to 101-4, 101-11 to 101-14, and 101-21 to 101-24 are shown. Each projector apparatus projects an image onto the screen 102 and by joining the images projected by the respective projector apparatuses, a single image is constructed as a whole. In this way, one large image is formed on the entire screen 102. Note that in the following description, the image projected onto the screen 102 by one projector apparatus is referred to as a "projected image". In FIG. 1, the projected image projected onto the screen 102 by the projector apparatus 101-12 is set as the "projected image 103-12".

FIG. 2 is composed of three views of the image projecting system 100 that are a front view, a side view, and an upper view. The projected image 103-12 is highlighted for comparison with the projected images produced by the other projector apparatuses. In the past, when an image is projected onto the screen 102 using a plurality of projector apparatuses, parts (i.e., edge portions) of adjacent projected images overlap.

However, when an image is projected using the image projecting system 100, the "joins" of the adjacent projected images are conspicuous. For this reason, before an image is presented, preprocessing (calibration) is normally carried out to prevent the joins of adjacent projected images from being conspicuous.

The following two methods are known as representative types of preprocessing (calibration).

(1) Geometric Correction

It is difficult to accurately lay out the projector apparatuses so that a plurality of projected images projected by adjacent projector apparatuses join up. For this reason, geometric conversion is carried out in advance on the image to be presented so that the plurality of projected images join up. FIGS. 3A and 3B are diagrams showing projected images when the screen 102 is set as an xy plane. In FIGS. 3A and 3B, the projected image 103-11 of the projector apparatus 101-1 and the projected image 103-12 of the projector apparatus 101-2 are extracted from the plurality of projected images. Here, it is assumed that grid patterns are displayed in the projected images 103-11, 103-12. The projector apparatuses 101-1, 101-2 are slightly displaced in the horizontal direction due to the positions in which the apparatuses have been set up.

FIG. 3A shows an example display of the projected images before geometric correction.

Before geometric correction, the grids of the projected images 103-11, 103-12 are displayed in a displaced state. For this reason, the horizontal lines and vertical lines in the images become crooked, which is not favorable.

FIG. 3B shows an example display of the projected images after geometric correction.

After geometric correction, the grids of the projected images 103-11, 103-12 are displayed on top of one another. The horizontal lines and vertical lines in the images are displayed without being crooked.

In this way, by carrying out geometric correction on the images to be projected by the respective projector apparatuses, an image can be displayed on the entire screen 102 without displacements.

(2) Luminance/Color Correction

Even for projector apparatuses of the same model, due to fluctuations in the characteristics of the internal optical elements, the projector lamps, and the like, there can be differences between individual apparatuses in the intensity of the outputted light and the intensity balance of the RGB colors. Also, in regions where the projected images projected by adjacent projector apparatuses are superimposed, since the intensities of light from two projector apparatuses are added, such regions will become extremely bright compared to the periphery thereof.

FIG. 4 is a photograph showing one example of the fluctuations in luminance and color between the projected images projected using the image projecting system 100. In a state where the projector apparatuses are disposed in a tile pattern and the same input (white light, where (R,G,B)=(255,255,255)) is used for the respective projector apparatuses, a part of the image projected on the screen is picked up by the observation unit. Each rectangular region in FIG. 4 corresponds to one projector apparatus. Here, it can be seen that there are fluctuations in luminance and color between the adjacent projector apparatuses 103-12, 103-32. It can also be seen that there are differences in the luminance between projector apparatuses and differences in color even for the same white color. Also, it can be seen that there are fluctuations in luminance and color even within the projected image of the same projector apparatus.

For this reason, to even out the imbalances in luminance, luminance correction is carried out as shown in FIGS. 5A and 5B. FIGS. 5A and 5B are explanatory diagrams where the luminance L of the images projected onto the screen 102 from the projector apparatuses 101-11, 101-12 is shown on the vertical axis and the xy plane on the screen 102 is shown on the horizontal axis.

FIG. 5A shows examples of the luminance of projected images before luminance correction.

Before luminance correction, the luminances of the images projected from the projector apparatuses 101-11, 101-12 are shown by curved lines. Since the luminance increases at the position where adjacent projected images are superimposed, a bright line appears on the screen.

FIG. 5B shows examples of the luminance of projected images after luminance correction.

After luminance correction, the luminances of the images projected from the projector apparatuses 101-11, 101-12 are shown by straight lines. The projected images before luminance correction are shown by broken lines for comparison purposes. Since the increased luminance at a position where adjacent projected images are superimposed is substantially matched to a flattened luminance, a bright line does not appear on the screen.

Aside from the technologies described above, various other calibration technologies have been proposed.

Japanese Unexamined Patent Application publication No. 2006-109168 discloses a technology for displaying images projected from three projector apparatuses as one image on a screen.

Japanese Unexamined Patent Application Publication No. 2007-251294 discloses a technology that projects and superimposes a color correcting image to correct nonuniformity in a color distribution produced in images when a plurality of images are projected so as to be adjacent to one another.

SUMMARY OF THE INVENTION

However, the existing image projecting system 100 has the following problems.

Vulnerability to Differences Between Individual Projector Apparatuses

Regarding calibration that carries out correction of the luminance and color, most existing image projecting systems proposed thusfar carry out correction so as to make the characteristics of projector apparatuses out of a plurality of projector apparatuses match those of the projector apparatus with the worst characteristics (i.e., with the lowest luminance). This will now be described with reference to FIGS. 6A and 6B.

FIG. 6A shows examples of the luminances of images projected by the respective projector apparatuses before the characteristics are matched. In this example, the luminance of the image projected by the fifth projector apparatus is the worst.

FIG. 6B shows examples of the luminances of images projected by the respective projector apparatuses after the characteristics have been matched. The luminances before the characteristics are matched are shown by broken lines for comparison purposes.

Figure 1:
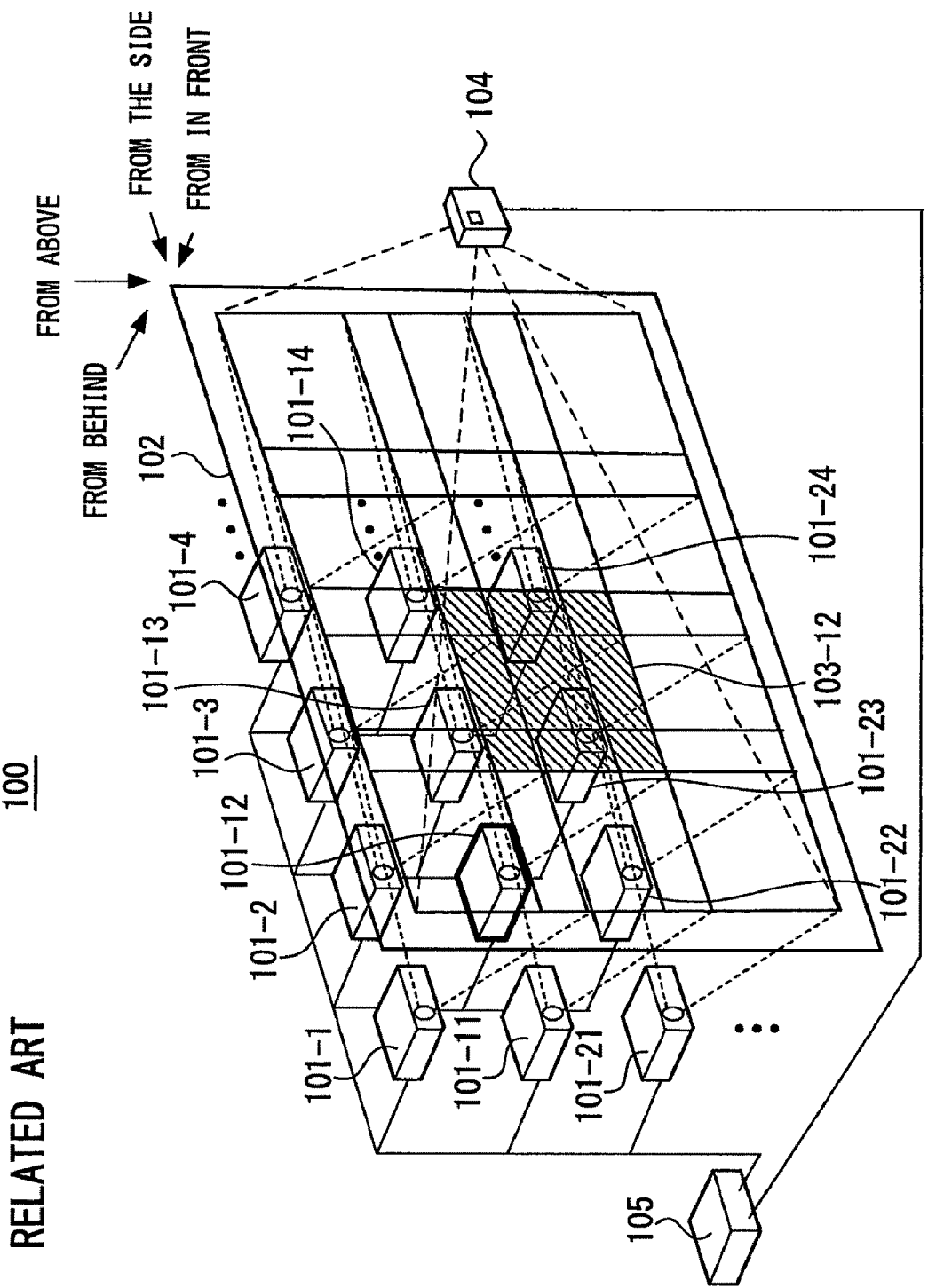

Here, it can be understood that since the luminances of the images projected by the first to fourth projector apparatuses and the sixth and seventh projector apparatuses are matched with the luminance of the image projected by the fifth projector apparatus, there is a fall in overall luminance.

That is, the performance of the image projecting system as a whole is influenced by the performance of individual projector apparatuses. This means that the luminance performance of the image projecting system is very dependent on differences between individual projector apparatuses and is susceptible to a fall in luminance.

(2) Vulnerability to Breakdown of Projector Apparatuses

In addition, in an existing image projecting system, if one projector apparatus breaks down and the projector lamp is extinguished while images are being projected, no image will be displayed on the region of the screen where such projector apparatus projected an image. This results in a part of the image projected on the screen becoming blank. Even if it only takes a short time to repair the broken projector apparatus, depending on the application to which the image projecting system is put (for example, monitoring images for security purposes), this can still causes a large drop in the quality of the image projecting system.

It is desirable to make the luminance of projected images uniform when images projected by a plurality of projector apparatuses are superimposed and presented on a screen.

According to an embodiment of the present invention, a plurality of projector apparatuses project images based on an inputted image signal onto a screen so that the images are displaced relative to one another by a predetermined amount and superimposed. The luminances of an image region composed of a plurality of projected images that have been projected onto the screen are observed. Luminance values of pixels that construct an image to be projected by each projector apparatus are adjusted based on an observation result and are supplied to the plurality of projector apparatuses. The image region composed of the plurality of projected images is presented by superimposing a first projected image and a second projected image that has a higher resolution than the first projected image. A predetermined pixel in the image region is presented by superimposing corresponding pixels in the projected images from n adjacent projector apparatuses.

In this way, since each pixel in the image projected onto the screen is presented by superimposing corresponding pixels in images projected by a plurality of projector apparatuses, it is possible to keep the luminance of the image projected on the entire screen uniform.

According to an embodiment of the present invention, since images projected onto a screen by a plurality of projector apparatuses are superimposed, the luminance of the image on the entire screen is made uniform. Also, even if one or more projector apparatuses breaks down and becomes unable to project an image, other projector apparatuses that are adjacent to the broken projector will continue projecting images, resulting in the effect that it is possible to prevent blanks from appearing in the image projected onto the screen.

DESCRIPTION OF THE RELATED ART

Figure 2:
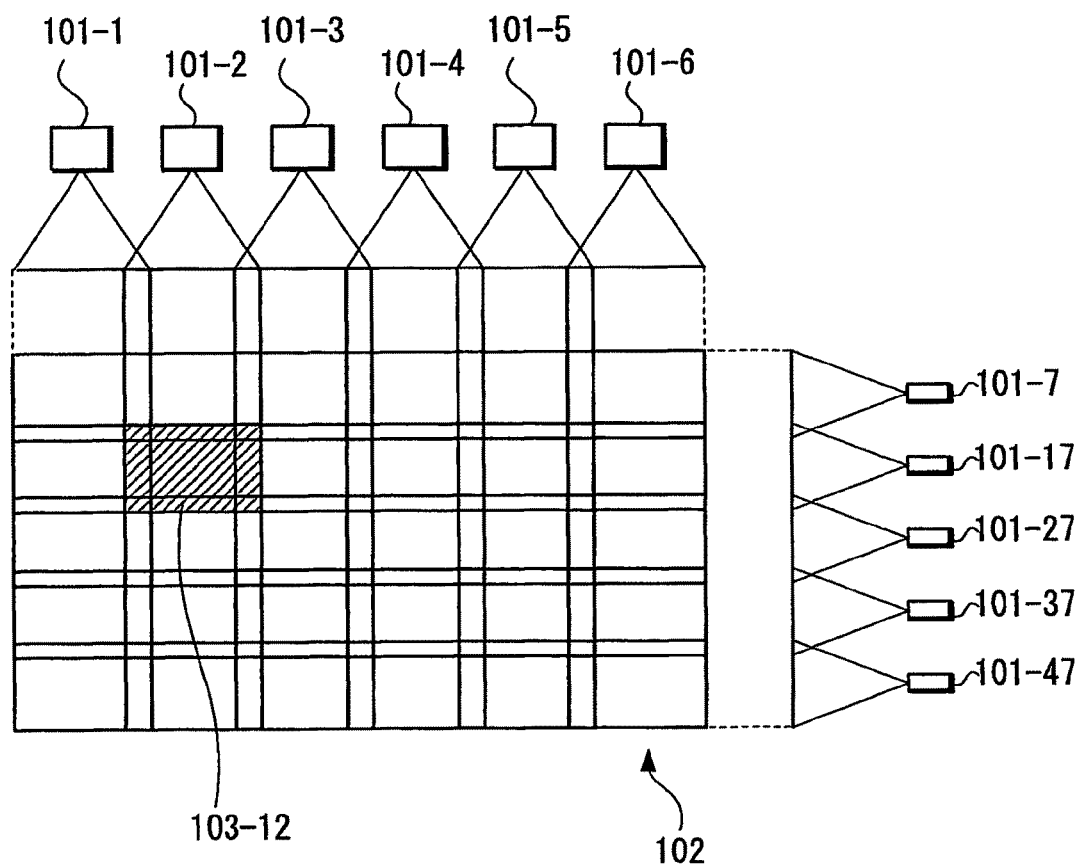
Figure 3A:
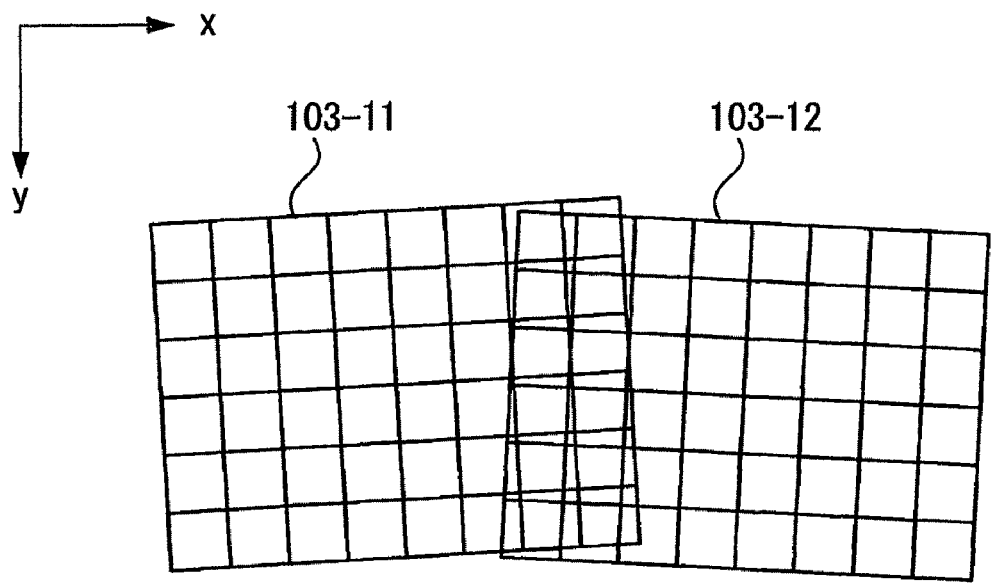
Figure 3B:
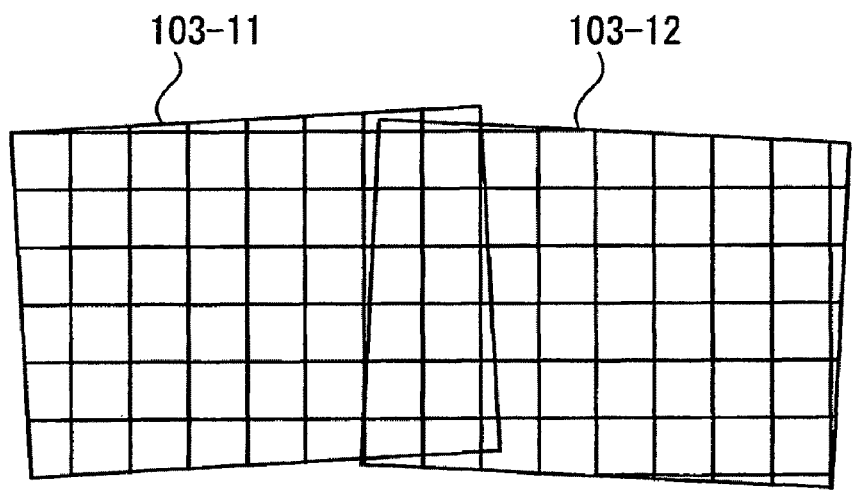
Figure 4:
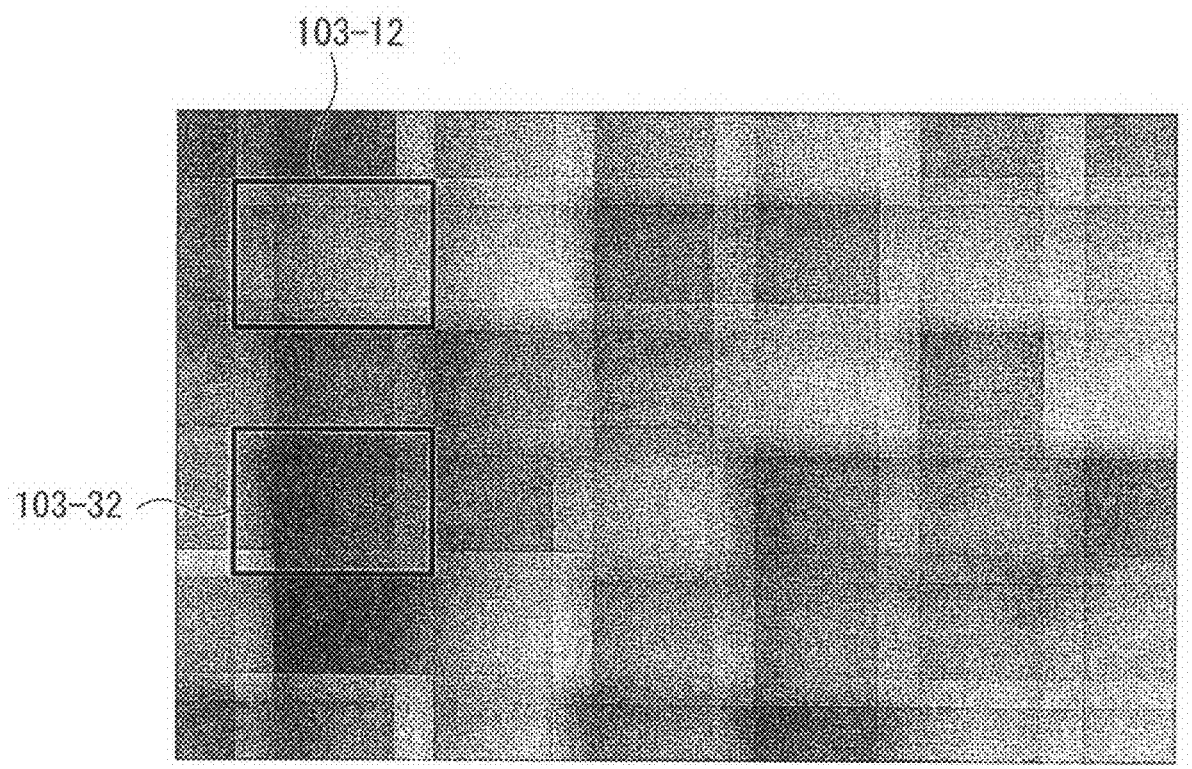
Figure 5A:
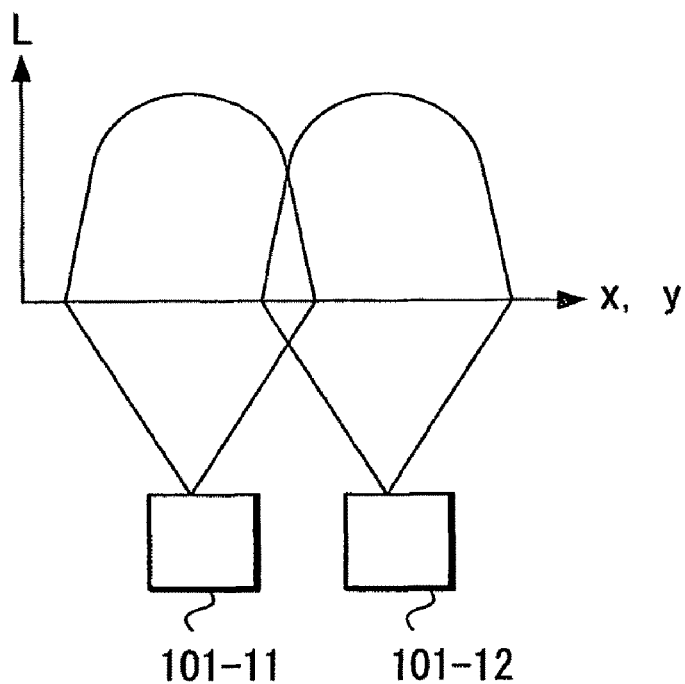
Figure 5B:
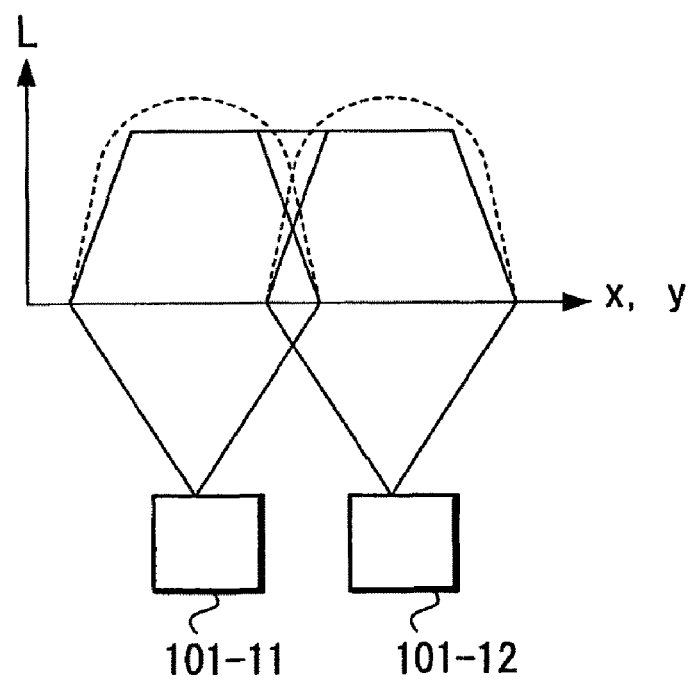
Figure 6A:
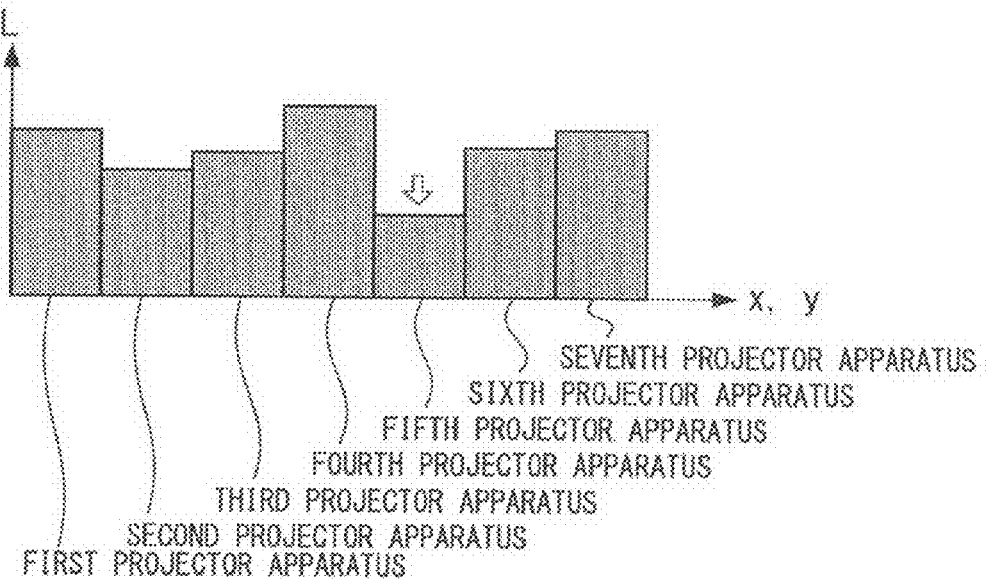
FIGS. 6A and 6B show examples of the luminances of images (white monochrome images) projected onto the screen by seven projector apparatuses (referred to as the first to seventh projector apparatuses).
Figure 6B:
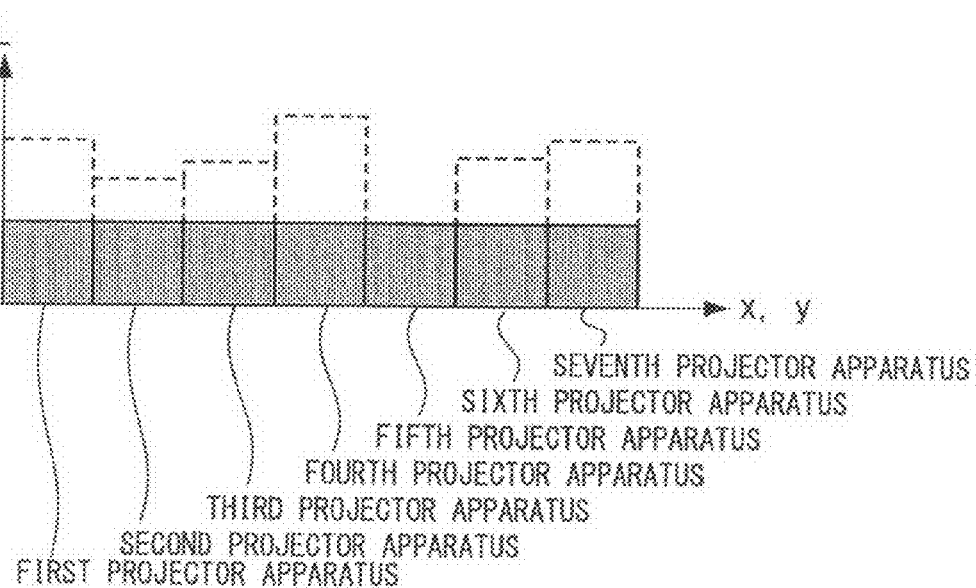
Figure 7:
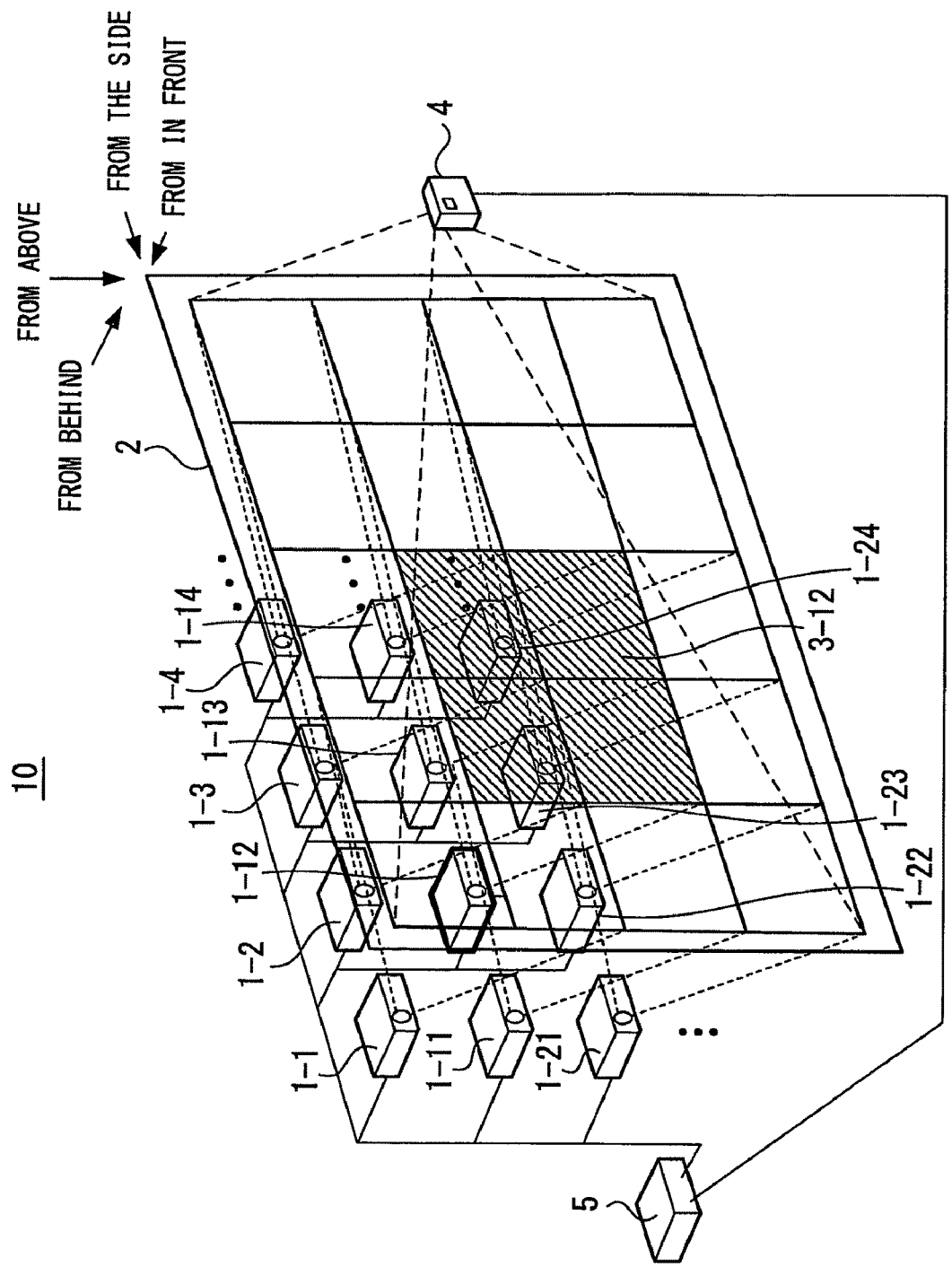
Figure 8A:
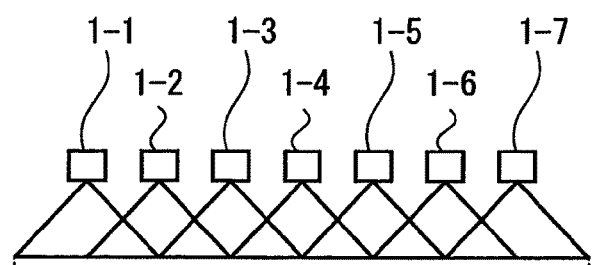
Figure 8B:
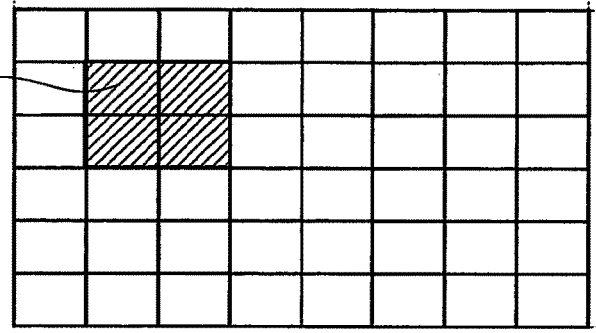
Figure 8C:
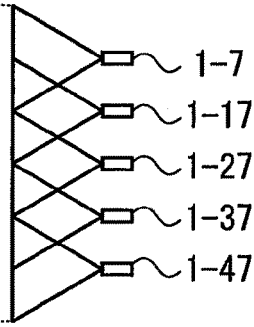
Figure 9A:
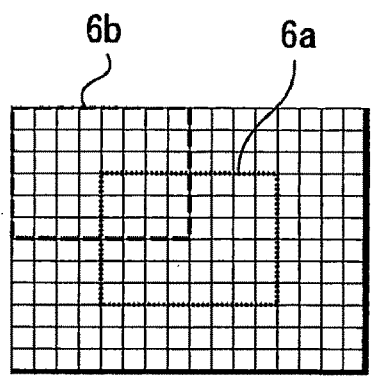
Figure 9B:
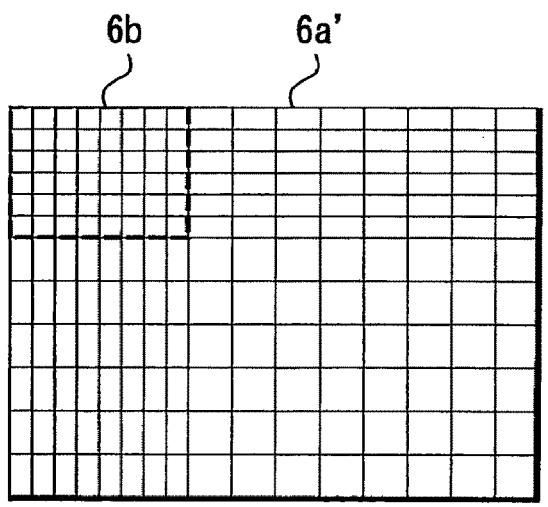
Figure 9C:
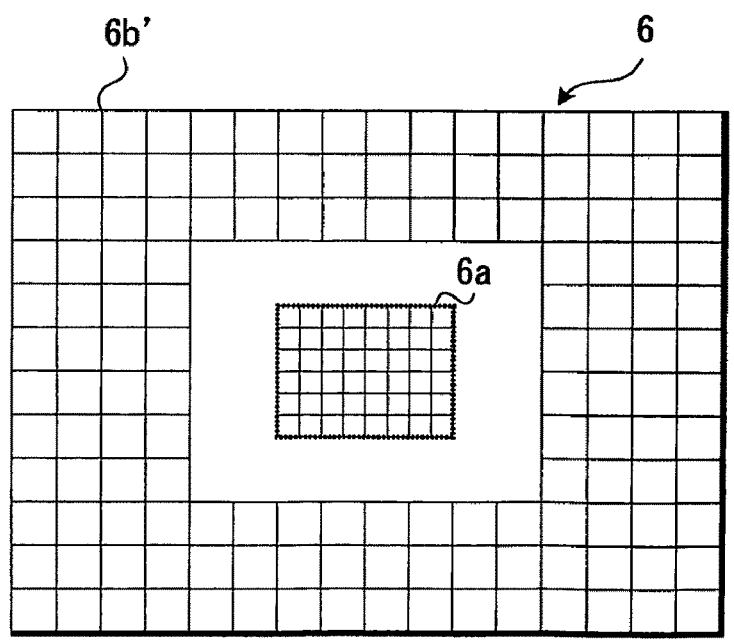
Figure 10A:
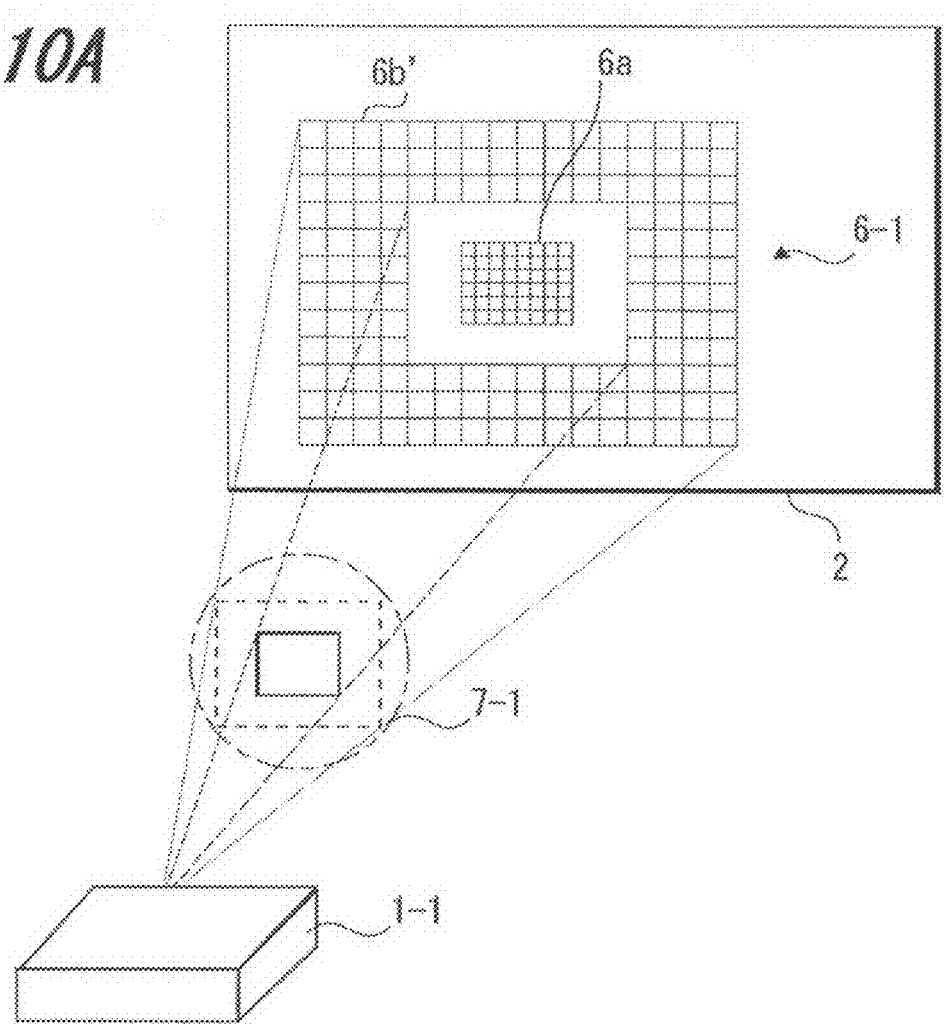
Figure 10B:
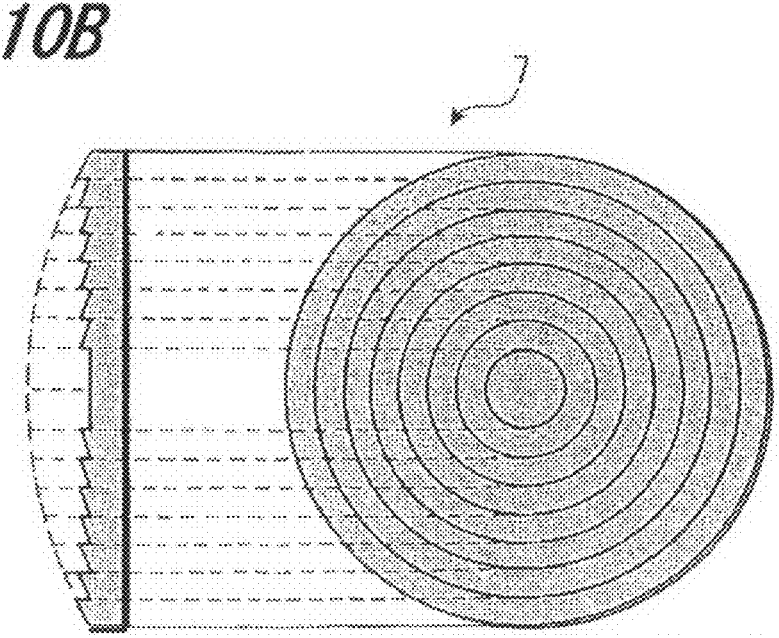
Figure 12:
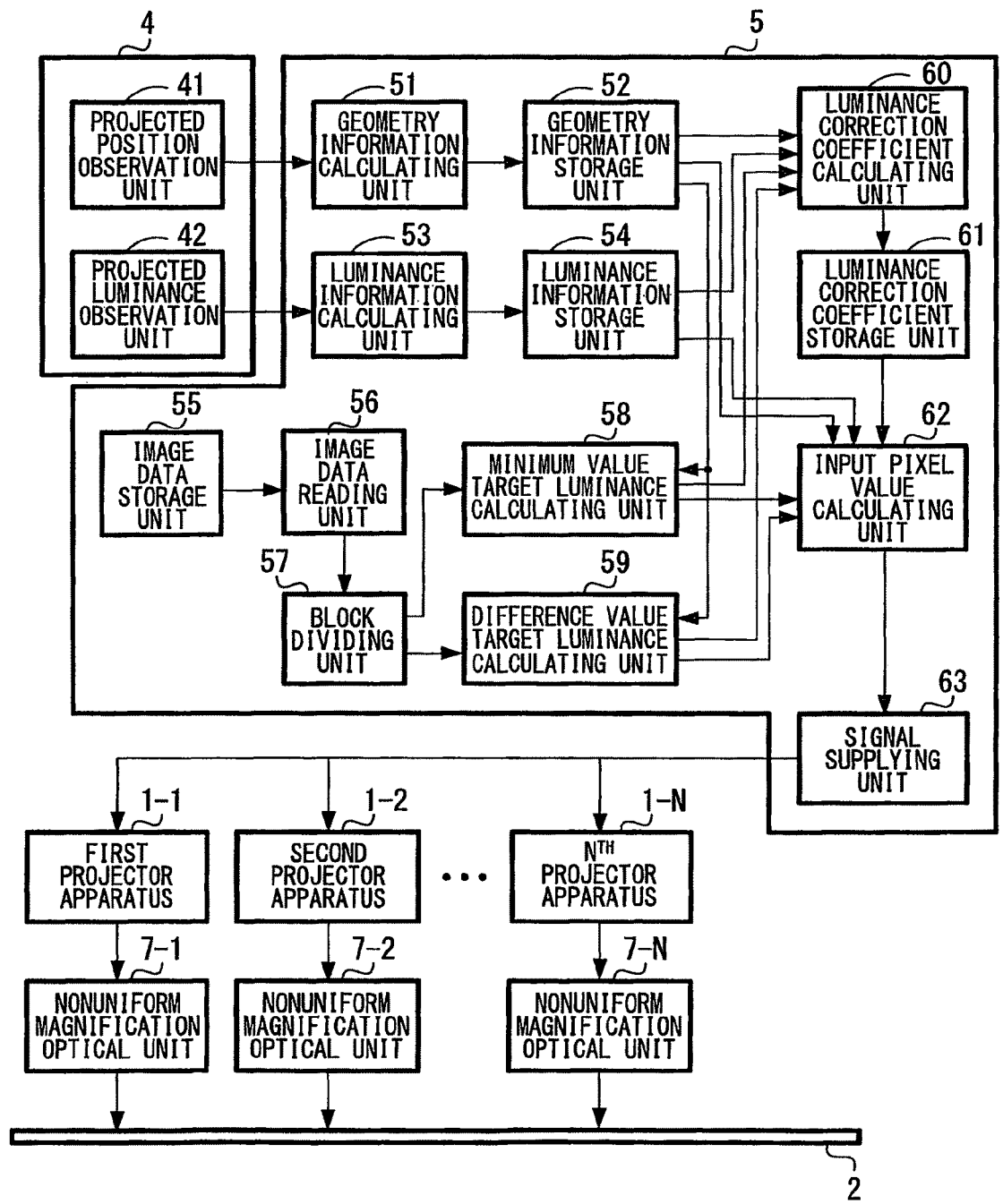
Figure 13:
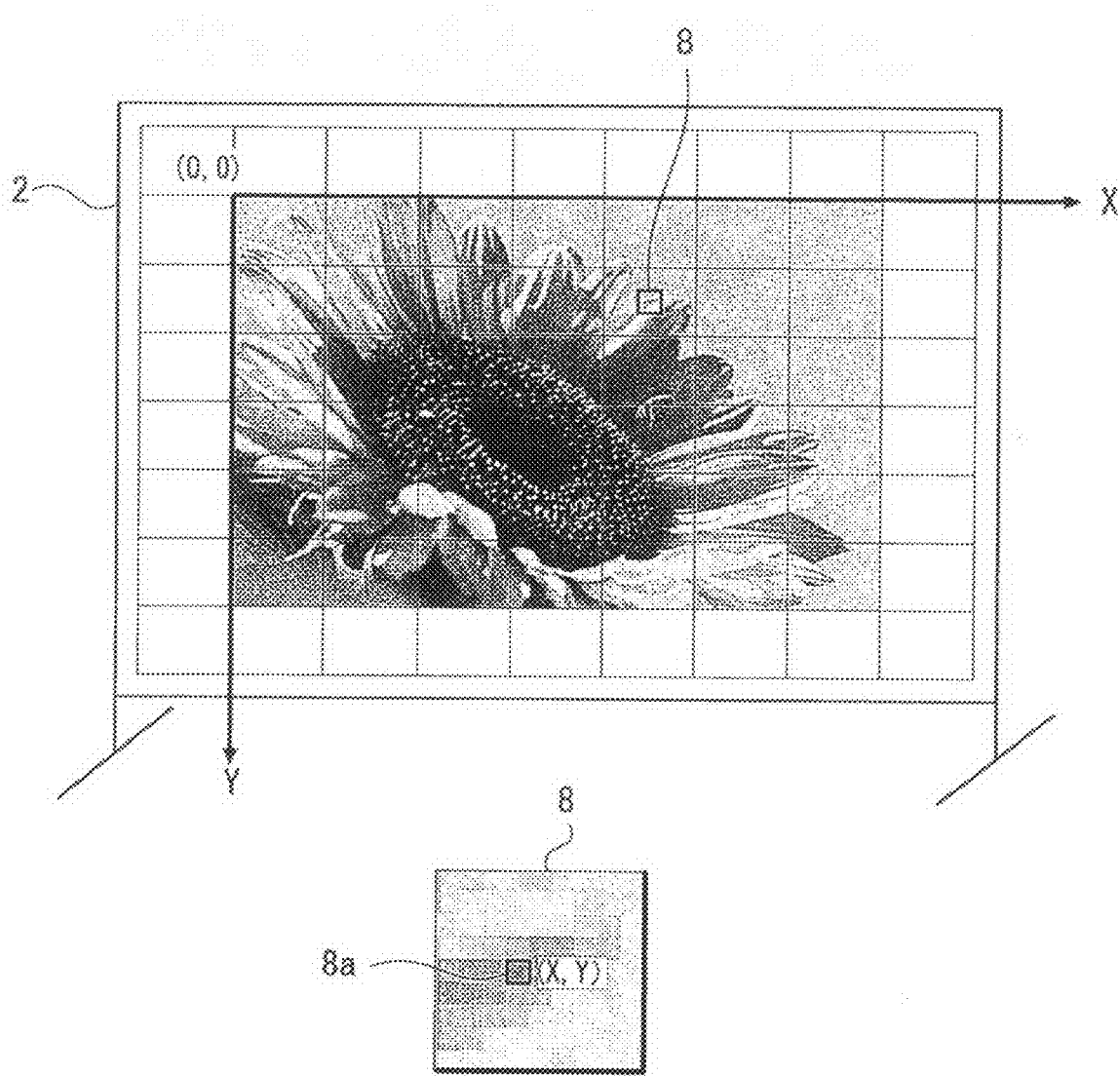
Figure 14:
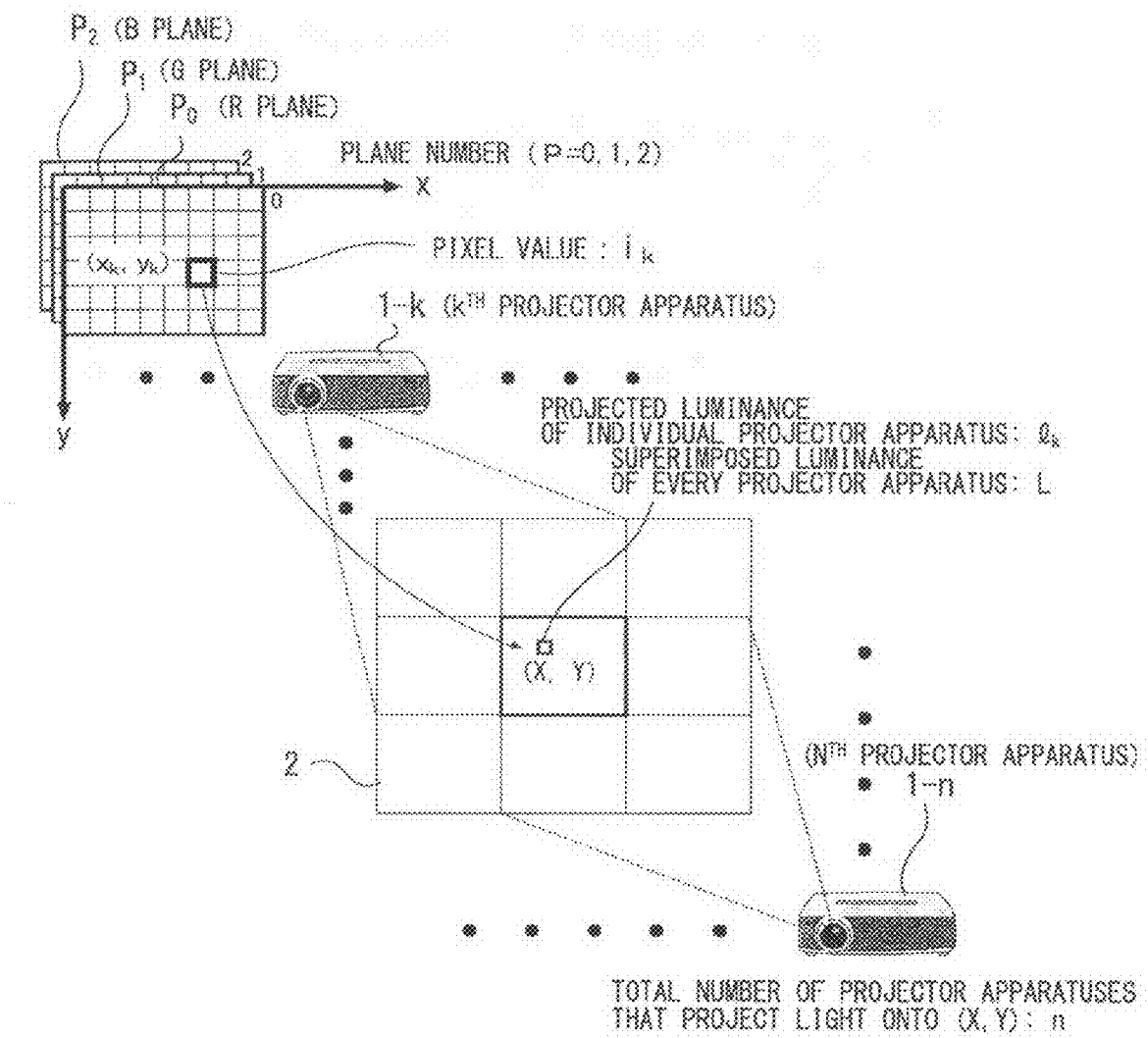
Figure 15A:
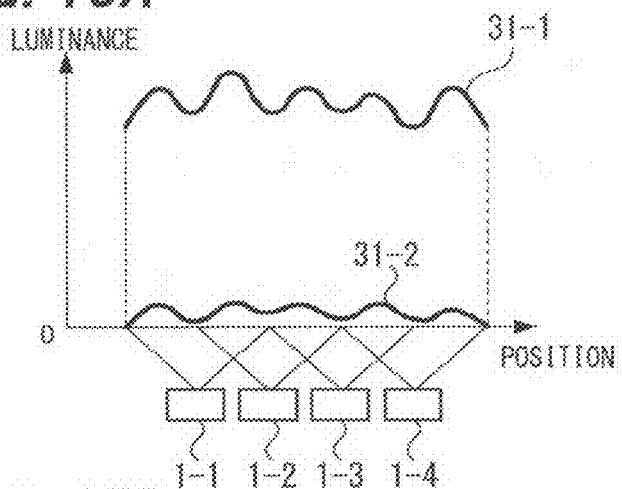
Figure 15B:
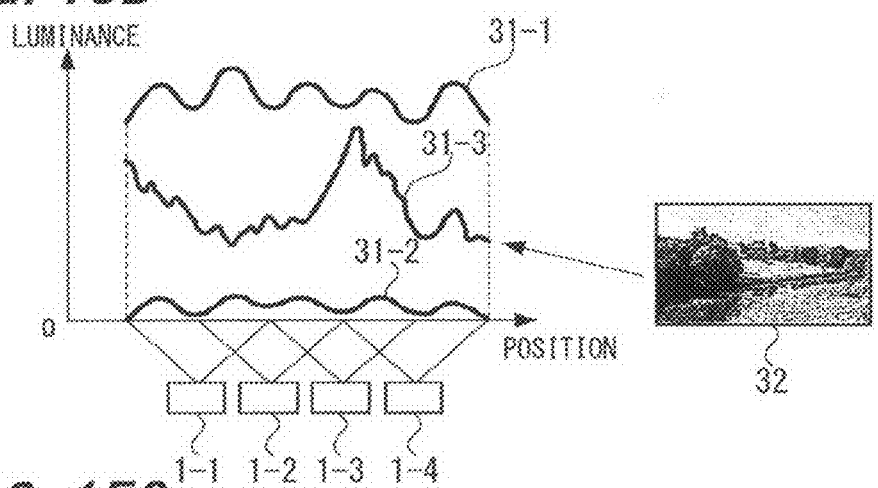
Figure 15C:
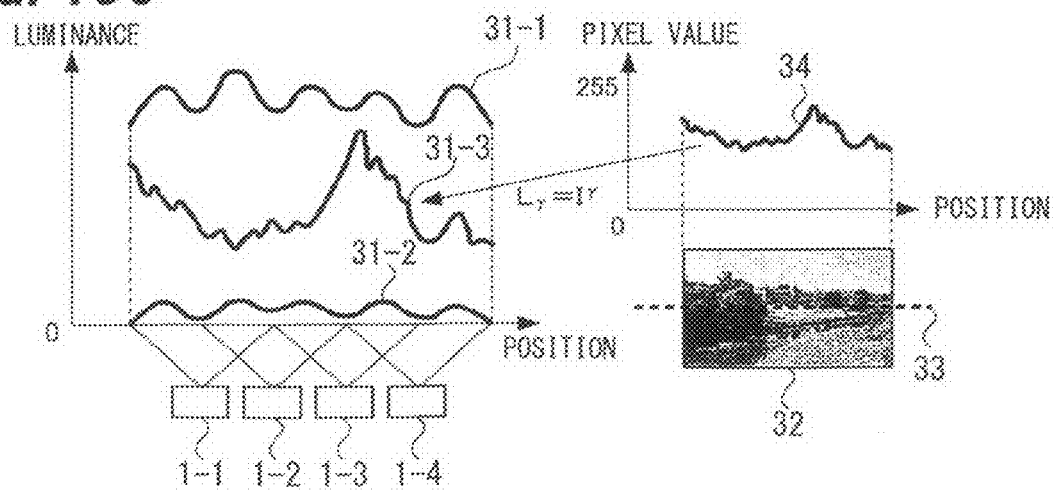
Figure 16:
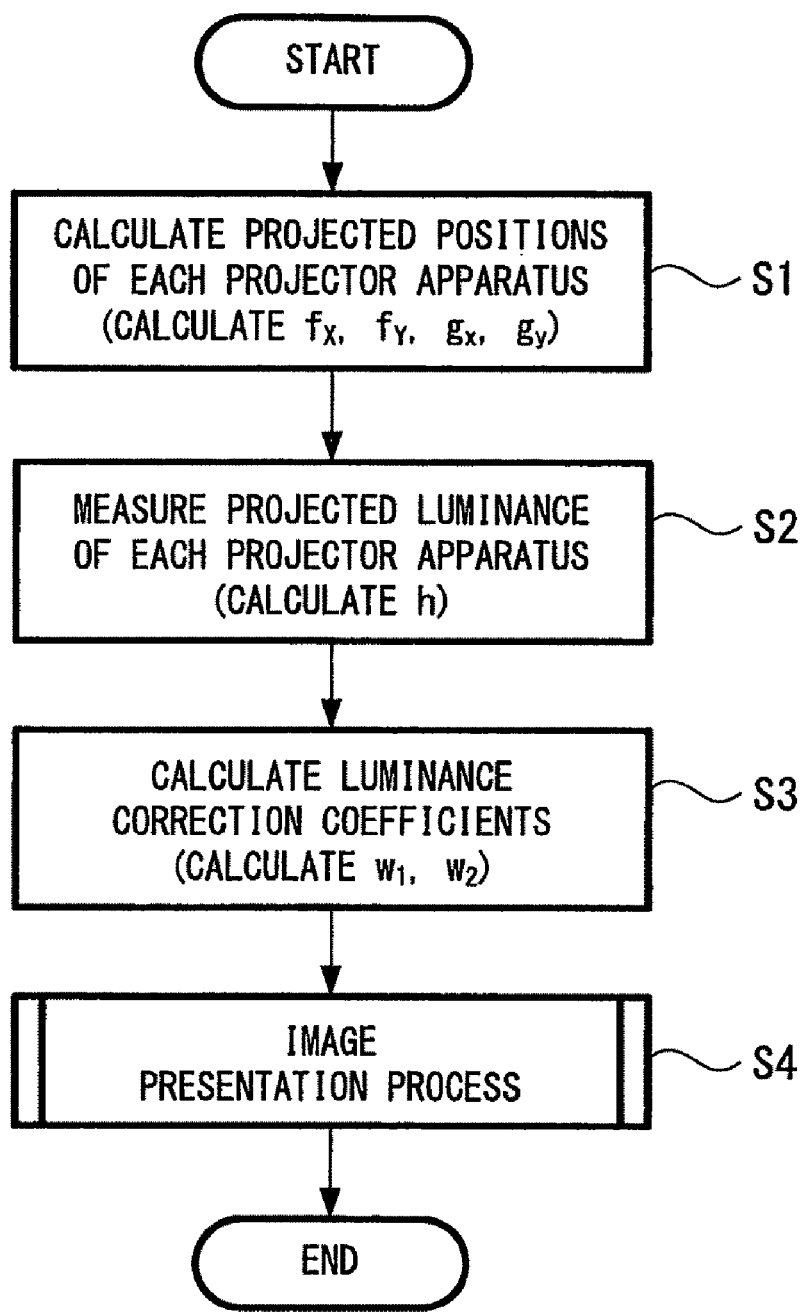
Figure 17:
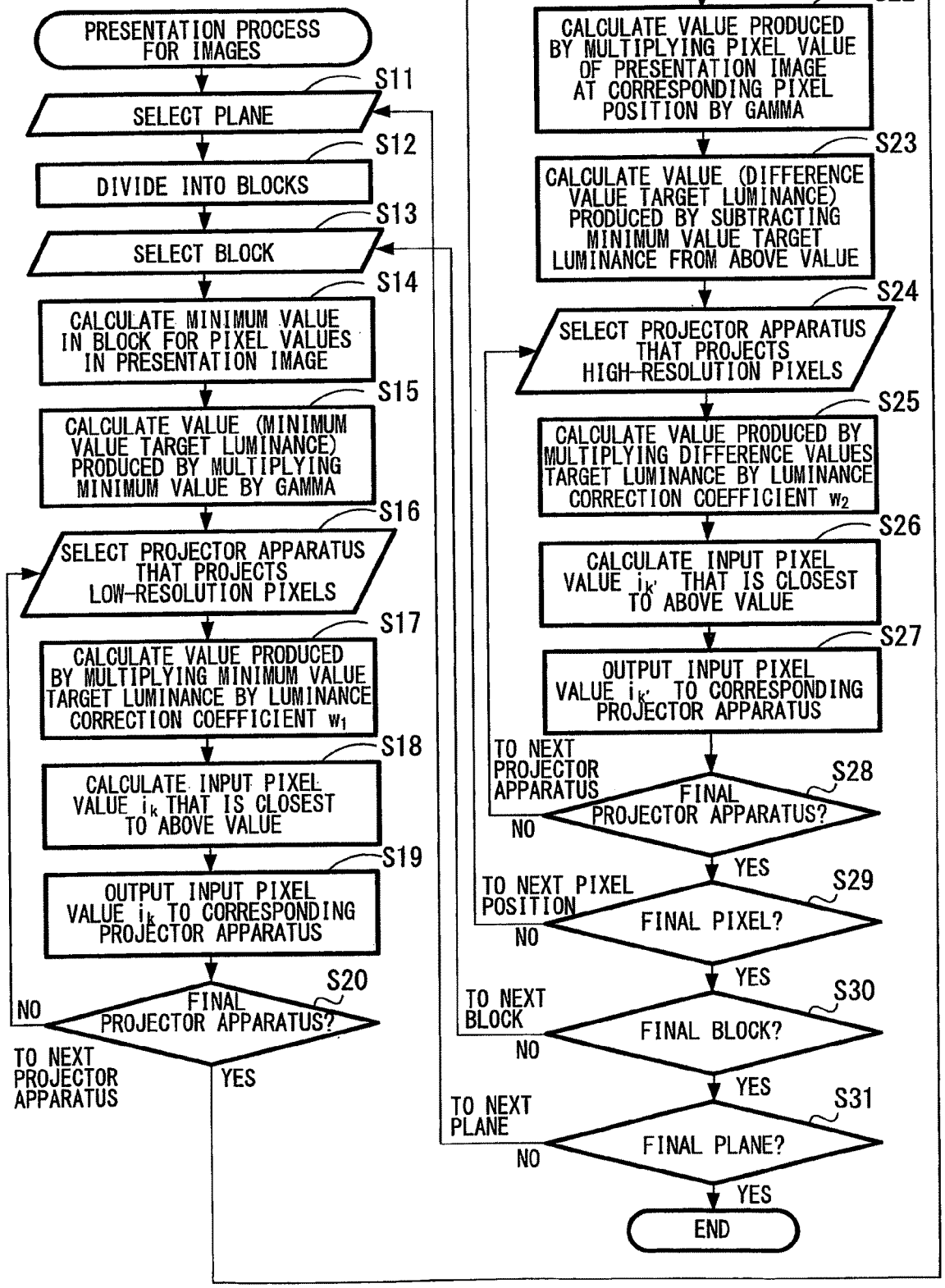
Figure 18:
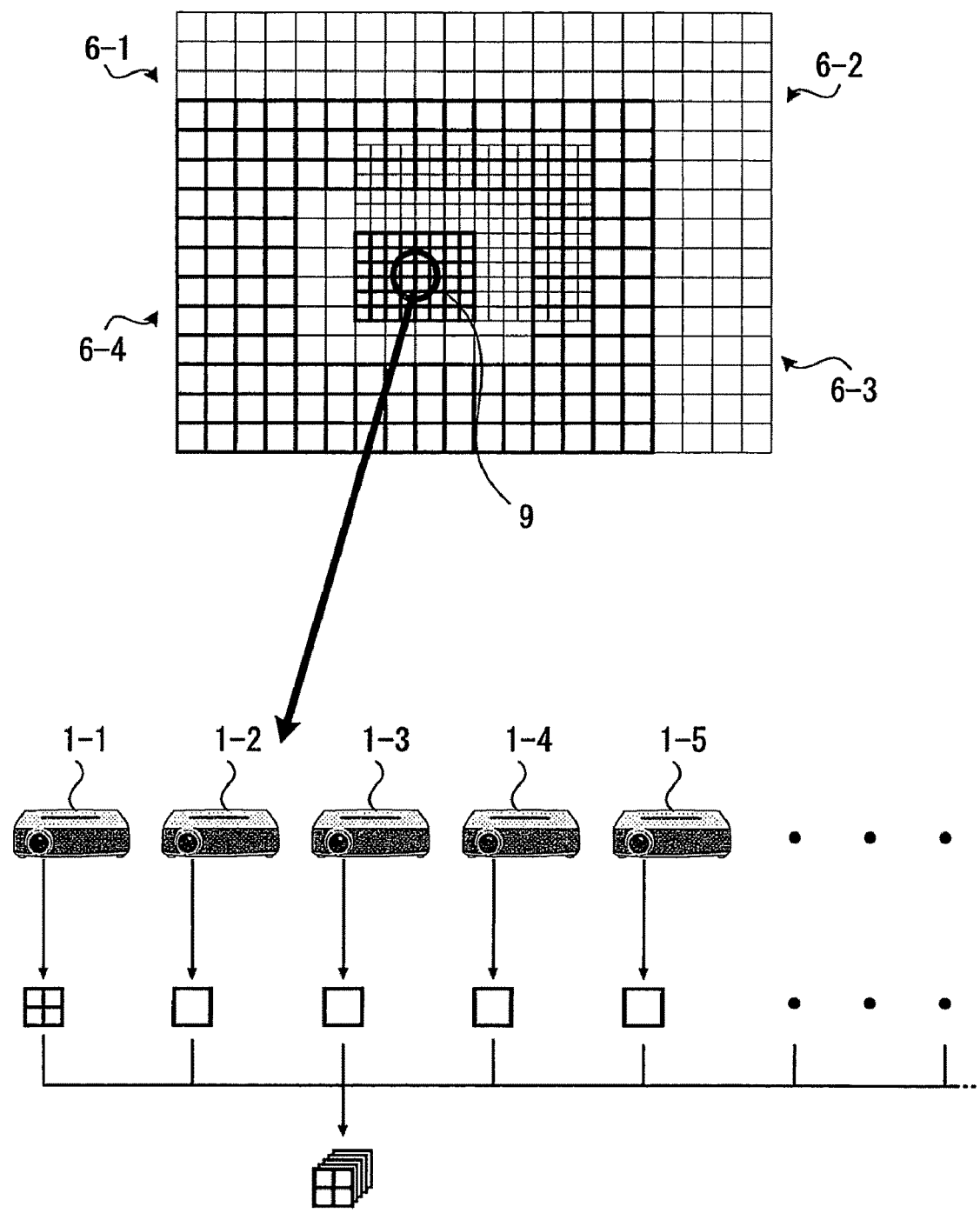
Figure 20A:
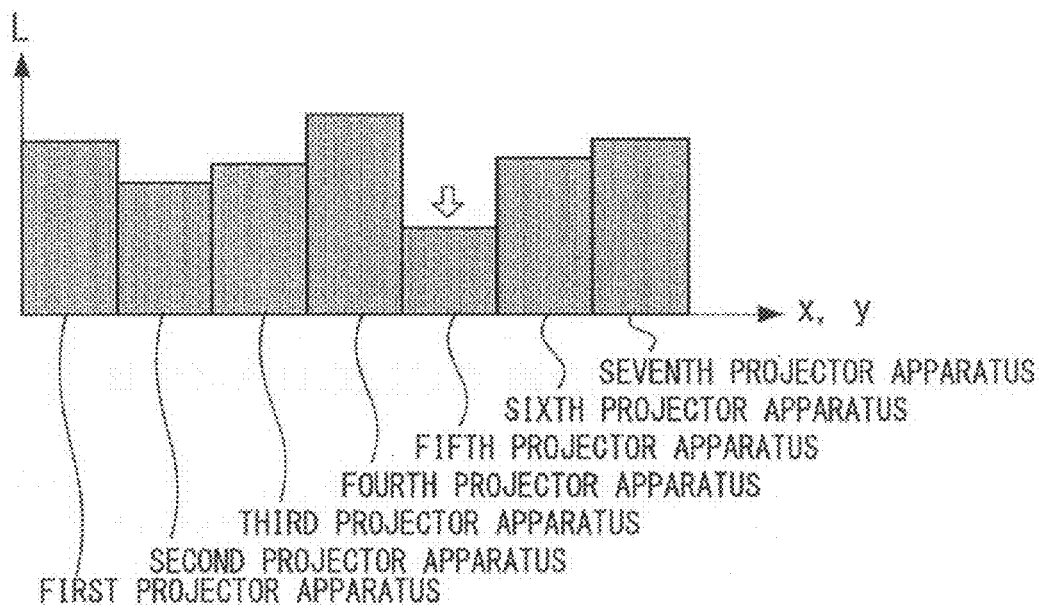
Figure 20B:
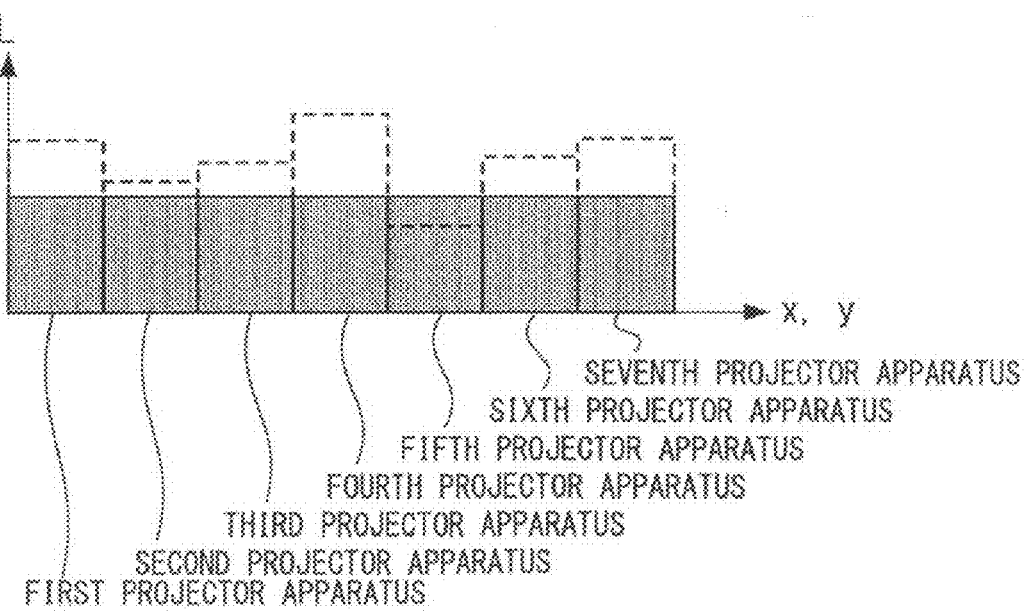
Figure 23:
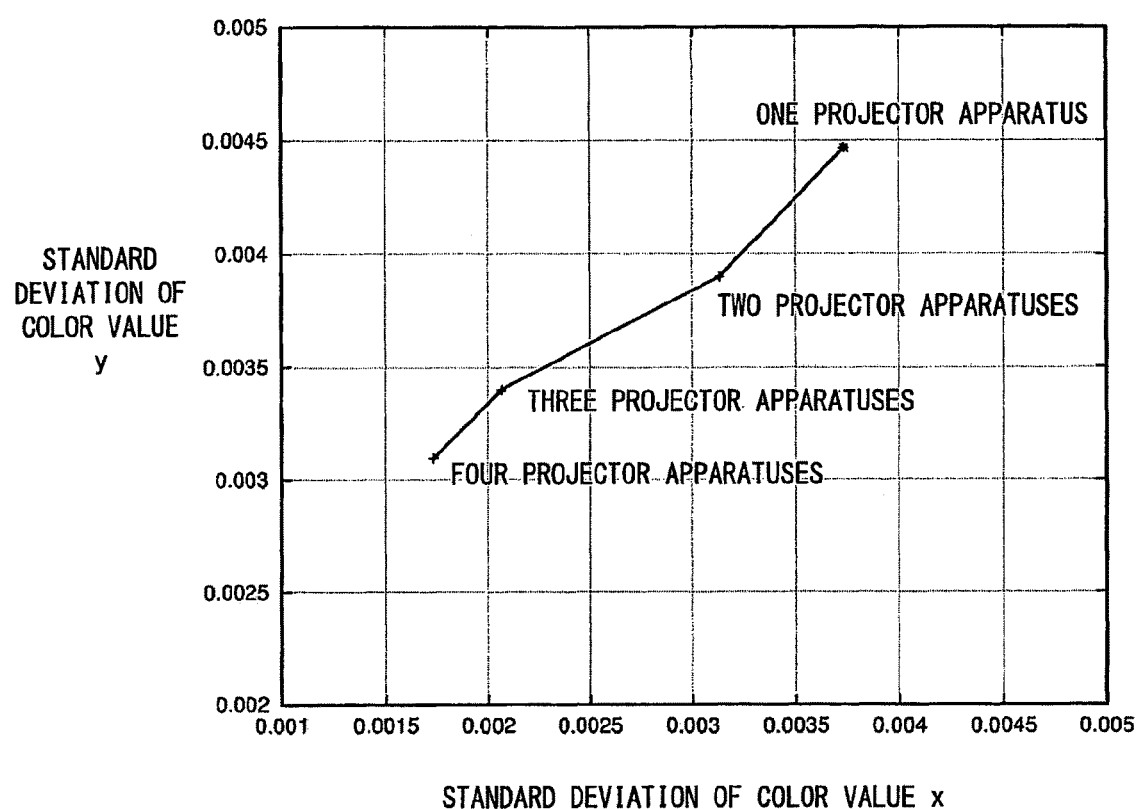
Figure 24:
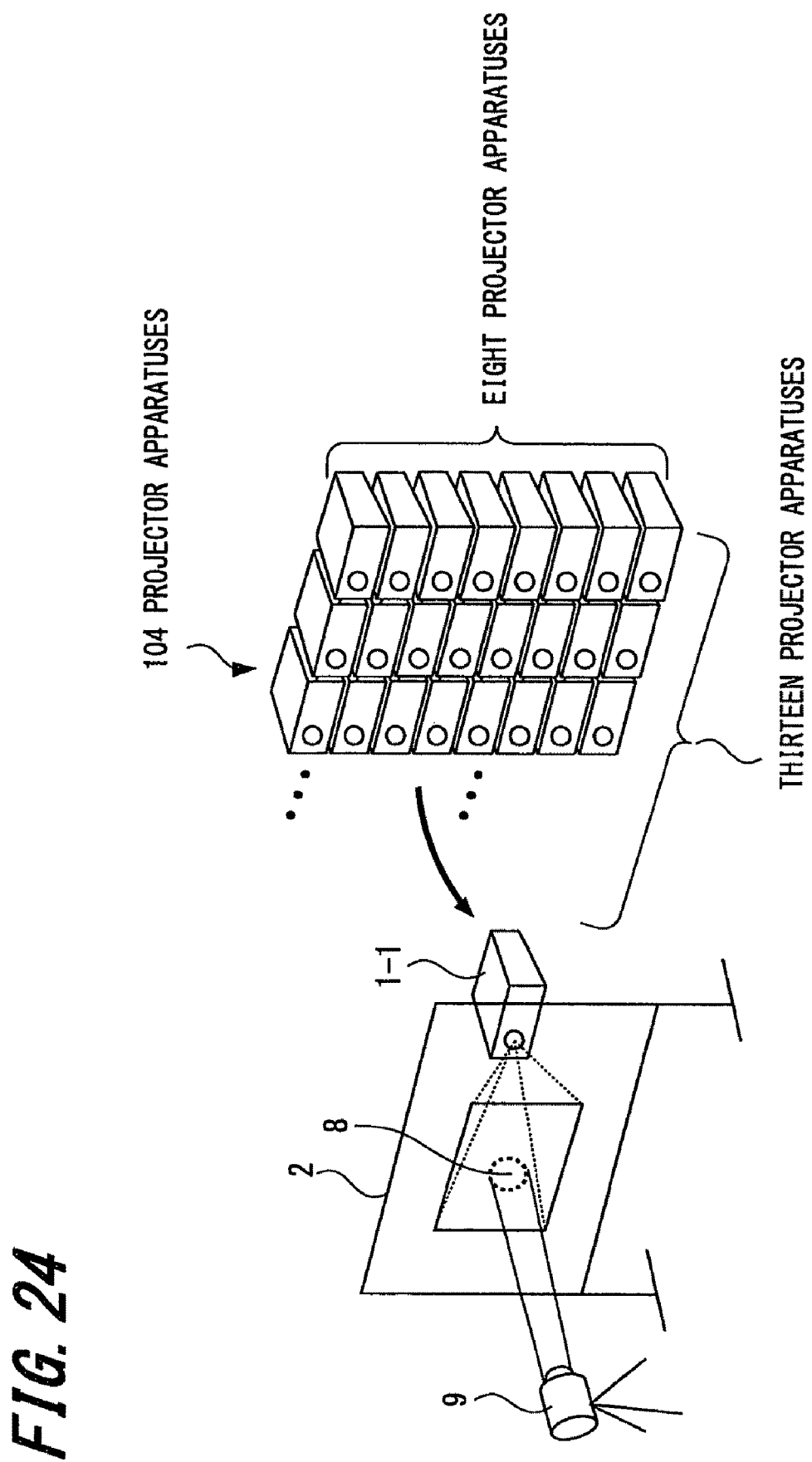
Figure 25A:
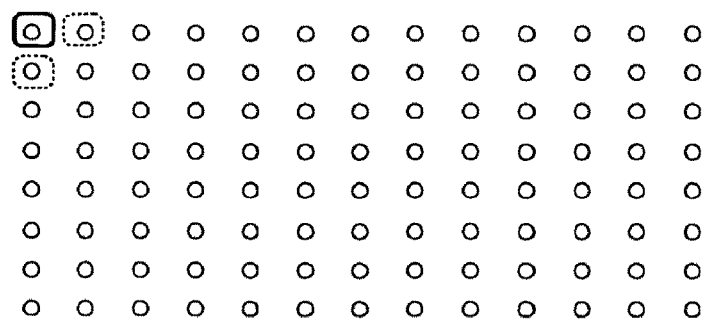
Figure 25B:
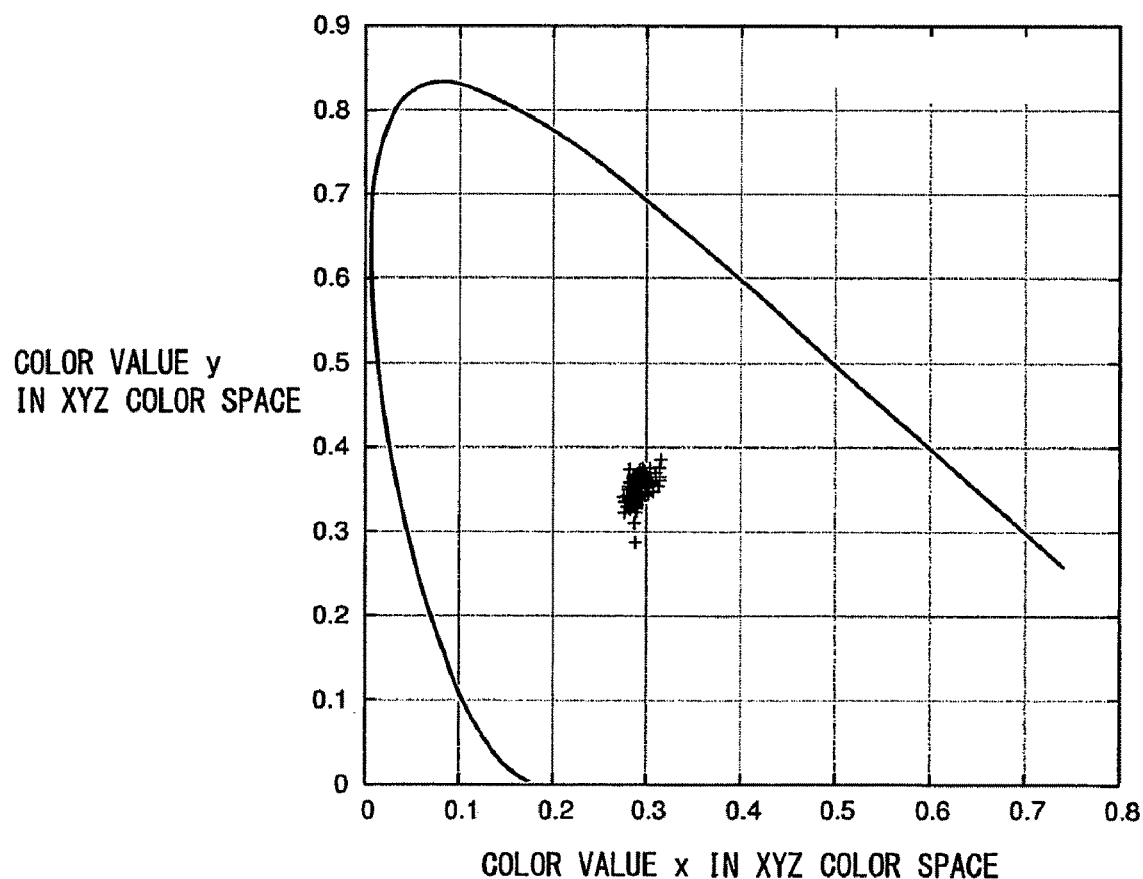
Figure 26A:
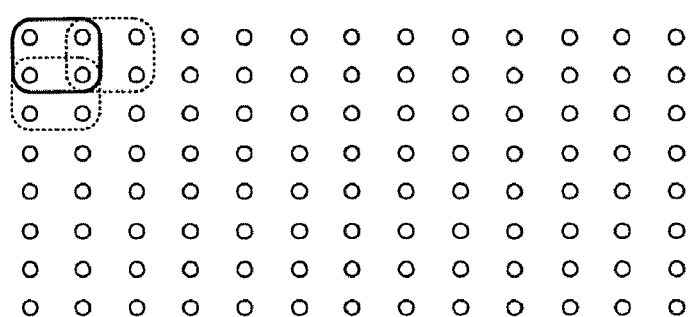
Figure 26B:
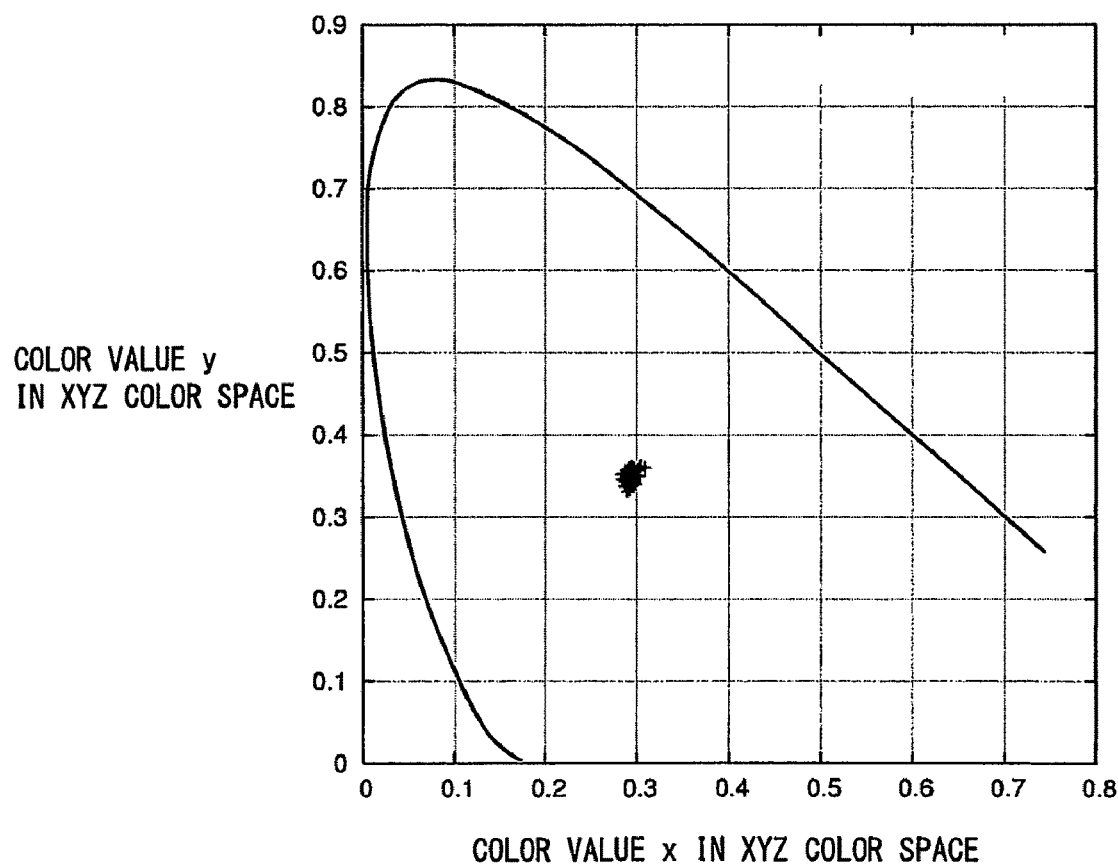
Figure 27A:
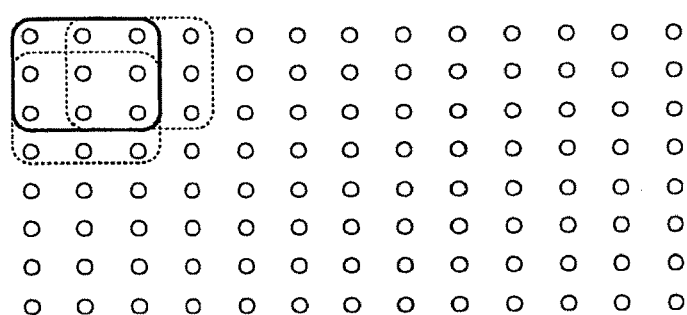
Figure 27B:
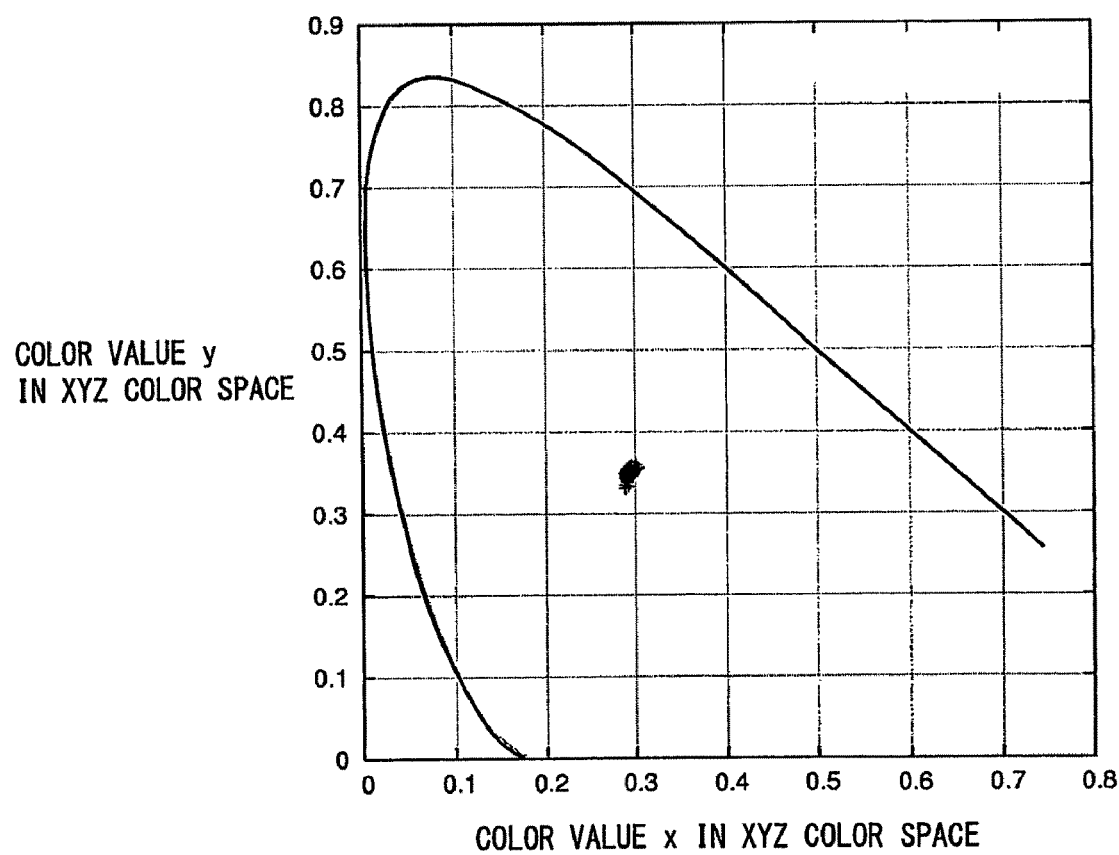
Figure 28A:
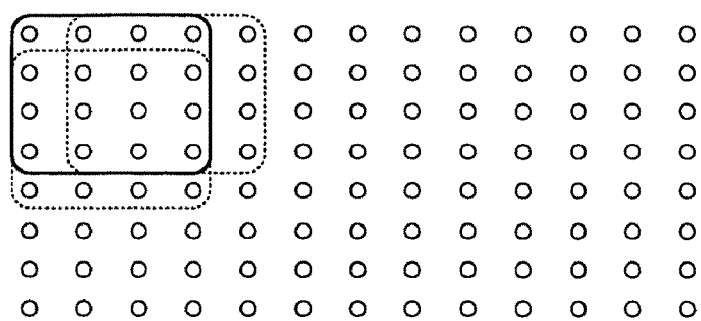
Figure 28B:
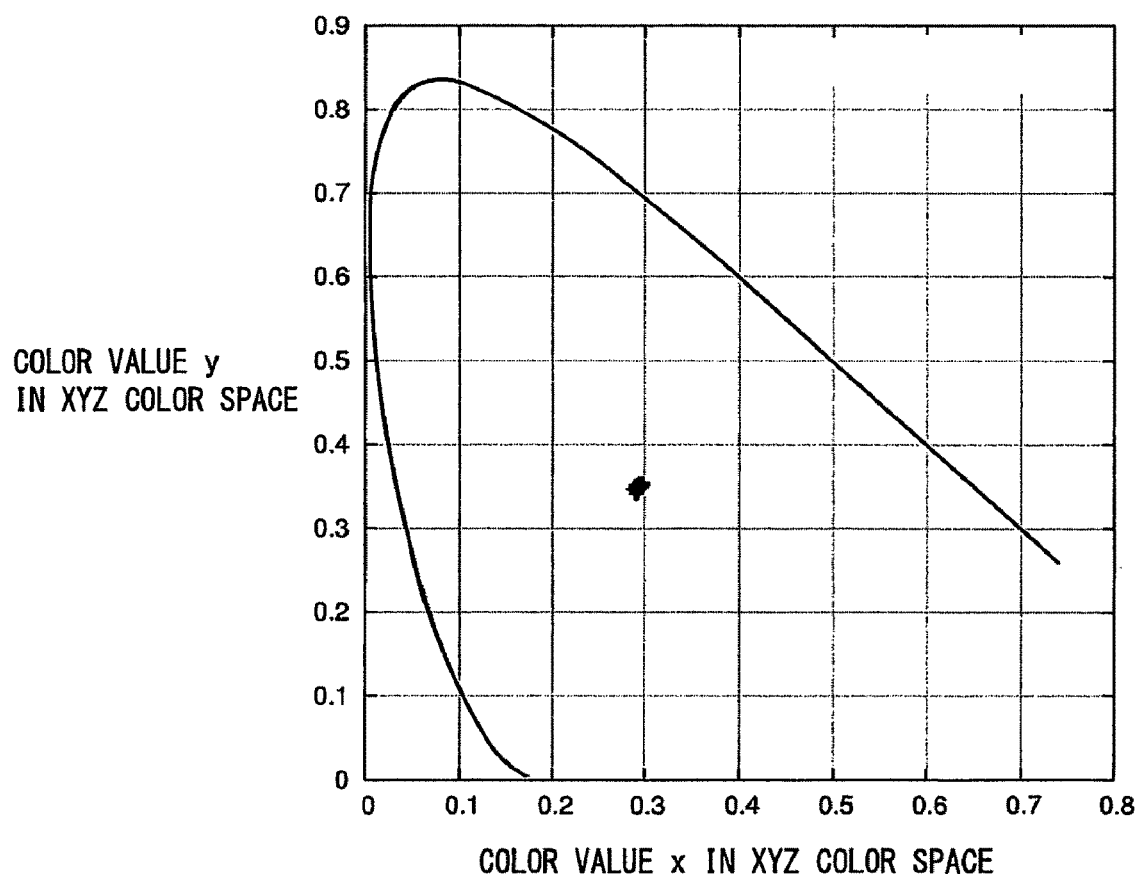
Figure 29A:
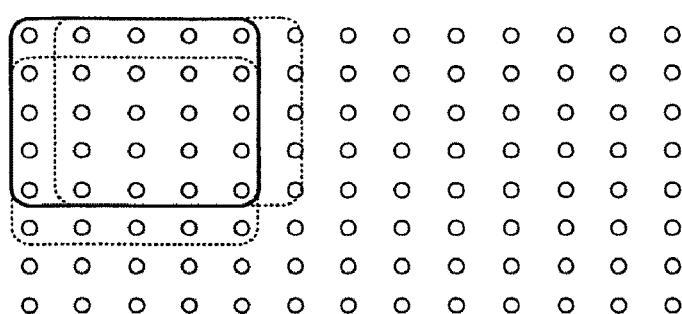
Figure 29B:
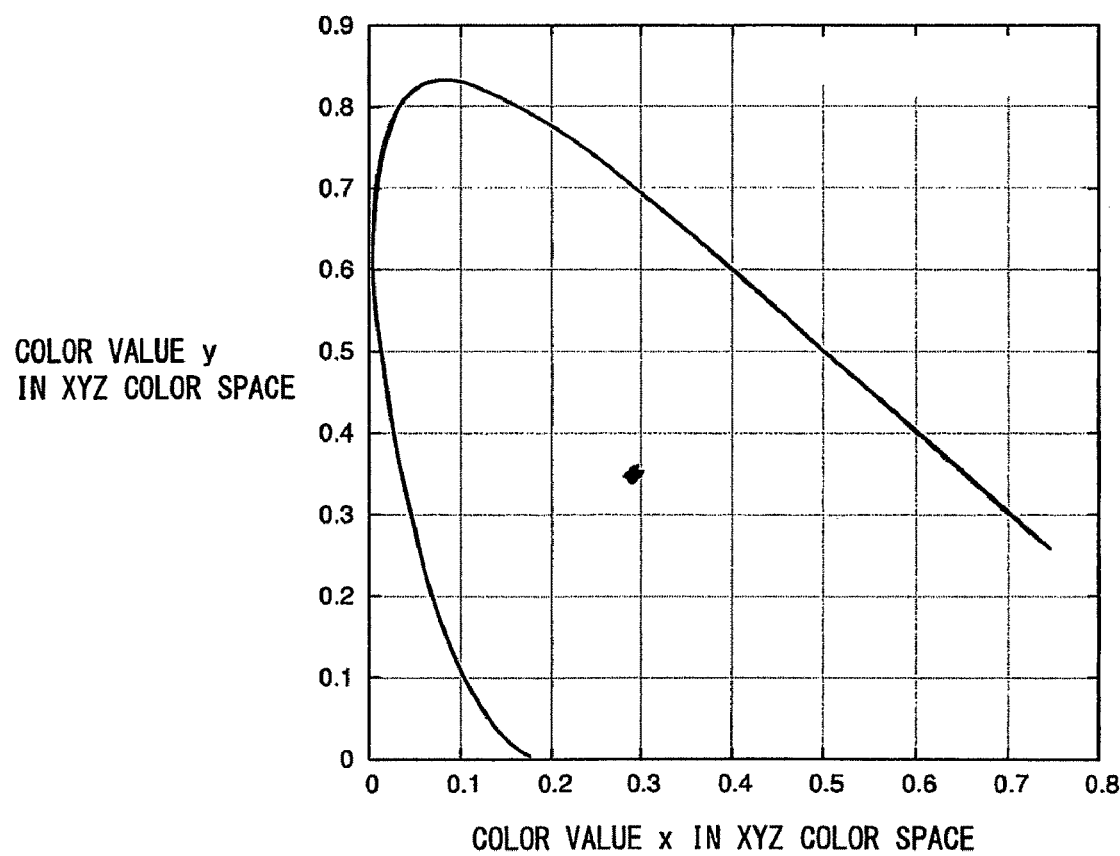
Figure 30:
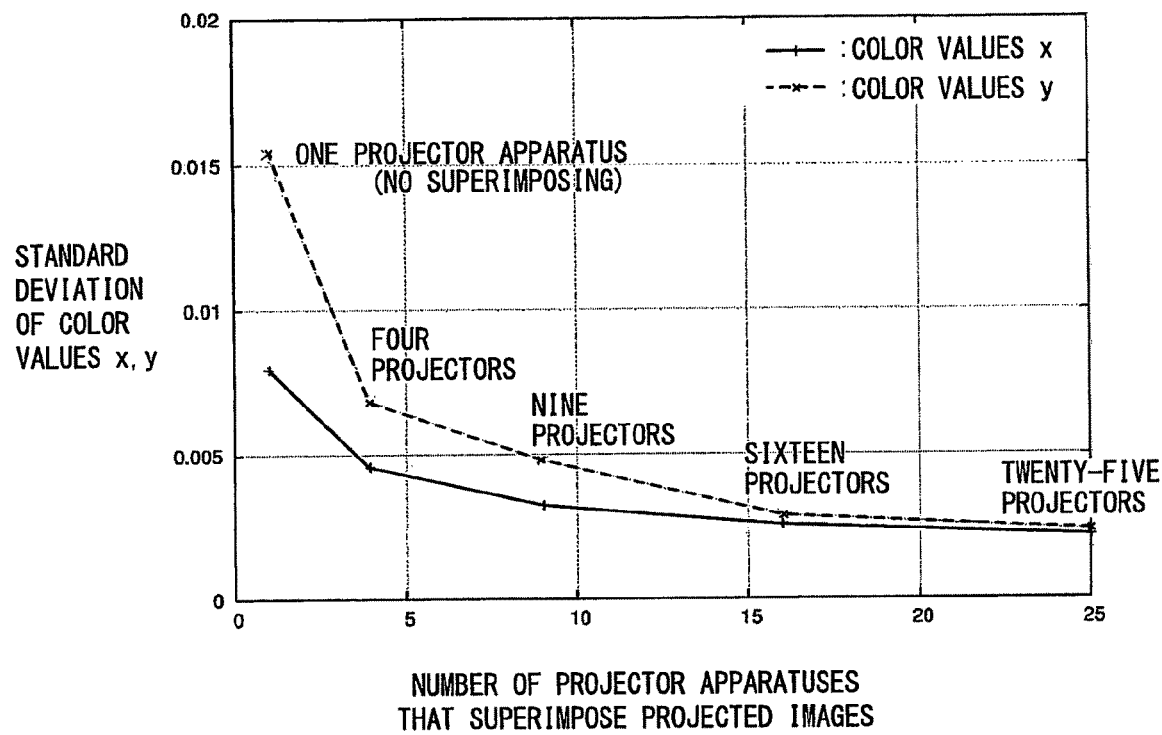
Figure 31A:
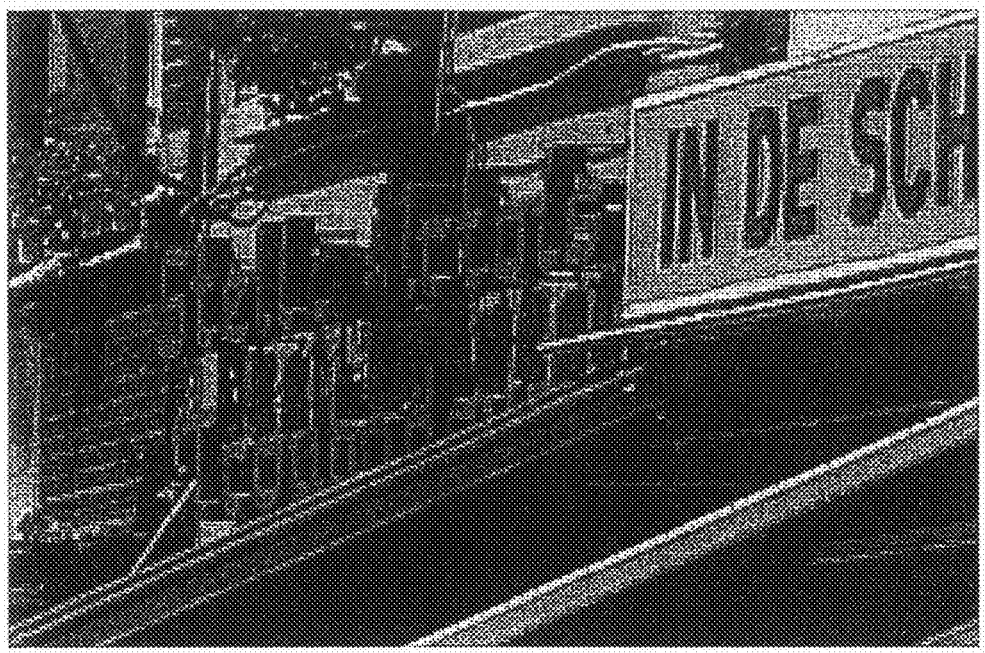
Figure 31B:
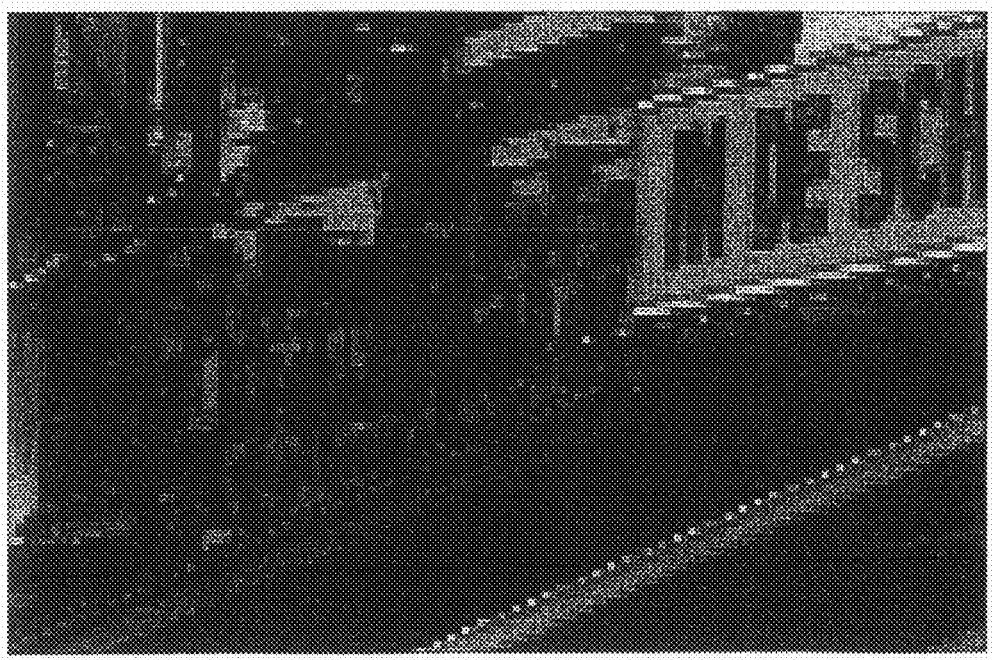
Figure 32A:
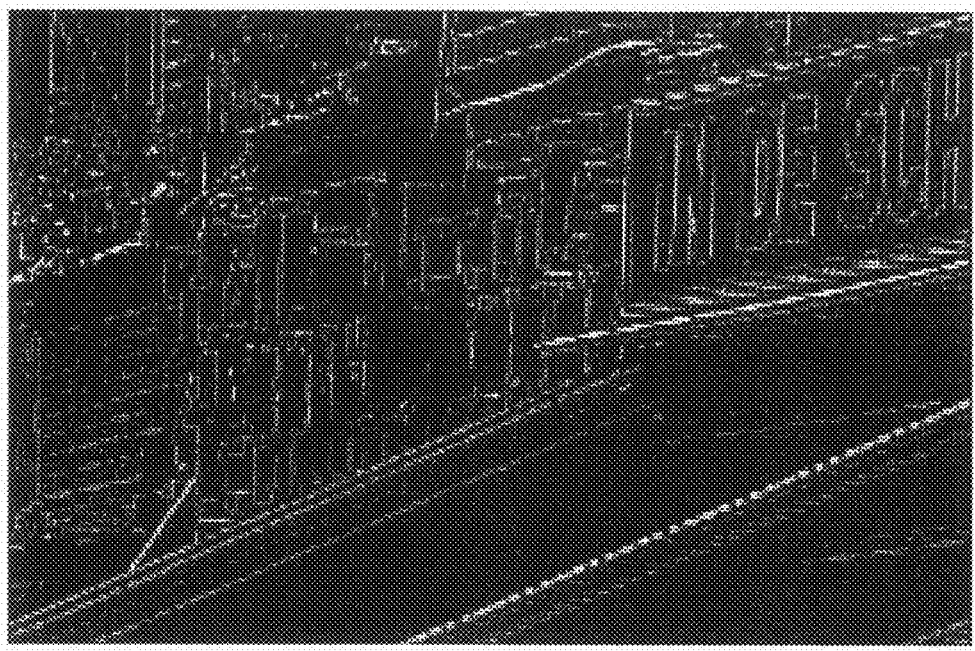
Figure 32B:
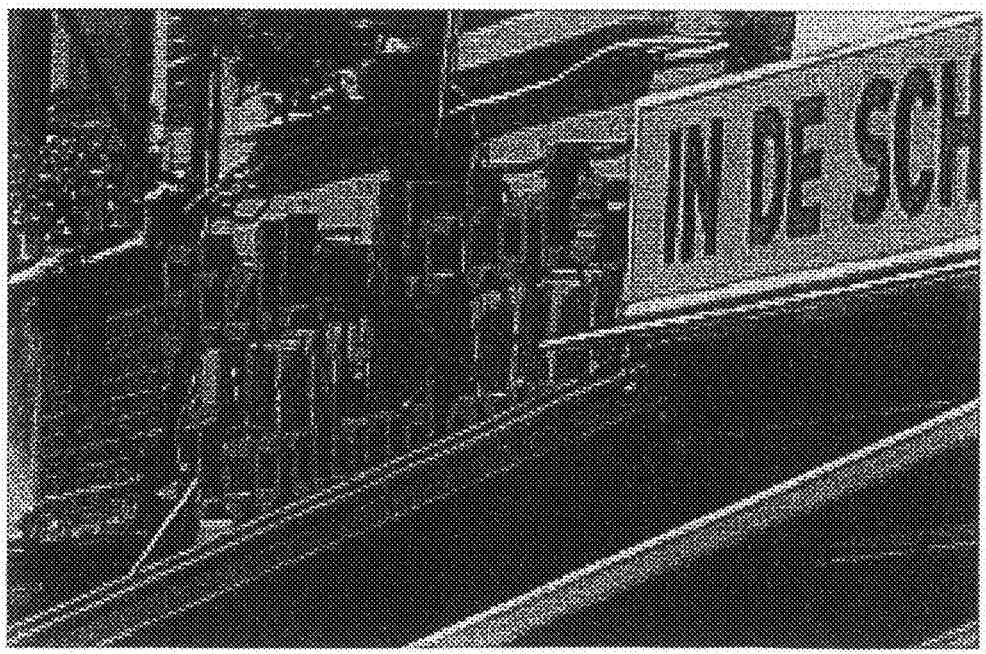
Figure 34:
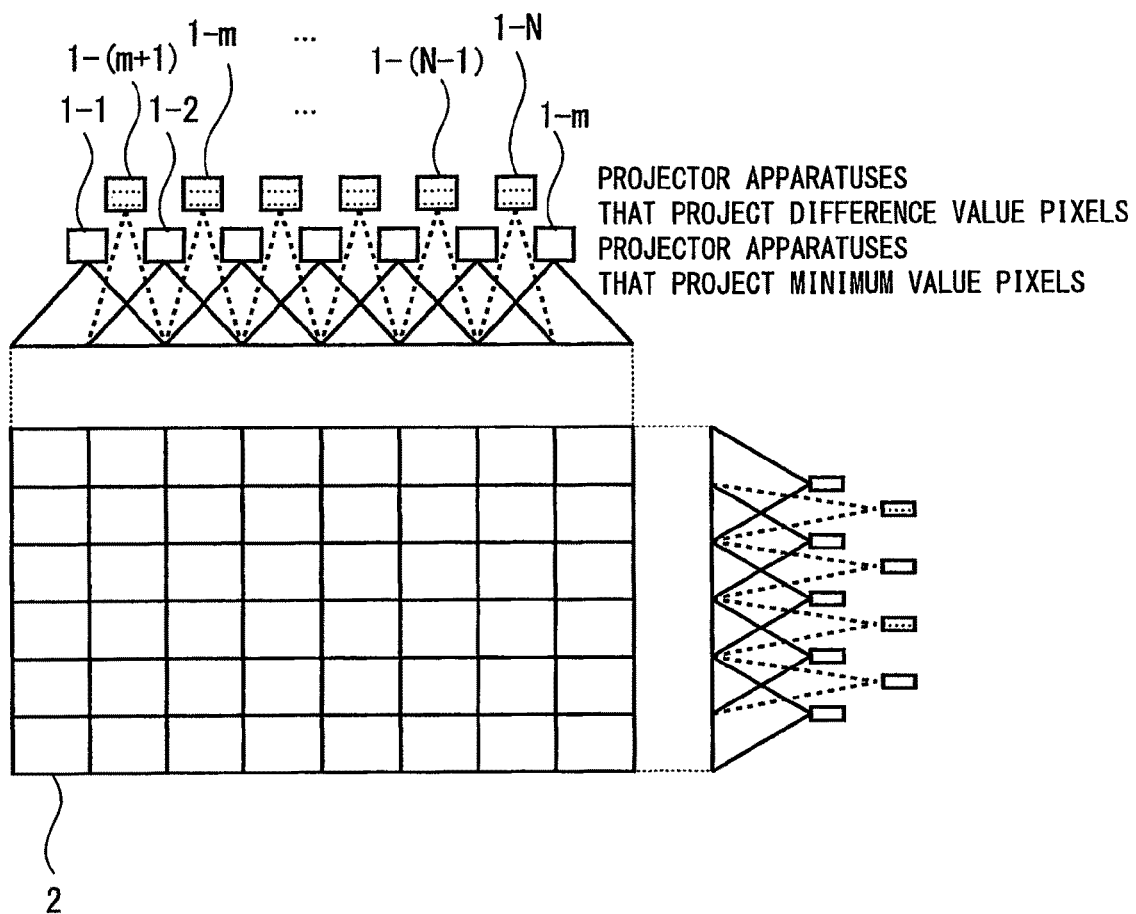
Figure 35:
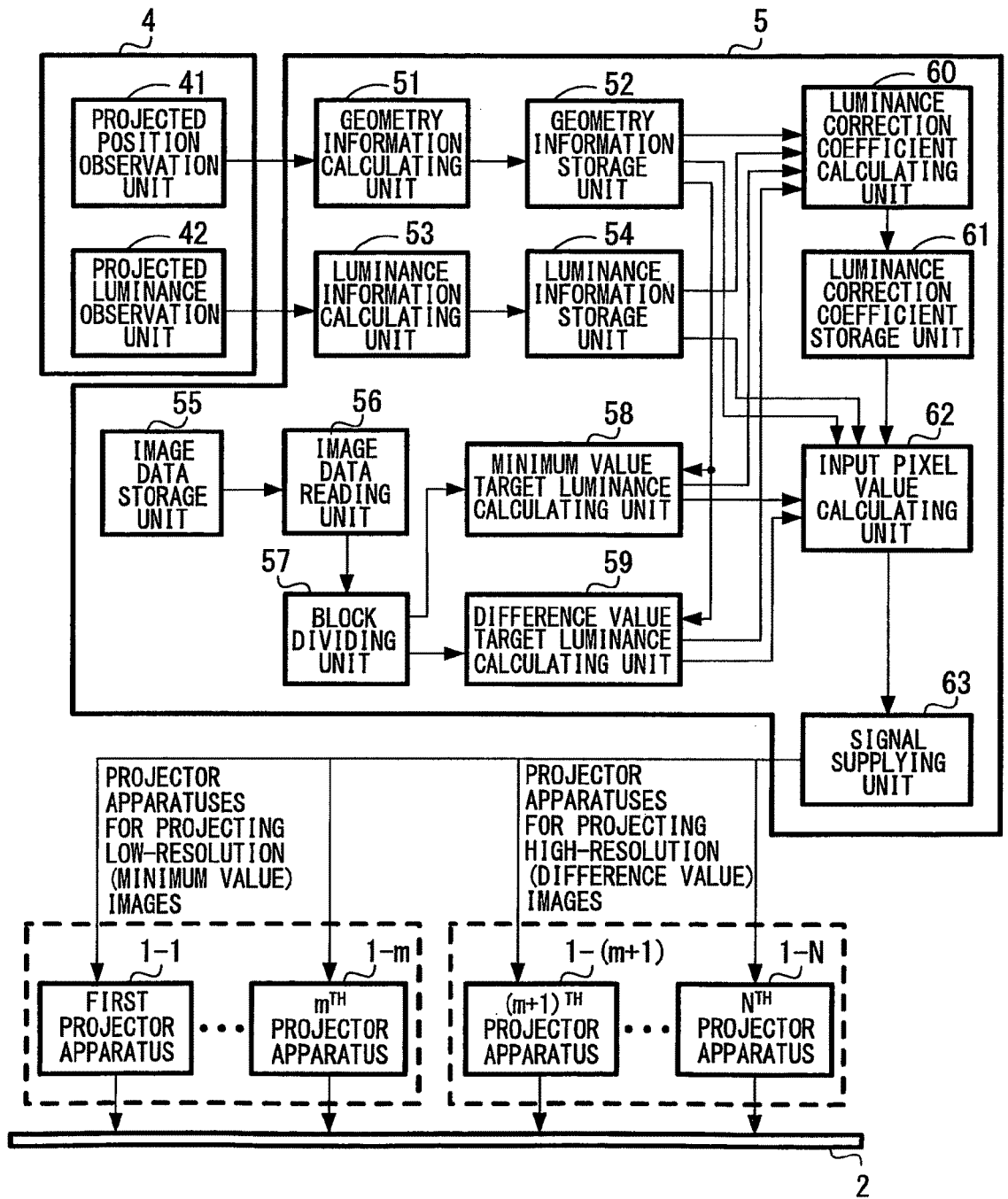
Figure 36:
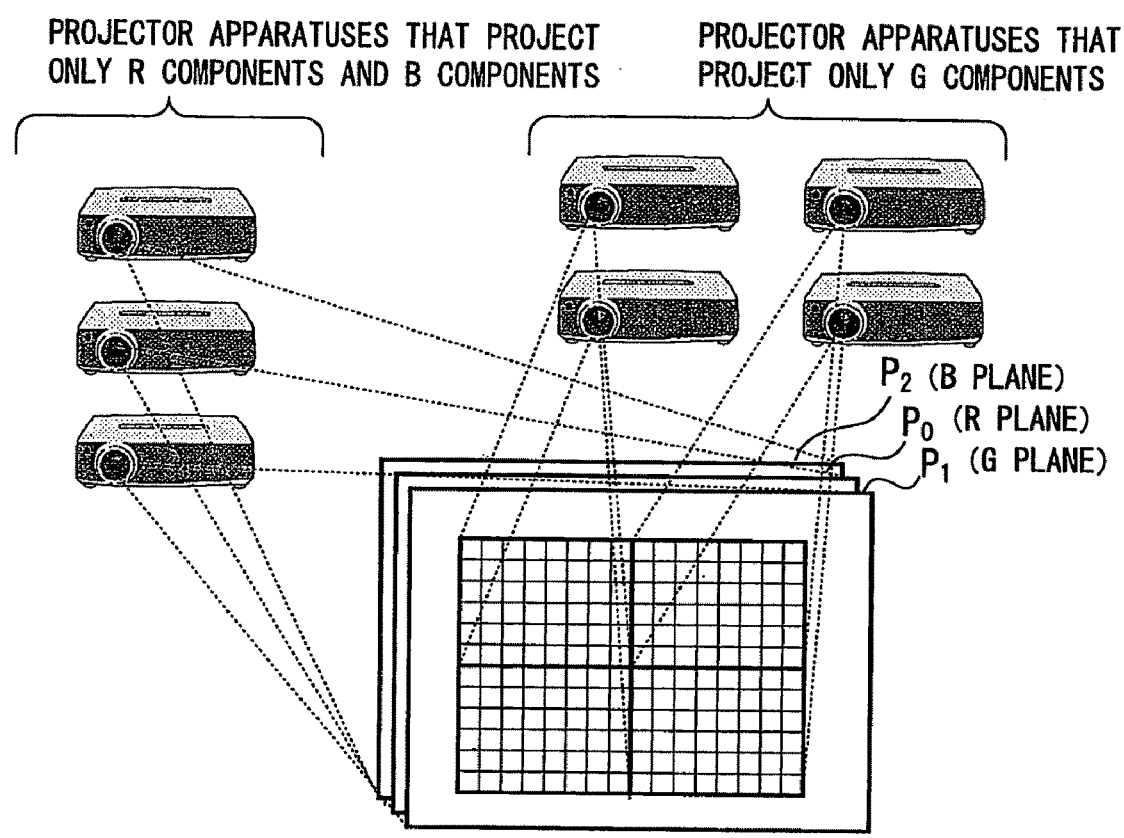
Figure 37:
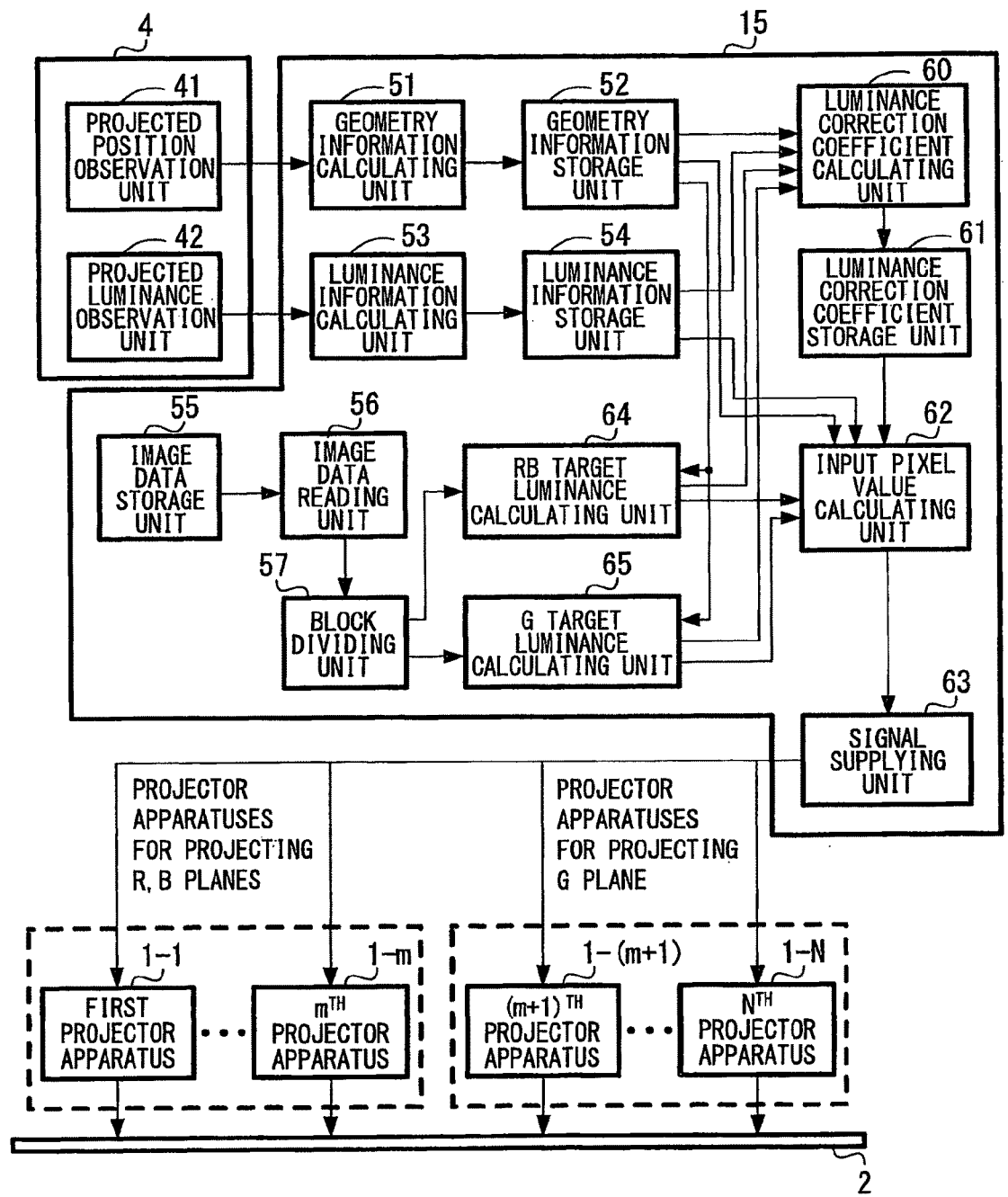
Figure 38:
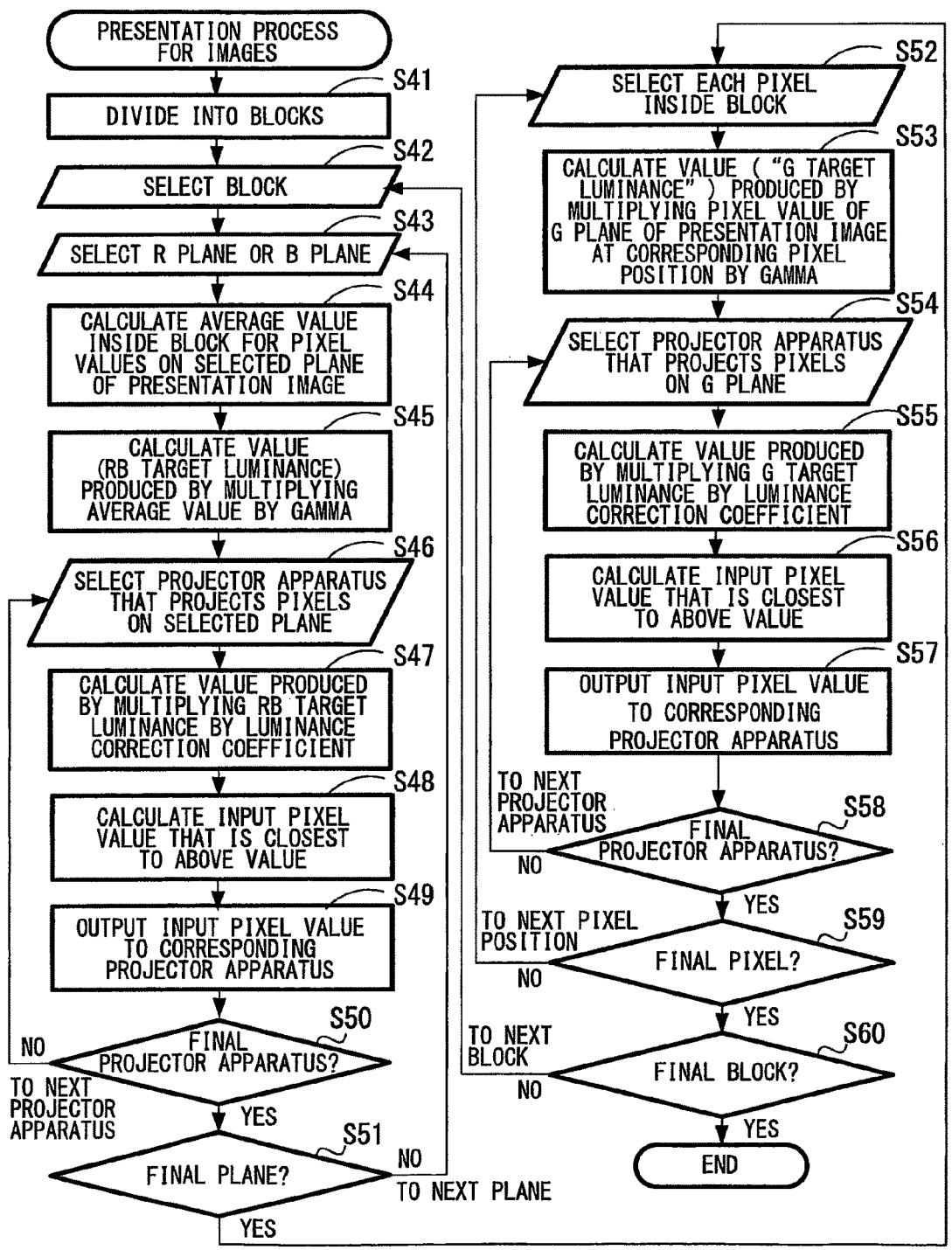
Figure 39A:
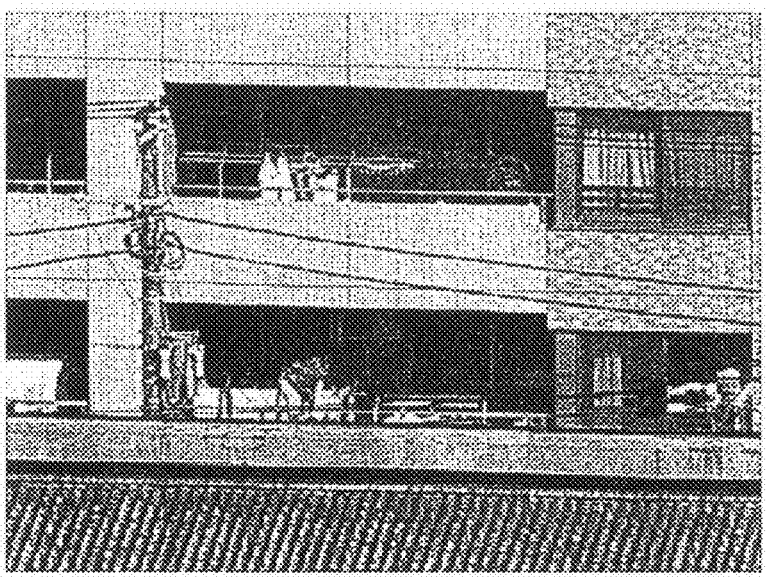
Figure 39B:
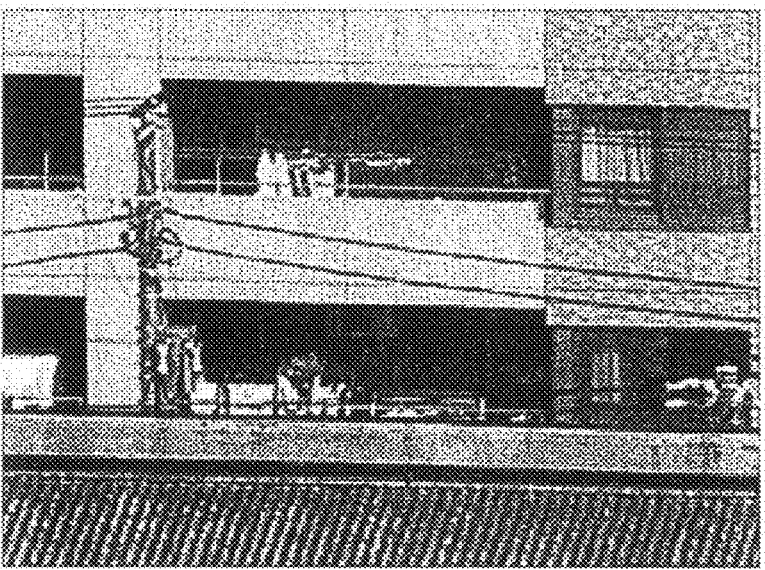
Figure 39C:
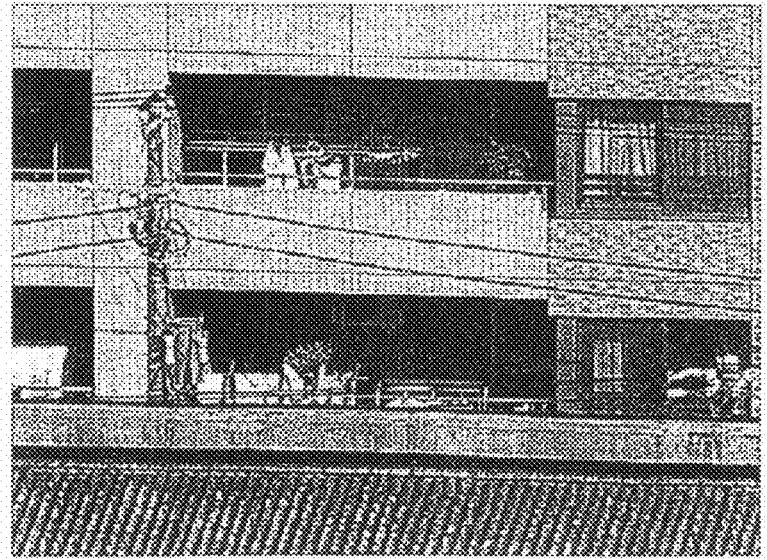
Figure 40:
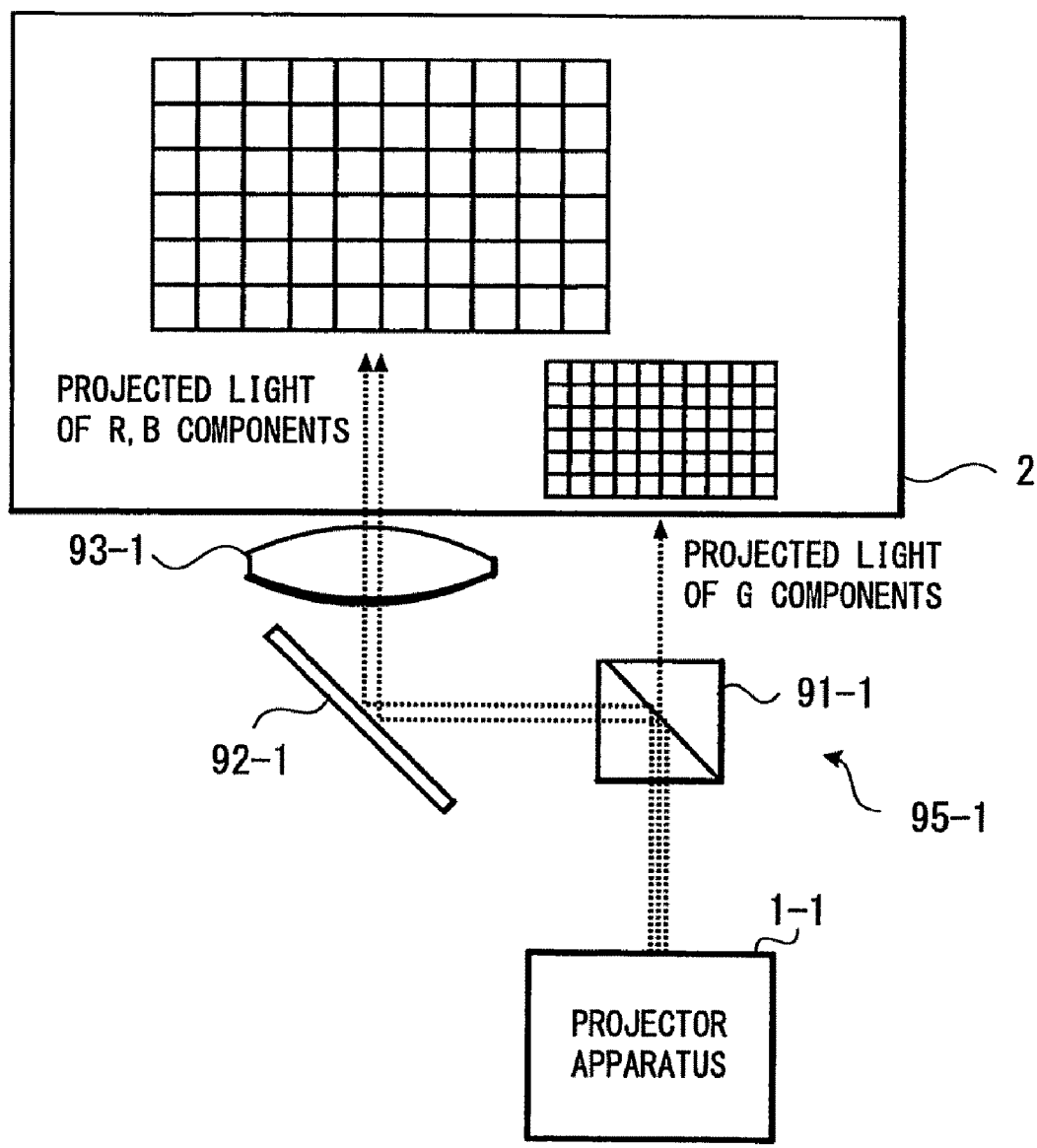
Figure 41:
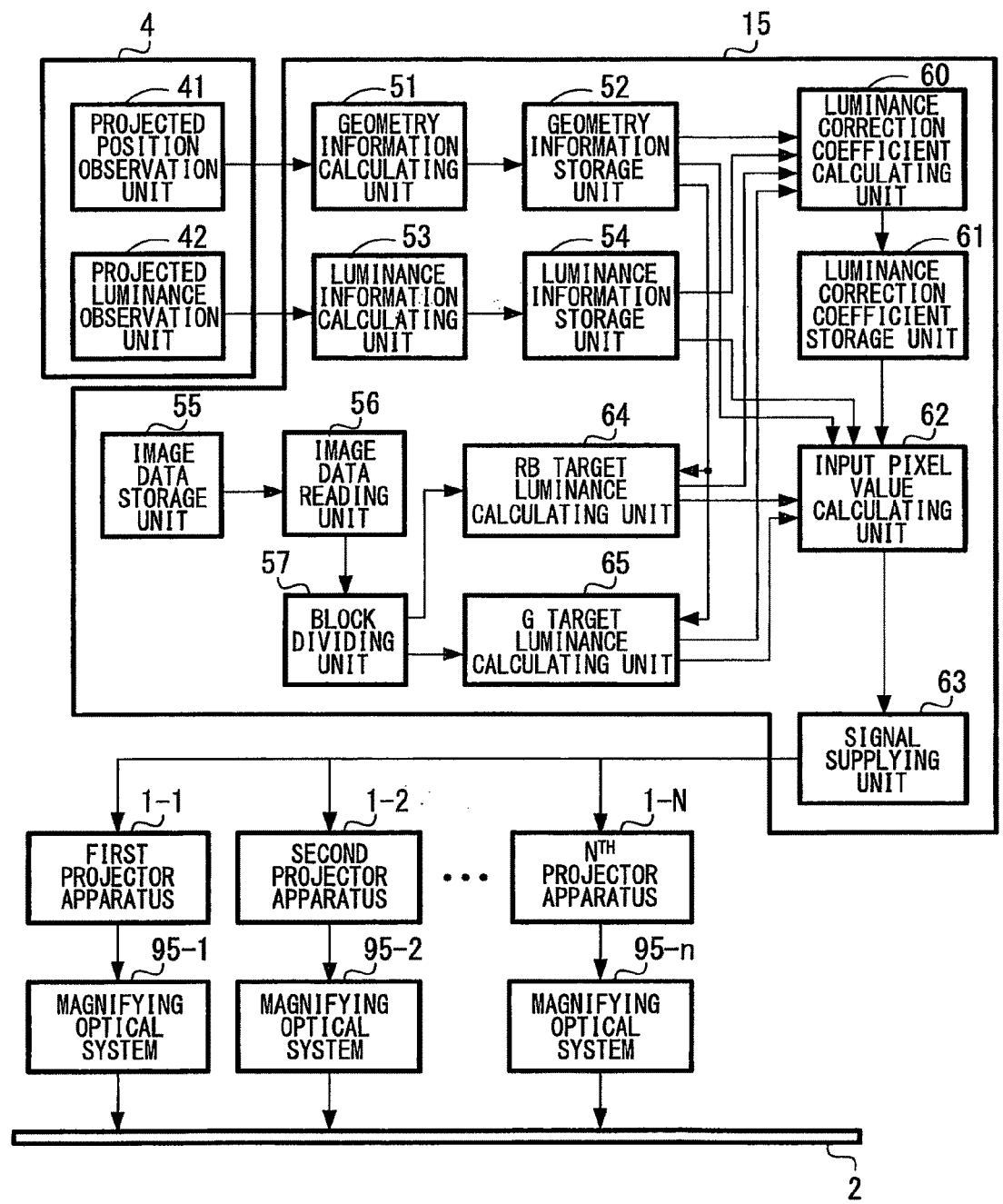

FIG. 1 is a diagram showing one example of the external construction of an existing image projecting system;

FIG. 2 is a three-view diagram showing one example of the layout of projector apparatuses in the existing image projecting system and one example of a projected image;

FIGS. 3A and 3B are diagrams showing an example of calibration (geometric correction);

FIG. 4 is a diagram showing an example of fluctuations in luminance and color between projected images;

FIGS. 5A and 5B are diagrams showing an example of calibration (luminance correction);

FIGS. 6A and 6B are diagrams showing examples of luminance before and after correction for existing projector apparatuses;

FIG. 7 is a diagram showing one example of the external construction of an image projecting system according to a first embodiment of the present invention;

FIGS. 8A to 8C construct a three-view diagram showing one example of the layout of projector apparatuses in the image projecting system according to the first embodiment of the present invention and one example of a projected image;

FIGS. 9A to 9C are diagrams useful in explaining an example where a projected image is nonuniformly magnified according to the first embodiment of the present invention;

FIGS. 10A and 10B are diagrams useful in explaining an example where a projected image is nonuniformly magnified according to the first embodiment of the present invention;

FIGS. 11A to 11D are diagrams useful in showing an example where non-uniform projected images are superimposed according to the first embodiment of the present invention;

FIG. 12 is a block diagram showing one example of the internal construction of the image projecting system according to the first embodiment of the present invention;

FIG. 13 is a diagram showing an example where pixels in a projected image are expressed on XY coordinate axes according to the first embodiment of the present invention;

FIG. 14 is a diagram showing an example of correspondence between various variables for the projector apparatuses, the planes, and the pixel positions according to the first embodiment of the present invention;

FIGS. 15A to 15C are graphs showing examples of the luminance distribution of projected images according to the first embodiment of the present invention;

FIG. 16 is a flowchart showing an example of an image projecting system according to the first embodiment of the present invention;

FIG. 17 is a flowchart showing an example of calculation processing for input pixel values according to the first embodiment of the present invention;

FIG. 18 is a diagram showing an example of pixel values (luminances) of images projected by projector apparatuses according to the first embodiment of the present invention;

FIG. 19 is a diagram showing examples of the pixel values for each block produced by dividing an image projected by each projector apparatus according to the first embodiment of the present invention;

FIGS. 20A and 20B are diagrams showing examples of luminances before and after correction for each projector apparatus according to the first embodiment of the present invention;

FIGS. 21A to 21D are diagrams showing example constructions for superimposing projected images using a plurality of projector apparatuses;

FIGS. 22A to 22D are diagrams showing example displays of projected images when the projected images of projector apparatuses are superimposed;

FIG. 23 is a graph showing one example of the standard deviations of color values x, y when projected images of projector apparatuses are superimposed;

FIG. 24 is a diagram showing an example of how color values are measured;

FIGS. 25A and 25B are diagrams showing examples of color values x, y in a case where projected images are not superimposed;

FIGS. 26A and 26B are diagrams showing examples of color values x, y in a case where projected images of four adjacent projector apparatuses are superimposed;

FIGS. 27A and 27B are diagrams showing examples of color values x, y in a case where projected images of nine adjacent projector apparatuses are superimposed;

FIGS. 28A and 28B are diagrams showing examples of color values x, y in a case where projected images of sixteen adjacent projector apparatuses are superimposed;

FIGS. 29A and 29B are diagrams showing examples of color values x, y in a case where projected images of twenty-five adjacent projector apparatuses are superimposed;

FIG. 30 is a graph showing one example of the relationship between the color values x, y and the number of projector apparatuses that superimpose projected images;

FIGS. 31A and 31B are diagrams showing example displays of projected images;

FIGS. 32A and 32B are diagrams showing example displays of projected images;

FIG. 33 is a diagram showing an example of the external construction of an image projecting system according to a second embodiment of the present invention;

FIG. 34 is a diagram showing an example layout of projector apparatuses according to the second embodiment of the present invention;

FIG. 35 is a block diagram showing one example of the internal construction of the image projecting system according to the second embodiment of the present invention;

FIG. 36 is a diagram showing examples of the R, G, B planes projected by the projector apparatuses in an image projecting system according to a third embodiment of the present invention;

FIG. 37 is a block diagram showing one example of the internal construction of the image projecting system according to the third embodiment of the present invention;

FIG. 38 is a flowchart showing an example of calculation processing for input pixel values according to the third embodiment of the present invention;

FIGS. 39A to 39C are diagrams showing example displays of projected images according to the image projecting system according to the third embodiment of the present invention;

FIG. 40 is a diagram showing an example construction in a case when projected light from a single projector apparatus is split into G components and B, R components and only the projected light for B, R components is magnified in an image projecting system according to a fourth embodiment of the present invention;

FIG. 41 is a block diagram showing one example of the internal construction of the image projecting system according to the fourth embodiment of the present invention;

FIGS. 42A to 42C are diagrams showing examples of input images and presented projected images for each of the R, G, B components in the image projecting system according to the fourth embodiment of the present invention;

FIGS. 43A to 43G are diagrams showing examples of projected images presented on a screen by the image projecting system according to the fourth embodiment of the present invention; and FIGS. 44A to 44F are diagrams showing examples of images inputted into projector apparatuses in the image projecting system according to the fourth embodiment of the present invention.

DESCRIPTION OF THE PREFERRED EMBODIMENTS

A first embodiment of the present invention will now be described with reference to FIGS. 7 to 32B. The present embodiment is described for an example where the present invention is applied to an image projecting system 10 that can display a high-definition image on a screen with uniform luminance by superimposing images projected using a plurality of projector apparatuses.

FIG. 7 shows an example construction of the image projecting system 10 constructed of a plurality of projector apparatuses. The image projecting system 10 supplies image signals to N projector apparatuses 1-1 to 1-N with the same projection performance. In the present embodiment, the case where N=35 will be described.

The image projecting system 10 according to the present embodiment includes the N projector apparatuses, a screen 2 as a display screen for the projected images, an observation unit 4 for observing the image projected onto the screen 2, and a control apparatus 5 that receives information observed by the observation unit 4 and supplies an image signal to each projector apparatus. However, FIG. 7 has been simplified and only the projector apparatuses 1-1 to 1-4, 1-11 to 1-14, and 1-21 to 24 are shown.

The N projector apparatuses are disposed in a grid at predetermined intervals and project images based on the inputted image signals onto the screen 2 so that the images are superimposed at positions that are displaced by a predetermined distance. Each projector apparatus projects an image onto a part of the screen 2 so that as a whole, a single image is formed on the screen 2. In FIG. 7, the projected image projected onto the screen 2 by the projector apparatus 1-12 is referred to as the "projected image 3-12".

The observation unit 4 observes the luminance of an image region composed of a plurality of projected images projected on the screen 2. The observation unit 4 may be disposed behind the screen 2 instead of in front of the screen 2.

The control apparatus 5 adjusts the luminance values of respective pixels that construct the image projected by each projector apparatus based on the observation result of the observation unit 4, and supplies the luminance values to respective projector apparatuses.

The image region composed of a plurality of projected images is presented by superimposing first projected images and second projected images that have a higher definition than the first projected images. Predetermined pixels in the image region are presented by superimposing corresponding pixels in projected images from a plurality of adjacent projector apparatuses. The length of one side of a projected image is n (where n is an integer of two or higher) times the distance between the projector apparatuses that are disposed adjacent to one another.

FIGS. 8A to 8C construct a three-view diagram of the image projecting system 10. The projected image 3-12 has been highlighted for comparison with the projected images produced by other projector apparatuses.

Each projector apparatus is disposed so that the widths (i.e., the widths in both the horizontal and vertical direction) of the projected image projected by one projector apparatus are substantially double (or another integer multiple such as triple or quadruple) the interval at which the projector apparatuses are disposed. This means that aside from the region where there is no projected image from the adjacent projector apparatuses, in all of the pixels, light from four different projector apparatuses is superimposed.

The region where projected images from adjacent projector apparatuses are superimposed is spread across the entire screen 2. In addition, at every position aside from the edge portion of the image on the screen 2, images (i.e., light) projected by a plurality of projector apparatuses are superimposed.

In the past, when images were projected onto the screen 2 using a plurality of projector apparatuses, the edge portions of adjacent projected images were superimposed on one another. However, an embodiment of the present invention does not simply superimpose the edge portions of projected images as in the past. According to the present embodiment, the projected image of one projector apparatus is superimposed with the projected images of four projector apparatuses (for example) that are adjacent above, below, to the left, and to the right of such projector apparatus.

However, in the image projecting system 10, there is no limit on the number of projector apparatuses that superimpose projected images. It is also possible to construct an image projecting system where the width of the projected image of each projector apparatus is further increased and in one pixel, the light from four or more projector apparatuses, such as nine, sixteen, or twenty-five projector apparatuses is superimposed. This will be described later along with test results for superimposing of projected images.

FIGS. 9A to 9C show examples where the projected images are nonuniformly magnified. The image projecting system 10 in the present embodiment is characterized by nonuniformly magnifying the region of a projected image (hereinafter referred to as the "image region") and superimposing such magnified images. In FIGS. 9A to 9C, out of a first image region 6a and a second image region 6b, respectively surrounded by broken lines, the resolution of one region is maintained (as a high-resolution projected image) and the other region is magnified (to produce a low-resolution projected image) and projected on the screen 2.

FIG. 9A shows one example of image regions before magnification.

FIG. 9B shows an example display where the resolution of the second image region 6b has been maintained and the other region has been magnified to produce the first image region 6a'.

FIG. 9C shows an example display where the resolution of the first image region 6a has been maintained and the other region has been magnified to produce the second image region 6b'. The projected image formed of the first image region 6a and the second image region 6b' shown in FIG. 9C is hereinafter referred to as a "nonuniform projected image 6".

FIGS. 10A and 10B show an example construction when the nonuniform projected image 6 is projected onto the screen 2.

FIG. 10A is an example where a projected image is non-uniformly magnified.

The image projected by the projector apparatus 1-1 passes through a nonuniform magnification optical unit 7-1 that nonuniformly magnifies the image. The nonuniform magnification optical unit 7-1 is an optical system where the magnification ratio differs for images for a predetermined region and other regions out of the image projected onto a corresponding region of the screen. The nonuniform magnification optical unit 7-1 is constructed of a Fresnel lens, for example. The image that has passed the nonuniform magnification optical unit 7-1 is projected onto the screen 2 as shown in the example shown in FIG. 9C described above.

FIG. 10B shows an example construction of a Fresnel lens.

The Fresnel lens 7 is a slim lens produced by cutting a lens into concentric circles as shown in FIG. 10B. As shown in FIG. 10A, a rectangular hole may be formed near the center of the Fresnel lens 7. Light rays that pass through the region where the hole is provided pass without being magnified, but light rays that pass other parts of the lens where there is no hole are magnified and projected onto the screen 2.

However, so long as the nonuniform magnification optical unit 7-1 can maintain the high resolution of one region and magnify the other regions across a wider range, any design can be used. For example, provided that the thickness of the part that is cut out in the center of the lens does not obstruct the light rays (for example, if such part is sufficiently thin), such lens need not be a Fresnel lens. Also, by using a fisheye lens, it is possible to magnify a projected image to produce a magnified image with a non-uniform resolution.

FIGS. 11A to 11D show examples that a plurality of pairs of the projector apparatus and the non-uniform expansion optical unit shown in FIG. 10A have been laid out so that a plurality of nonuniform projected images that have been magnified are superimposed. When doing so, the projector apparatuses are laid out so that the high-resolution regions (that correspond to the first image region 6a in FIG. 9C) of the projected images are aligned with no gaps in between.

Figure 11A:
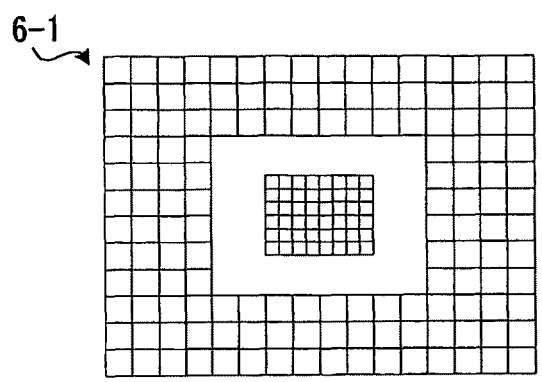

FIG. 11A shows an example of one non-uniform projected image.

In this case, the nonuniform projected image 6-1 is projected onto the screen 2.

Figure 11B:
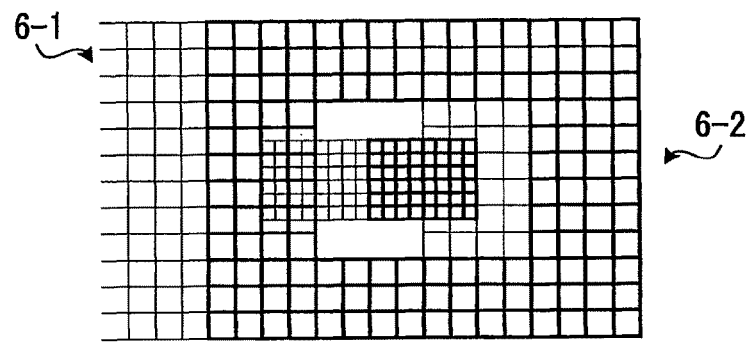

FIG. 11B shows an example where two non-uniform projected images are superimposed.

In this case, the nonuniform projected images 6-1, 6-2 projected from two adjacent projector apparatuses are superimposed on the screen 2.

Figure 11C:
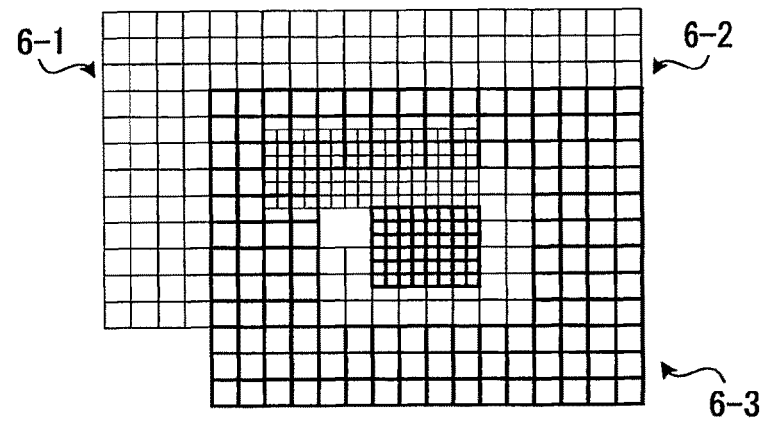

FIG. 11C is an example where three non-uniform projected images are superimposed.

In this case, the nonuniform projected images 6-1 to 6-3 projected from three adjacent projector apparatuses are superimposed on the screen 2.

Figure 11D:
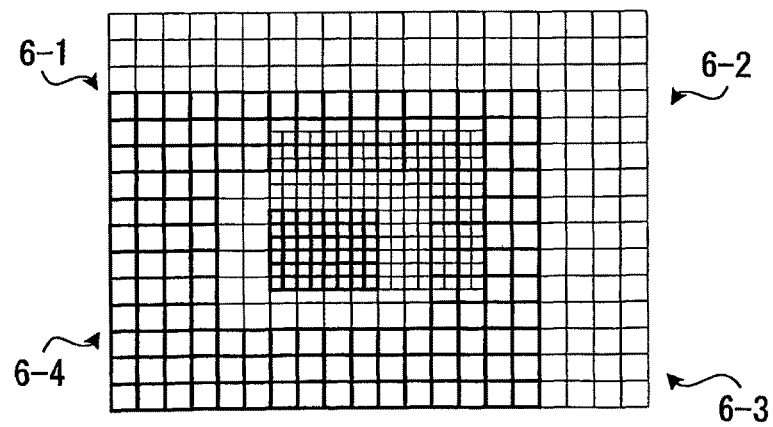

FIG. 11D is an example where four non-uniform projected images are superimposed.

In this case, the nonuniform projected images 6-1 to 6-4 projected from four adjacent projector apparatuses are superimposed on the screen 2.

As shown in FIGS. 11A to 11D, in each image region, a high-resolution projected image by one projector apparatus and a plurality of low-resolution projected images by projector apparatuses in the periphery are superimposed in each image region.

FIGS. 11A to 11D show up to a state where projected images of four projector apparatuses are superimposed. However, in reality, projected images from further projector apparatuses in the periphery are also superimposed on the projected images shown in FIGS. 11A to 11D. Here, the width (or height) of each of the respective high-resolution projected images in the center is equal to the interval at which adjacent projector apparatuses are laid out in the horizontal (or vertical) direction. This means that when the projected images projected by four projector apparatuses are superimposed, the high-resolution projected images in the center will be aligned with no gaps in between, and if the region where projected images from adjacent projector apparatuses are superimposed is spread across the entire screen 2, the high-resolution projected images in the center will be aligned with no gaps in between across the entire screen 2. However, the low-resolution image regions positioned at the edge portion of the region where projected images are superimposed will not be projected onto the screen 2. The composition (i.e., the number of high-resolution projected images and low-resolution projected images) of the projected image at an arbitrary position on the screen is the same across the entire screen. For this reason, there are no fluctuations in luminance caused in the image on the screen 2 due to differences in such composition.

FIG. 12 is a block diagram showing an example of the internal construction of the image projecting system 10.

A camera is used as the observation unit 4. The camera includes an optical lens system, not shown, an image pickup element that converts image light taken in via the optical lens system at predetermined shutter timing to an electric signal, a storage unit that stores the converted electric signal as still image data or video data, and a transfer processing unit that is connected to the control apparatus 5 and transfers the still image data or the video data stored in the storage unit. The observation unit 4 may be a camera capable of picking up video images or still images, for example, or a luminance meter that measures luminance.

The observation unit 4 includes a projected position observation unit 41 that observes, based on the still image data or video data stored in the storage unit, the projected positions of pixels that compose the image region described above on the screen 2, and a projected luminance observation unit 42 that observes the luminance of an image projected by each projector apparatus. The observation results of the projected position observation unit 41 and the projected luminance observation unit 42, i.e., information on the projected position and projected luminance obtained for each projector apparatus is supplied to the control apparatus 5. However, the observation unit 4 may be constructed so as to include a color meter as a color observing unit that observes the color (the hue and chroma) of a projected image on the screen 2.

The control apparatus 5 includes a geometry information calculating unit 51 that calculates, as "geometry information", the positions of pixels that construct a projected image for each projector apparatus, based on the projected positions of respective pixels in the image region observed by the projected position observation unit 41 and a geometry information storage unit 52 that is a storage region for temporarily storing the geometry information calculated by the geometry information calculating unit 51.

The control apparatus 5 also includes a luminance information calculating unit 53 that calculates, as "luminance information", the luminances of respective pixels in the image region on the screen from the luminance information in the image region observed by the projected luminance observation unit 42 and the position information (information on the projected position), and a luminance information storage unit 54 that is a storage region for temporarily storing the luminance information calculated by the luminance information calculating unit 53.

The control apparatus 5 also includes an image data storage unit 55 that stores original image data to be projected by the projector apparatuses, an image data reading unit 56 that reads image data from the image data storage unit 55, a block dividing unit 57 that divides an image region, which is based on a low-resolution image signal that has been read by the image data reading unit 56 and inputted to be projected, into predetermined regions, a minimum value target luminance calculating unit 58 that calculates, based on the position information, as information on a "minimum value target luminance", a minimum luminance value out of the image region divided by the block dividing unit 57, and a difference value target luminance calculating unit 59 that calculates, based on the position information, as information on a "difference value target luminance", a difference in luminance between the luminance of the image region divided by the block dividing unit and the minimum value luminance. The minimum value target luminance calculating unit 58 and the difference value target luminance calculating unit 59 are supplied with the geometry information stored by the geometry information storage unit 52. The minimum value target luminance calculating unit 58 sets an appropriate target luminance for each pixel based on the supplied geometry information so as to fall within a range of a maximum value and a minimum value of the luminance of the projected images produced by a plurality of projector apparatuses. The difference value target luminance calculating unit 59 sets an appropriate difference value target luminance for each pixel based on the supplied geometry information so as to fall within a range of a maximum value and a minimum value for the luminance of the projected images produced by the plurality of projector apparatuses. That is, a target luminance is calculated for each projector apparatus.

The control apparatus 5 further includes a luminance correction coefficient calculating unit 60 that calculates luminance correction coefficients for correcting luminance based on the geometry information stored in the geometry information storage unit 52, the luminance information stored in the luminance information storage unit 54, and information on the minimum value target luminance calculated by the minimum value target luminance calculating unit 58, and the difference value target luminance calculated by the difference value target luminance calculating unit 59, and a luminance correction coefficient storage unit 61 that is a storage region that temporarily stores the luminance correction coefficients calculated by the luminance correction coefficient calculating unit 60.

The luminance correction coefficient calculating unit 60 determines, based on the minimum value target luminance and the difference target luminance of the image region, allocations of luminance for the projected images of respective projector apparatuses, as the luminance correction coefficients.

The control apparatus 5 also includes an input pixel value calculating unit 62 that determines the target projected luminance for the projected image of each projector apparatus based on the luminance correction coefficient calculated by the luminance correction coefficient calculating unit 60, the minimum value target luminance information and the difference value target luminance information, and calculates an input pixel value of each pixel of an image to be projected by each projector apparatus based on the determined target projected luminance, the geometry information, the minimum value target luminance information, and the difference value target luminance information.

The input pixel value calculating unit 62 determines the target projected luminance of the projected image of each projector apparatus based on the luminance correction coefficient determined by the luminance correction coefficient calculating unit 60, the minimum value target luminance, and the difference value target luminance. In addition, the input pixel value calculating unit 62 determines the input pixel values for respective pixels of an image to be projected by each projector apparatus based on the determined target projected luminance, the position information, and the luminance information.

The control apparatus 5 also includes a signal supplying unit 63 that generates control signals that control the projector apparatuses and image signals, based on the input pixel values calculated by the input pixel value calculating unit 62, and supplies the signals to the respective projector apparatuses.

The signal supplying unit 63 receives projector identification numbers of projector apparatuses as supplying targets and the input image data to be supplied from the input pixel value calculating unit 62, and supplies image signals to the corresponding N projector apparatuses 1-1 to 1-N. In the present embodiment, the case where N=35 is described. The projector apparatuses 1-1 to 1-N respectively include the nonuniform magnification optical units 7-1 to 7-N. The respective constructions of the nonuniform magnification optical units 7-1 to 7-N are the same as the nonuniform magnification optical unit described above with reference to FIGS. 10A and 10B. The projector apparatuses 1-1 to 1-N adjust the luminance based on the image signals supplied from the signal supplying unit 63 and project an image onto the screen 2 via the nonuniform magnification optical units 7-1 to 7-N.

Next, an example of image processing by the control apparatus 5 will be described with reference to FIGS. 13 to 17.

FIG. 13 shows a pixel position in an image projected onto the screen 2.

Hereinafter, a region, aside from the edge portions of the screen 2, where light from the respective projector apparatuses is superimposed (for example, a region where light from four different projector apparatuses is superimposed) is referred to as the "image presentation region".

XY coordinate axes are set on the screen 2 and the position of the origin (0,0) is determined. For this reason, pixel positions on the screen 2 are uniquely defined relative to the origin. When a desired image is projected onto the image presentation region, the positions that correspond to the pixels that construct the image projected onto the screen 2 are expressed as the pixel positions (X,Y). Here, the position of a pixel 8a included in an enlarged region 8 produced by enlarging a part of the image projected on the screen 2 is determined as the pixel position (X,Y). In the present embodiment, the pixel 8a is projected by pixels in images projected by four adjacent projector apparatuses.

FIG. 14 is a diagram useful in explaining an example of various variables used by the image projecting system 10 for the pixel position (X,Y) found in FIG. 13.

(1) First Calibration: Calculate Correspondence Between ($x_k$, $y_k$) and (X,Y)

Here, the total number of projector apparatuses that project low-resolution pixels onto the pixel position (X,Y) is set as n and the following description will focus on the $k^{th}$ projector apparatus out of such n projector apparatuses.

Here, for the $k^{th}$ projector apparatus that projects light on the pixel position (X,Y) out of the total of N projector apparatuses, the pixel position on each plane corresponding to the pixel position (X,Y) is expressed as the "corresponding pixel position ($x_k$,$y_k$)".

Here, the correspondence between the number k for identifying a projector apparatus and an ordinal number of the projector apparatus out of the total of N projector apparatuses present in the system will differ depending on the pixel positions (X,Y). The relationships shown by the relational expressions (1) to (4) for the pixel position (X,Y) in a projected image and the corresponding pixel position ($x_k$,$y_k$) on the R plane, the G plane, and the B plane projected by the respective projector apparatuses are measured in advance.

$$X = f_x(x_k, y_k, k) \tag{1}$$

$$Y = f_y(x_k, y_k, k) \tag{2}$$

$$x_k = g_x(X, Y, k) \tag{3}$$

$$y_k = g_y(X, Y, k) \tag{4}$$

X, Y, $x_k$, and $y_k$ are functions that are uniquely determined for every combination of a pixel position (X, Y) and a projector apparatus number k. Such functions (X, Y, $x_k$, and $y_k$) are referred to as the "geometry information" mentioned earlier. Note that Expression (1) and Expression (3), and Expression (2) and Expression (4) are inverse functions.

(2) Second Calibration: Calculate Luminance for Pixel Position (X,Y) on the Screen 2 for Input Pixel Value The luminance to be observed at the pixel position (X,Y) on the screen when the pixel value $i_k$ is inputted on the $p^{th}$ plane of a panel of the $k^{th}$ projector apparatus (for a color image, one of the R plane (p=0), G plane (p=1), B plane (p=2)) is set as $l_k$, and the relationships shown by the relational expressions (5) and (6) are measured in advance.

$$l_k = h(X, Y, k, p, i_k) \tag{5}$$

$$i_k = h^{-1}(X, Y, k, p, l_k) \tag{6}$$

$l_k$, $i_k$ are functions that are uniquely determined for every combination of a pixel position (X,Y), a projector apparatus number k for identifying an individual projector apparatus, and a plane number p. Note that Expressions (5) and (6) are inverse functions.

These functions ($l_k$,$i_k$) are referred to as the "luminance information" mentioned earlier. According to Expression (5), when the values 0 (minimum output), 1, 2, 3, . . . , 255 (maximum output) are inputted into the corresponding pixel positions $(x_k, y_k)$ on the R plane, the G plane, and the B plane, the brightness of the measured pixel position (X,Y) is found in candelas.

For the pixel position (X,Y), the luminance L of the pixel position is the total of the projected luminance of every projector apparatus that projects light onto such pixel position. This is expressed in Expression (7).

$$L = \Sigma_k \ell_k \quad (7)$$

The target luminance to be projected onto the pixel position (X,Y) on the screen is expressed as $L_T$ and is calculated by the input pixel value calculating unit 62. $L_T$ is calculated according to Expression (8) using a pixel value I of the presentation image at such position and a gamma value γ set in advance at an appropriate value. The gamma value is set in advance so that the value calculated by Expression (8) falls within the range of a maximum value and a minimum value for the luminance of the projected image produced by a plurality of projector apparatuses.

$$L_T = I^\gamma \quad (8)$$

At the pixel position (X,Y), both light from low-resolution projector apparatuses and light from high-resolution projector apparatuses are superimposed. If the luminance produced by adding up the light from the low-resolution projector apparatuses is expressed as $L_{T1}$ and the luminance produced by adding up the light from the high-resolution projector apparatuses is expressed as $L_{T2}$, the pixel values to be inputted into the respective projector apparatuses are calculated so that the result of adding $L_{T1}$ and $L_{T2}$ is the target luminance $L_T$. Hereinafter, in FIG. 14, the total $L_{T1}$ of the luminance of the low-resolution projector apparatuses will be described as the target luminance $L_T$.

There are a plurality of combinations of input pixel values $i_k$ (where k=1, 2, . . . , m) for the projector apparatuses that are required to realize the target luminance $L_T$. For this reason, it is necessary to determine allocations of the luminance for respective projector apparatuses, that is, how much of the luminance $L_T$ is to be projected by each projector apparatus. Such allocations are referred to as the "luminance correction coefficients". The luminance correction coefficient $w_1$ is expressed as shown in Expression (9). Each luminance correction coefficient $w_1$ is expressed as a real number from 0 to 1, and the total of the luminance correction coefficients $w_1$ is 1. As one example, the luminance correction coefficients $w_1$ for the luminance of the images to be outputted by four projector apparatuses are determined as 0.125, 0.375, 0.25, and 0.25.

$$L_T = \sum_k w_1(X, Y, k, p) L_T \quad (9)$$

$$\sum_k w_1(X, Y, k, p) = 1 \quad (10)$$

Third Calibration: Calculate Allocation of Luminance for Each Projector Apparatus A luminance correction coefficient is a uniquely determined constant for every combination of a pixel position (X,Y), a projector apparatus number k, and a plane number p. The luminance correction coefficients are determined in advance in accordance with a maximum value $l_{k,max}$ that can be produced by each projector apparatus at each position (X, Y) on the screen or in accordance with the maximum value $l_{k,max}$ and the target luminance $L_T$. For example, when simple proportional allocations are used in accordance with the luminances of the respective projector apparatuses, the luminance correction coefficients are determined using Expressions (11) and (12).

For the pixel position (X,Y), suppose that the area in the projected image of a low-resolution pixel has a size where m pixels in the presentation image are grouped in the vertical and horizontal directions, that is, an area equivalent to m×m pixels. In this case, a process is carried out that divides the pixels in the presentation image into m×m pixel blocks.

$$\ell_{k,max} = h(X, Y, k, p, 255) \quad (11)$$

$$w(X, Y, k, p) = \frac{\ell_{k,max}}{\sum_k \ell_{k,max}} \quad (12)$$

In the image projecting system according to the present embodiment, light projected from a plurality of projector apparatuses is incident on each pixel on the screen 2. The intensity of the projected light from each projector apparatus can be set with some freedom (i.e., a variety of intensity allocations are conceivable). Such freedom can be appropriately determined in accordance with the conditions and intended purpose. To determine the freedom, the luminance correction coefficients are calculated as one of the design parameters of the image projecting system. In the present embodiment, for an arbitrary pixel in the image region on the screen, the allocations of the luminance in the images of respective projector apparatuses that project light onto such pixel can be freely changed based on the luminance correction coefficients.

For example, when the target luminance of the pixel position (X,Y) is 800 candelas, assume a case where the output of a first projector apparatus is weak and the light quantity only 100 candelas is obtained. In such case, it is possible to achieve the target luminance of 800 candelas by setting the light quantity of a second projector apparatus for 230 candelas, the light quantity of a third projector apparatus for 230 candelas, and the light quantity of a fourth projector apparatus for 240 candelas. In this way, by supplementing the luminance using a plurality of projector apparatuses, it is possible to avoid a situation where the luminance falls in a part of the image on the screen.

The pixel value $i_k$ to be inputted into the $k^{th}$ projector apparatus for a target luminance $L_T$ is calculated according to Expressions (13) and (14).

$$\ell_k = w(X, Y, k, p) L_T \quad (13)$$

$$i_k = h^{-1}(g_x(X, Y, k), g_y(X, Y, k), k, p, \ell_T) \quad (14)$$

Here, when $i_k$ is a real number that includes a decimal point, such value is rounded to the nearest integer. The value $i_k$ is also determined so as not to exceed the range where $0 \leq i_k \leq 255$.

In the same way as described above, the total number of projector apparatuses that project high-resolution pixels is set at n' and the pixel value for the k'th projector apparatus out of such projector apparatuses is calculated. The luminance cor rection coefficients for a projector apparatus that projects high-resolution pixels are set as $w_2$ (X, Y, k', p).

$$\sum_{k'} w_2(X, Y, k', p) = 1 \qquad (15)$$

The procedure for calculating the pixel value $i_{k'}$ to be inputted in the $k'^{th}$ projector apparatus is the same as the procedure for calculating the pixel value $i_k$ to be inputted in the $k^{th}$ projector apparatus.

The target luminances will now be described with reference to FIGS. 15A to 15C. FIGS. 15A to 15C show an example of a luminance distribution for the setup positions of the projector apparatuses 1-1 to 1-4.

The target luminance is uniquely calculated for each position (i.e., each pixel) on the screen from a pixel value in the input image data to be projected using the image projecting system.

FIG. 15A shows a luminance distribution 31-1 on the screen 2 for a case where each projector apparatus projects at maximum output and a luminance distribution 31-2 on the screen 2 for a case where each projector apparatus projects at minimum output.

FIG. 15B shows an example of the luminances of the image to be presented on the screen 2.

If the luminance of an image 32 to be presented is within the range of the minimum output and the maximum output for the luminance projected by the projector apparatuses, it is possible to project arbitrary luminances. This means that it is possible to calculate the luminance to be projected by each projector apparatus in accordance with the image 32 to be presented. The luminances to be projected that are determined by the image 32 to be presented are expressed as "target luminances". The luminance distribution 31-3 is a luminance distribution that expresses target luminances.

FIG. 15C shows an example of calculating target luminances.

A horizontal line 33 at an arbitrary position is designated for the image 32 to be presented. The pixel values to be determined from this horizontal line 33 are determined as shown by a pixel value distribution 34. By multiplying the pixel value distribution 34 by a gamma value set in advance, the target luminances $L_T$ (i.e., the respective pixel values in the image data) are calculated.

The expression "gamma" refers to a value for converting the respective pixel values (0 to 255) in the image data to luminance values (candela values in a range of several tens to several tens of thousands) observed on the screen 2. In the image projecting system 10 according to the present embodiment, the gamma value is calculated in advance at an appropriate value so as to fall within the range of the luminance distribution on the screen when each projector apparatus produces its minimum output and the luminance distribution on the screen when each projector apparatus produces its maximum output, that are obtained by the first to third calibrations.

FIG. 16 is a flowchart showing the overall flow of processing by the control apparatus 5 to present an image.

First, the geometry information calculating unit 51 measures the geometry information $(f_x, f_y, g_x, g_y)$ that is a projected position of each projector apparatus (step S1). This process corresponds to the first calibration described earlier.

Next, the luminance information calculating unit 53 calculates the luminance information (h) that is the projected luminance of each projector apparatus (step S2). This process corresponds to the second calibration described earlier.

After this, the luminance correction coefficient calculating unit 60 generates the luminance correction coefficients $w_1$ (X,Y,k,p) and the luminance correction coefficients $w_2$ (X,Y, k',p) (step S3). This process corresponds to the third calibration described earlier.

Finally, the input pixel value calculating unit 62 carries out an image presentation process that adjusts the luminance of the projected image (step S4), before the processing ends.

FIG. 17 is a flowchart showing one example of a calculation process for the input pixel values.

First, the input pixel value calculating unit 62 starts processing for one of the R, G, and B planes (step S11). That is, by cyclically setting the value of p in the order 0, 1, and 2, processing is carried out having selected one of the R plane, the G plane, and the B plane in that order.

Next, the block dividing unit 57 divides the image data into blocks (step S12).

Here, the expression "block" refers to the size of one pixel in a low-resolution projected image (i.e., projected image of the minimum value pixels). Since the size of one pixel in a high-resolution projected image (i.e., projected image of the difference value pixels) is smaller than the size of one pixel in a low-resolution projected image, the size of one pixel in the high-resolution projected image will differ from the size of one block. To determine the input pixel values of respective pixels in a high-resolution projected image, it is necessary to consider, at the same position as such pixel, the input pixel values for one pixel in the low-resolution projected images that are outputted over a wider range. To do so, the image is divided into blocks and then the input values of the respective pixels are determined.

After this, one of the divided blocks is selected and predetermined processing is carried out in order (step S13).

Next, the minimum value in the selected block is calculated for the pixel values in the presentation image (step S14). After this, a value produced by multiplying the minimum value by the gamma value is calculated (step S15). Such value is called the "minimum value target luminance". The processing in steps S16 to S20 is then repeated for every projector apparatus that projects a low-resolution pixel (step S16).

First, the value produced by multiplying the minimum value target luminance by a luminance correction coefficient $w_1$ is calculated (step S17). After this, the input pixel value $i_k$ that is closest to the value produced by multiplying the minimum value target luminance by the luminance correction coefficient $w_1$ is calculated (step S18).

Next, the input pixel value $i_k$ is outputted to the corresponding projector apparatus (step S19) and it is judged whether such projector apparatus is the final projector apparatus that projects low-resolution pixels (step S20). If there is a following projector apparatus, the processing returns to step S16 and the processing thereafter is repeated.

When it is judged in the processing in step S20 that the final projector apparatus has been reached, the processing that calculates the difference value target luminance for each pixel in the block is commenced (step S21). After this, a value produced by multiplying the pixel value in the presentation image at the corresponding pixel position by the gamma value is calculated (step S22).

Next, a value produced by subtracting the minimum value target luminance from the value produced by multiplying the pixel value in the presentation image at the corresponding pixel position by the gamma value is calculated (step S23). This value is referred to as the "difference value target luminance". The processing in step S24 to S28 is then repeated for every projector apparatus that projects a high-resolution pixel (step S24).

First, a value produced by multiplying the difference value target luminance by a luminance correction coefficient $w_2$ is calculated (step S25). After this, the input pixel value $i_k'$ that is closest to the value produced by multiplying the difference value target luminance by the luminance correction coefficient $w_2$ is calculated (step S26).

Next, the input pixel value $i_k'$ is outputted to the corresponding projector apparatus (step S27) and it is judged whether such projector apparatus is the final projector apparatus that projects high-resolution pixels (step S28). If there is a following projector apparatus, the processing returns to step S24 and the processing thereafter is repeated.

When it is judged in the processing in step S28 that the final projector apparatus has been reached, it is then judged whether the pixel is the final pixel in the divided block (step S29). When the pixel is not the final pixel, the processing returns to step S21 and the processing thereafter is repeated.

On the other hand when it has been judged in step S29 that the pixel is the final pixel, it is then judged whether the selected block is the final block (step S30). When the block is not the final block, the processing returns to step S13 and the processing thereafter is repeated.

On the other hand, when it is judged in step S30 that the block is the final block, it is then judged whether the selected plane is the final plane (for example, the B plane) (step S31). When the selected plane is not the final plane, the processing returns to step S11 and the processing thereafter is repeated. On the other hand, when the selected plane is the final plane, the processing ends.

FIG. 18 shows examples of images projected by the respective projector apparatuses.

FIG. 18 shows what type of images are projected by the projector apparatuses that project the first nonuniform projected image 6-1 to the fourth nonuniform projected image 6-4 shown in FIG. 11D.

The high-resolution region 9 is constructed by superimposing a high-resolution image projected by the projector apparatus 1-1 with low-resolution images projected by the projector apparatuses 1-2 to 1-5.

FIG. 19 shows examples of pixel values (luminances) of pixels to be projected by the respective projector apparatuses.

The image data inputted into the respective projector apparatuses will now be described. First, the block dividing unit 57 divides the image data to be presented into blocks of an appropriate size. In FIG. 19, the image data is divided into 2×2 blocks, but it is also possible to divide the image data into blocks of an arbitrary size, such as 3×3 or 4×4 blocks.

After, this, the pixel values in the blocks are resolved into two totals that are the minimum value and the difference value, and pixels having the pixel values corresponding to the minimum value are presented as low-resolution projected images (that are magnified to a wide range). On the other hand, pixels having the pixel values that correspond to the difference values are presented as a high-resolution projected image. Here, although the pixel values are simply added or subtracted in FIG. 19, in reality to present a luminance that corresponds to the desired pixel value, it is necessary to convert the values to pixel values that take into consideration the gamma value of each projector apparatus.

For example, when the pixel values to be presented for a block are 150, 100, 175, and 100, the minimum value is calculated as 100. After this, for the high-resolution image 6-1 to be projected by the projector apparatus 1-1, the differences between the pixel values to be presented and the minimum value of 100 are calculated.

The minimum values of the pixel values to be presented in the block are 100, 100, 100, and 100. For this reason, the minimum values of the pixel values to be presented are set at values that are equally divided among the low-resolution images 6-2 to 6-5 projected by the projector apparatuses 1-2 to 1-5.

After this, by superimposing the high-resolution image and the low-resolution images, it is possible to project an image onto the screen 2 with the desired pixel values (i.e., the desired luminances).

FIG. 19 shows a case where one high-resolution projected image and four low-resolution projected images are present at any arbitrary point on the screen. However, there is no effective limit on the number of projector apparatuses that project the minimum value pixels and the difference value pixels. It is fundamentally possible for any number of projector apparatuses to project the difference value pixels and for any number of projector apparatuses to project the minimum value pixels. If the width of the projected region of a (high-resolution) projected image of the difference value pixels is also larger than the interval at which the adjacent projector apparatuses are disposed, adjacent high-resolution projected images will overlap one another. When this happens, a plurality of high-resolution projected images will be projected onto one point on the screen. Note that although no detailed description is given for the case where there are a plurality of projected images of the difference value pixels, in such case also, there are no effective limits on the number of projectors that project the minimum value pixels and the difference value pixels in the image projecting system according to the present invention.

The image projecting system 10 according to the present embodiment aims to display an image projected with high luminance and without fluctuations in luminance. Also, in the image projected using the image projecting system 10, the respective pixels are constructed by light projected by a plurality of projector apparatuses. Here, an example that luminance is corrected by the image projecting system 10 will be described with reference to FIGS. 20A and 20B.

FIGS. 20A and 20B show examples of the luminances of images (white monochrome images) projected onto the screen by seven projector apparatuses (referred to as the first to seventh projector apparatuses).

FIG. 20A shows examples of the luminances of images projected by the respective projector apparatuses before the luminance characteristics are matched. In this example, the luminance of the image projected by the fifth projector apparatus has the worst characteristics.

FIG. 20B shows examples of the luminances of images projected by the respective projector apparatuses after the luminance characteristics have been matched. The luminances before the luminance characteristics are matched are shown by broken lines for comparison purposes.

The images projected by the first to seventh projector apparatuses are superimposed with the images projected by the respective adjacent projector apparatuses. This means that the overall luminance of an image is higher than that of an image projected using existing projector apparatuses. Also, the other projector apparatuses aside from the fifth projector apparatus have a higher luminance than the target luminance. This means that by lowering the output of other projector apparatuses aside from the fifth projector apparatus in accordance with the target luminance, it is possible to achieve a uniform luminance for the entire image projected on the screen 2.

As shown in FIGS. 20A and 20B, the image projecting system 10 does not need to match the luminances of images to the luminance of the image projected by the projector apparatus with the worst characteristics. That is, even if a projector apparatus with poor characteristics is present, it is possible to supplement insufficient luminance using the images projected by other projector apparatuses.

Next, the result of measuring fluctuations in characteristics (colors) in the region where images projected by the projector apparatuses are superimposed will be described. Here, an example will be described where the color values x, y were measured for a case where four projector apparatuses with the same manufacturer and the same model number were used.

FIGS. 21A to 21D are representations of a color meter-side of the screen when images projected using the projector apparatuses are superimposed. In FIGS. 21A to 21D, the colors in the image projected onto the screen are measured using a color meter 9.

Figure 21A:
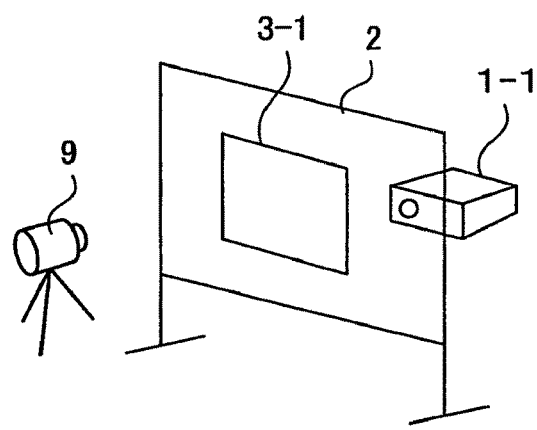

FIG. 21A shows an example of a projected image in the case where one projector apparatus (the projector apparatus 1-1) projects an image onto the screen 2. Here, the image 3-1 is projected onto the screen 2.

Figure 21B:
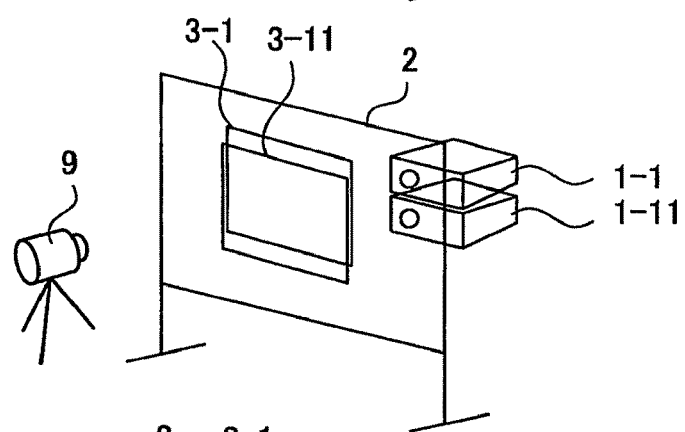

FIG. 21B shows an example of projected images in the case where two projector apparatuses (the projector apparatuses 1-1, 1-11) project images onto the screen 2. Here, the images 3-1, 3-11 are projected onto and superimposed on the screen 2.

Figure 21C:
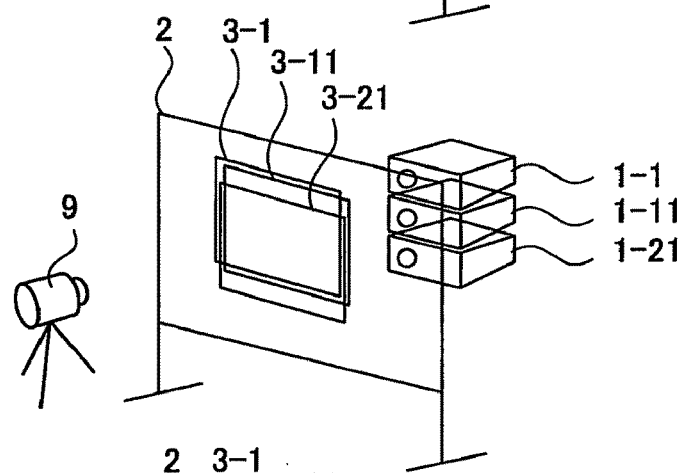

FIG. 21C shows an example of projected images in the case where three projector apparatuses (the projector apparatuses 1-1 to 1-21) project images onto the screen 2. Here, the images 3-1 to 3-21 are projected onto and superimposed on the screen 2.

Figure 21D:
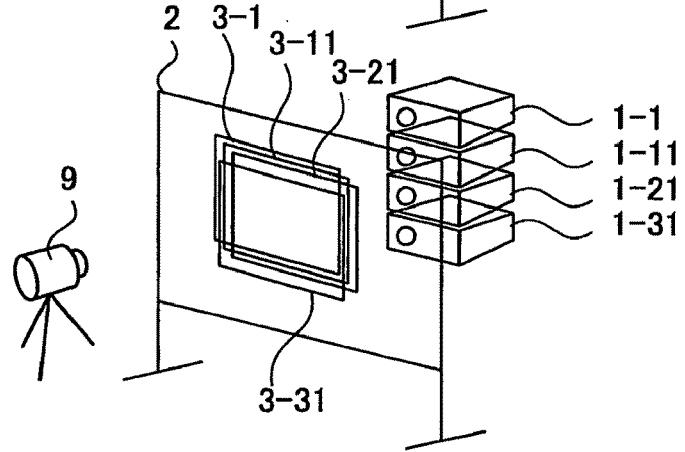

FIG. 21D shows an example of projected images in the case where four projector apparatuses (the projector apparatuses 1-1 to 1-31) project images onto the screen 2. Here, the images 3-1 to 3-31 are projected onto and superimposed on the screen 2.

The same image signal ((R,G,B)=(200,200,200)) was inputted into every pixel of every projector apparatus shown in FIGS. 21A to 21D. The color meter 9 was used to measure the distribution of the color values x, y in an XYZ color system in the projected images for the respective cases where images were projected by one to four projector apparatuses. The colors inside the white frames in FIGS. 22A to 22D were measured.

FIGS. 22A to 22D show examples of projected images in a case where one to four projector apparatuses project images onto the screen 2.

Figure 22A:
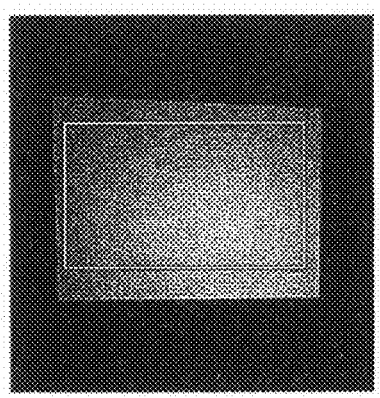

FIG. 22A shows an example of a projected image in the case where one projector apparatus (the projector apparatus 1-1) projects an image onto the screen 2.

Figure 22B:
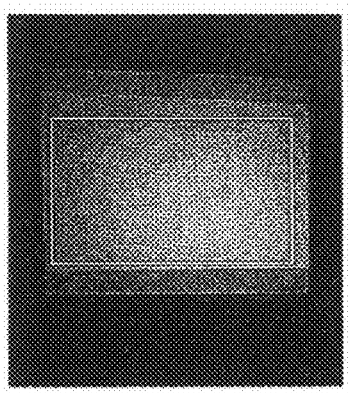

FIG. 22B shows an example of a projected image in the case where two projector apparatuses (the projector apparatuses 1-1, 1-11) project images onto the screen 2.

Figure 22C:
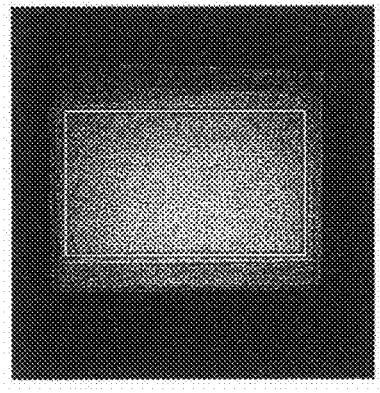

FIG. 22C shows an example of a projected image in the case where three projector apparatuses (the projector apparatuses 1-1 to 1-21) project images onto the screen 2.

Figure 22D:
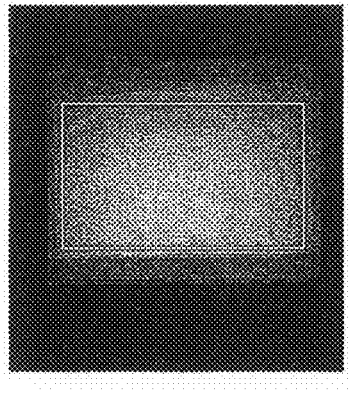

FIG. 22D shows an example of a projected image in the case where four projector apparatuses (the projector apparatuses 1-1 to 1-31) project images onto the screen 2.

From FIGS. 22A to 22D, it can be understood that even though there are fluctuations in the color and luminance even when one projector apparatus is used, by superimposing images projected by a plurality of projector apparatuses, it is possible to make the color and luminance more uniform.

FIG. 23 is a graph in which the standard deviations of the color values x, y in the XYZ color system shown in FIGS. 22A to 22D have been calculated.

From FIG. 23, it can be understood that the distributions of the color values x, y in the XYZ color system converge as the number of projector apparatuses increases (or in other words, as the number of superimposed images increases).

Since the standard deviations of the color values are large when there is one projector apparatus as shown in FIG. 22A, there are large fluctuations in color. However, it can be confirmed that as the number of projector apparatuses increases, the standard deviations of the color values x,y fall and there are reduced fluctuations in the colors of the image projected on the screen.

In addition, tests were carried out using a large number of projector apparatuses with the same manufacturer and the same model number to simulate to what extent colors will be made uniform when images projected by adjacent projector apparatuses are superimposed. Such tests and the measurement results thereof will now be described with reference to FIGS. 24 to 29B.

FIG. 24 is a representation showing how colors are measured.

The same image signal ((R,G,B)=(200,200,200)) is inputted into every pixel of every projector apparatus.

The color distribution of the projected image was measured for each projector apparatus and the average color in the periphery of the center region 8 of the projected image was calculated.

In the present embodiment, measurement was carried out for 104 projector apparatuses.

FIGS. 25A to 29B show fluctuations in the color of images projected on the screen 2 by projector apparatuses into which the same image signal is inputted. A state where the projector apparatuses are disposed in a grid is supposed (the color data of respective projector apparatuses that have been measured is randomly disposed in a grid), and average values for the data of a projector apparatus and the adjacent data thereto were calculated. The standard deviation for all of the average values was also calculated. Such calculations were carried out for four, nine, sixteen, and twenty five adjacent projector apparatuses.

FIG. 25B shows the result of calculating the color values x, y for a case where images are not superimposed (FIG. 25A).

In FIGS. 25A to 29A, the circles disposed in a grid show the layout positions of the projector apparatuses. In addition, the regions surrounded by solid lines and broken lines show the ranges for which the average values were calculated.

FIG. 25B shows the distribution of the calculated average values.

FIG. 26B shows the result when the average values of the color values x, y were calculated for four adjacent projector apparatuses (FIG. 26A).

FIG. 26B shows the distribution of the average values of the color values x, y.

FIG. 27B shows the result when the average values of the color values x, y were calculated for nine adjacent projector apparatuses (FIG. 27A).

FIG. 27B shows the distribution of the average values of the color values x, y.

FIG. 28B shows the result when the average values of the color values x, y were calculated for sixteen adjacent projector apparatuses (FIG. 28A).

FIG. 28B shows the distribution of the average values for the color values x, y.

FIG. 29B shows the result when the average values of the color values x, y were calculated for twenty-five adjacent projector apparatuses (FIG. 29A).

FIG. 29B shows the distribution of the average values for the color values x, y.

FIG. 30 is a graph showing the relationship between the standard deviations of the color values x, y in a XYZ color system shown in FIGS. 25B to 29B and the number of projector apparatuses whose images are superimposed.

FIG. 30 shows that by superimposing the light from peripheral projector apparatuses, it is possible to reduce the fluctuations in the characteristics of the projector apparatuses. By superimposing images produced by just four projector apparatuses in the periphery, the fluctuations in color are reduced to around half. Normally, when n values are taken from a population with a standard deviation of a, the standard deviation of the averages of n values will satisfy the relationship σ/√n given as a general expression. The result shown in FIG. 30 conforms to this general expression for standard deviations.

In addition, it can be understood that compared to the standard deviation of an image projected by one projector apparatus, as the number of projector apparatuses whose projected images, are superimposed increases, the standard deviation of the color values x, y converges on a low value. For this reason, it can be said that as the number of projector apparatuses whose projected images are superimposed increases, there is a reduction in the fluctuations in color.

However, when the projected images projected by twenty-five projector apparatuses are superimposed, for example, compared to an existing projection method, it is necessary for each individual projector apparatus to project onto a region with a wider area. To do so, the following methods may be used.

The distance (projection distance) between the screen 2 and the projector apparatus is increased.

A wider angle lens is attached to the projector apparatus.

Also, when projected images are superimposed, if the projected positions are not carefully adjusted, the pixels from a plurality of projector apparatuses will be superimposed at displaced positions, resulting in a fall in the perceived resolution of the projected images. This means it is necessary to maintain the resolution of the projected image.

Here, examples of images produced by superimposing minimum value pixels and difference value pixels will now be described with reference to FIGS. 31A to 32B.

FIG. 31A and 31B are examples of projected images.

FIG. 31A shows an example of a desired projected image.

This example of a projected image is a photograph where an image has been projected by one projector apparatus and such image has been photographed using a camera. The present embodiment aims to make it possible to display the image shown in FIG. 31A on the screen 2 by superimposing low-resolution images and high-resolution images.

FIG. 31B shows an example of a low-resolution projected image (projected image of minimum value pixels).

This example projected image is also produced by photographing the image projected by one projector apparatus using a camera. The input image for one projector apparatus is divided into blocks of 2×2 pixels, the minimum value out of the pixel values in each block (a total of four pixels) is calculated, and then all of the pixels in such block are replaced with the pixel value that is the minimum value. This process is carried out independently for each of the R, G, and B planes.

FIGS. 32A and 32B show examples of projected images.

FIG. 32A shows an example of a high-resolution projected image (projected image of difference value pixels).

This example of a projected image is a photograph where pixel values calculated by carrying out predetermined processing are inputted into a projector apparatus as an input image and the images projected by such projector apparatus has been photographed using a camera.

To project the image shown in FIG. 32A, for each pixel in a 2*2 pixel block, the pixel value in the input image is multiplied by a gamma value that is unanimously determined in advance for the entire screen. After this, from such multiplied pixel value, a value produced by also multiplying the minimum pixel value in the block calculated earlier by the gamma value is subtracted and the resulting value (i.e., the target luminance) is set as the input image. The input pixel value for the projector apparatus is calculated from a relationship, which is measured in advance, between input pixel values of the projector apparatus and the resulting luminance values observed on the screen so that the luminance on the screen when the projector apparatus projects the image becomes equal to the value produced by the subtraction.

FIG. 32B shows an example where the projected images shown in FIG. 31B and FIG. 32A have been superimposed. This example of a projected image is a photograph where pixel values calculated by carrying out predetermined processing are inputted into projector apparatuses as input images and the images projected by such projector apparatuses have been photographed using a camera.

In this way, it can be understood that by projecting and superimposing the images of the minimum value pixels and the difference value pixels, an image is displayed in the same way as when the input image shown in FIG. 31A is projected as it is.

The image projecting system 10 according to the first embodiment described above is characterized by superimposing projected light of a plurality of different projector apparatuses at every part of the image on the screen 2. Also, the nonuniform magnification optical units 7-1 to 7-N are static mechanisms, and once such units have been set up, there is no need to control the operation thereof. This results in the effect that maintenance of the respective apparatuses is simple.

By constructing each pixel with light from a plurality of projector apparatuses, fluctuations in the characteristics (luminance) between projector apparatuses are averaged out. This means that even if there is a projector apparatus with poor characteristics, it is possible to supplement any insufficiency in luminance using other projector apparatuses used to project light onto the same pixels as the projector apparatus with poor characteristics. In addition, compared to existing technology, it is possible to use the resources of the projector apparatuses more effectively. That is, it is possible to project higher-quality images.

Next, a second embodiment of the present invention will be described with reference to FIGS. 33 to 35. The present embodiment will also be described by way of an example of an image projecting system 70 that is capable of displaying high-definition images on a screen by superimposing images projected using a plurality of projector apparatuses. The present embodiment is characterized by projecting the pixels (light, luminance) corresponding to the minimum value and the difference values shown in the first embodiment described above using separate projector apparatuses.

The control apparatus 5 supplies image signals determined based on the difference value luminance information to k projector apparatuses (where k is an integer that is one or higher) out of m projector apparatuses, and supplies image signals determined based on the minimum value luminance information to (m−k) projector apparatuses that differ to the k projectors.

FIG. 33 shows an example of a case where images of minimum value pixels and difference value pixels are projected by different projector apparatuses, respectively. The projector apparatuses that project light for the minimum value pixels and the projector apparatuses that project light for the difference value pixels do not need to be the same types and/or have the same characteristics. For example, it is possible to effectively use projector apparatuses in accordance with the characteristics and uses of the projector apparatuses, such as by using projector apparatuses with low resolution but a high luminance as the projector apparatuses that project light for the minimum value pixels and using projector apparatuses with high resolution but a low luminance as the projector apparatuses that project light for the difference value pixels.

FIG. 34 shows an example layout of the projector apparatuses.

The total number of projector apparatuses is set as N. Here, m projector apparatuses project images of the minimum value pixels and (N−m) projector apparatuses project images of the difference value pixels onto the screen 2. As shown in FIG. 7, the projector apparatuses are laid out in a grid when looking from in front.

However, the projector apparatuses that project the images of the minimum value pixels and the projector apparatuses that project the images of the difference value pixels are laid out at different positions in the depth direction. That is, the projector apparatuses 1-(m+1) to 1-N that project the images of the difference value pixels are respectively disposed between the projector apparatuses 1-1 to 1-m that project the images of the minimum value pixels. By using this layout, it is possible to project and superimpose the high-resolution images also using a plurality of projector apparatuses. For example, when the luminance of the projected high-resolution pixels is insufficient compared to the projected low-resolution pixels, by superimposing images projected by a plurality of projector apparatuses when projecting the high-resolution pixels also, it is possible to improve the luminance of the projected images.

FIG. 35 shows an example construction of the image projecting system 70 that is constructed of a plurality of projector apparatuses. The control apparatus 5 supplies image signals to N projector apparatuses 1-1 to 1-N.

However, in the image projecting system 70, the projecting of high-resolution pixels and the projecting of low-resolution pixels are carried out by different projector apparatuses. Note that in this second embodiment, detailed description of parts that are the same as those in the image projecting system 10 according to the first embodiment described earlier is omitted.

The image projecting system 70 according to the present embodiment includes N projector apparatuses, the screen 2 that is a display screen for projected images, the observation unit 4 that observes the images projected onto the screen 2, and the control apparatus 5 that receives information observed by the observation unit 4 and supplies image signals to the respective projector apparatuses. Out of the N projector apparatuses, the first projector apparatus 1-1 to mth projector apparatus 1-m are set as the projector apparatuses for projecting low-resolution images (i.e., images of the minimum value pixels). The (m+1) th projector apparatus 1-(m+1) to the $N^{th}$ projector apparatus 1-N are set as the projector apparatuses for projecting high-resolution images (i.e., images of the difference value pixels).

In the image projecting system 70 according to the second embodiment described above, by using different projector apparatuses to project the low-resolution images (images of minimum value pixels) and the high-resolution images (images of difference value pixels), it is possible to present projected images with high luminance and high resolution. For this reason, all of the projector apparatuses do not need to have the same quality. Even when the luminance performance of the projector apparatuses that project the low-resolution images (images of minimum value pixels) is inferior to the projector apparatuses that project the high-resolution images (images of difference value pixels) for example, it will be possible to supplement the luminance using a plurality of projector apparatuses, resulting in the effect that high-luminance projected images can be obtained.

Note that although the projector apparatuses that project the images of the minimum value pixels are laid out at deep positions (i.e., positions further from the screen 2) as shown in FIG. 34 in the description of the second embodiment, other layouts can be used. So long as light for projecting the images of the difference value pixels and light for projecting the images of the minimum value pixels is projected onto the entire screen 2, the same effects can be achieved even if the projector apparatuses have the same position in the depth direction or if the layout in the depth direction is the opposite to that shown in FIG. 34.

Next, a third embodiment of the present invention will be described with reference to FIGS. 36 to 39. The present embodiment will also be described by way of an example of an image projecting system 80 that is capable of displaying high-definition images on a screen by superimposing images projected using a plurality of projector apparatuses. The present embodiment is characterized by projecting images onto the screen by using projector apparatuses that project images of only R and B components and projector apparatuses that project images of only G components.

FIG. 36 shows examples of R, G, and B planes projected by the projector apparatuses.

In the present embodiment, only an image of the G components for which the human eye has the greatest sensitivity is projected by high-resolution projector apparatuses. The images of the R and B components are projected by a plurality of projector apparatuses so as to be superimposed on one another over a wide area. This is the same as the second embodiment described above if the images of the difference value pixels were replaced with the G components and the images of the minimum value pixels were replaced with the images of the R and B components.

FIG. 37 shows the example construction of an image projecting system 80 constructed of a plurality of projector apparatuses. The control apparatus 5 supplies the N projector apparatuses 1-1 to 1-N with image signals.

However, the image projecting system 80 is characterized by using different projector apparatuses for projecting the R and B planes and projecting the G plane. Note that in this third embodiment, detailed description of parts that are the same as those in the image projecting system 10 according to the first embodiment described above is omitted.

The image projecting system 80 according to the present embodiment includes N projector apparatuses, the screen 2 that is a display screen for projected images, the observation unit 4 that observes the images projected onto the screen 2, and a control apparatus 15 that receives information observed by the observation unit 4 and supplies image signals to the respective projector apparatuses.

The block dividing unit 57 divides an image based on the inputted image signal, which is composed of an R image, a G image, and a B image, into predetermined regions.

The control apparatus 15 includes an RB target luminance calculating unit 64 that calculates, as information on an "RB target luminance", the luminances of an R image and a B image, and a G target luminance calculating unit 65 that calculates, as information on a "G target luminance", the luminance of a G image, from predetermined regions (divided image regions) based on the inputted image signal that is constructed from the R image, the G image, and the B image and has been divided into predetermined regions by the block dividing unit 57.

The luminance correction coefficient calculating unit 60 determines, as the luminance correction coefficients, allocations of luminance for the projected images of the respective projector apparatuses for the RB luminance information and the G luminance information of the image region. The luminance correction coefficient storage unit 61 temporarily stores the determined luminance correction coefficients.

The input pixel value calculating unit 62 determines the target projected luminance of the projected image of each projector apparatus based on the luminance correction coefficients calculated by the luminance correction coefficient calculating unit 60, the RB luminance information, and the G luminance information, and calculates the pixel values of the respective pixels in the images to be projected by the respective projector apparatuses based on the determined target projected luminance, the position information described above, and the luminance information described above. The generated image signals are supplied from the signal supplying unit 63 to the respective projector apparatuses.

The control apparatus 15 supplies the image signals based on the RB luminance information to k projector apparatuses (where k is an integer of 1 or higher) out of the m projector apparatuses. The first projector apparatus 1-1 to the $m^{th}$ projector apparatus 1-m are set as the projector apparatuses for projecting the R and B planes.

The control apparatus 15 also supplies the image signals determined based on the G luminance information to (m−k) projector apparatuses that differ from the k projector apparatuses. The $(m+1)^{th}$ projector apparatus 1-(m+1) to the $N^{th}$ projector apparatus 1-N are set as the projector apparatuses for projecting the G plane.

FIG. 38 is a flowchart showing an example of calculation processing for input pixel values.

First, the block dividing unit 57 divides the image data into blocks (step S41). After this, one of the divided blocks is selected and processed in order (step S42).

Next, selection processing is carried out for the R plane and the B plane (step S43). After this, average values in each block are calculated for the pixel values on the selected R or B plane in the presentation image (step S44).

Next, values produced by multiplying the calculated average values by a gamma value are calculated (step S45). Such values are referred to as "RB target luminances". After this, the processing in steps S46 to S50 is repeated for every projector apparatus that projects the selected R or B plane (step S46).

First, values produced by multiplying the RB target luminances by luminance correction coefficients $w_3$ are calculated (step S47). The luminance correction coefficients $w_3$ are calculated in the same way as the luminance correction coefficients $w_1$ in the first embodiment described above. After this, the input pixel values $i_k$ that are closest to the values produced by multiplying the RB target luminances by the luminance correction coefficients $w_3$ are calculated (step S48).

Next, the input pixel values ik are outputted to the corresponding projector apparatus (step S49) and it is judged whether such projector apparatus is the final projector apparatus (step S50). If there is a following projector apparatus, the processing returns to step S46 and the processing thereafter is repeated.

When it is judged in the processing in step S50 that the final projector apparatus has been reached, it is then judged whether the plane is the final plane (step S51). When the final plane has not been reached, the processing returns to step S43 and the processing is repeated for the next plane.

On the other hand, when the final plane has been reached, the process that calculates the G target luminance for the respective pixels in the block is commenced (step S52). After this, values produced by multiplying the pixel values of the presentation image at the corresponding pixel positions by the gamma value are calculated (step S53). Such values are referred to as "G target luminances".

After this, the processing in steps S54 to S58 is repeated for every projector apparatus that projects pixels on the G plane (step S54).

First, values produced by multiplying the G target luminances by the luminance correction coefficient $W_4$ are calculated (step S55). The luminance correction coefficients $w_4$ are calculated in the same way as the luminance correction coefficients $w_2$ in the first embodiment described above. After this, the input pixel values $i_k'$ that are closest to values produced by multiplying the G target luminances by the luminance correction coefficients $w_4$ are calculated (step S56)

After this, the input pixel values $i_k'$ are outputted to the corresponding projector apparatus (step S57) and it is judged whether such projector apparatus is the final projector apparatus (step S58). If there is a following projector apparatus, the processing returns to step S54 and the processing thereafter is repeated.

When it is judged in the processing in step S58 that the final projector apparatus has been reached, it is then judged whether the pixel is the final pixel in the divided block (step S59). When the pixel is not the final pixel, the processing returns to step S52 and the processing thereafter is repeated.

On the other hand, when it is judged in step S59 that the pixel is the final pixel, it is judged whether the selected block is the final block (step S60). When the selected block is not the final block, the processing returns to step S42 and the processing thereafter is repeated. On the other hand, when it is judged in step S60 that the selected block is the final block, the processing ends.

FIGS. 39A to 39C show example displays of projected images.

Here, it is shown to what extent the observed resolution is improved by applying low pass filters for R components, B components, and G components to the original image, images where the frequency bandwidth is reduced are generated, and then by merely restoring the frequency bandwidth of G components to the original frequency bandwidth.

FIG. 39A shows an example display of an original image.

FIG. 39B shows an example display of a projected image where the frequency bandwidths of the R, G, B components have been reduced to half from the original image.

FIG. 39C shows an example display of a projected image where the frequency bandwidths of the R, B components have been reduced to half from the original image (and where the frequency bandwidth of the G components has been restored to the original bandwidth). If the frequency bandwidth of the R, B components is reduced, the resolution will also fall.

As shown in FIG. 39C, only the G components have a high resolution and the resolution of the R components and B components are kept low. However, since the resolution of the G components for which the human eye has the greatest sensitivity is maintained, the image as a whole will appear as a high-resolution image. That is, the image is presented as a high-resolution image.

The process that reduces the frequency bandwidth of the R, B components is carried out by the RB target luminance calculating unit 64 (see step S44 in FIG. 38). The present embodiment is characterized by using the arrangement shown in FIG. 36 so that the projected images from the projector apparatuses are projected with different magnification ratios for the G components and the R, B components.

The projected images for the G components are projected with a magnification ratio set so that at a minimum, light is shone onto the entire screen with no gaps. On the other hand, the projected images for the R, B components are projected with a magnification ratio that is greater than the projected images for the G components. By doing so, for the projected images for the R, B components, images from a larger number of adjacent projector apparatuses are superimposed compared to the projected images for the G components. This means that high-resolution light for the G components and light for the R, B components that has a lower resolution than the G components but is produced by mixing light from a larger number of projector apparatuses are observed at an arbitrary point on the screen. Normally, when the projected images for all of the RGB components are magnified and the projected images of adjacent projector apparatuses are superimposed, it is not possible to maintain a high resolution. For this reason, by maintaining the G components for which the human eye has the greatest sensitivity to resolution and superimposing only the light for the R, B components, it is possible to reduce fluctuations in the characteristics between a plurality of projector apparatuses for only the R, B components.

The image projecting system 80 according to the third embodiment described above is characterized by separately including projector apparatuses that output only projected light for G components and projector apparatuses that output only projected light for R, B components. The projector apparatuses that output only projected light for R, B components project light based on image signals where the frequency bandwidths of the R, B components have been reduced from the original image. For this reason, all of the projector apparatuses do not need to have the same quality. Even if the luminance performance of projector apparatuses that project the images for the R, B components is inferior to the projector apparatuses that project images for the G components for example, it will be possible to supplement the luminance using a plurality of projector apparatuses, resulting in the effect that high luminance projected images can be obtained.

Generally, inside a typical projector apparatus (in the case of an LCD projector), optical elements (dichroic prisms, dichroic filters, and the like) that split light from a high-luminance lamp into RGB components are included. However, such optical elements are not necessary in projector apparatuses that project light for the G components, for example. Therefore, a corresponding simplification can be made in the construction of such projector apparatuses, and the cost thereof is suppressed. Although fluctuations in the characteristics of the G components are not suppressed, there is also an effect whereby fluctuations in the characteristics of R and B components are reduced by superimposing projected images.

Next, a fourth embodiment of the present invention will be described with reference to FIGS. 40 to 42. The present embodiment will also be described by way of an example of an image projecting system 90 that is capable of displaying high-definition images on a screen by superimposing images projected using a plurality of projector apparatuses. The present embodiment is characterized by dividing the projected light of the projector apparatuses into R, B components and G components, magnifying the projected light of the R, B components and projecting the projected light of the G components onto the screen without magnification.

FIG. 40 shows an example construction for a case where the projected light from one projector apparatus is divided into G components and B, R components and only the projected light for the B, R components is magnified. The projector apparatus 1-1 includes a dichroic prism 91-1 as an element that transmits the light of the G components and reflects the projected light of the B, R components by 90°, a mirror 92-1 that reflects the projected light of the B, R components, and a magnifying optical unit 93-1 that magnifies and projects the projected light for the B, R components (i.e., the B image and the R image) reflected by the mirror 92-1. The dichroic prism 91-1, the mirror 92-1, and the magnifying optical unit 93-1 construct a magnifying optical system 95-1. Due to the dichroic prism 91-1, the projected light of the projector apparatus is split into projected light for G components and projected light for the B, R components. The projected light for the G components is projected onto the screen 2 without magnification. On the other hand, the projected light for the B, R components is inputted via the mirror 92-1 into the magnifying optical unit 93-1 and is magnified and projected onto the screen 2. The magnifying optical unit 93-1 is an optical system including a Fresnel lens or the like.

FIG. 41 shows an example construction of the image projecting system 90 constructed of a plurality of projector apparatuses. The control apparatus 15 supplies image signals to N projector apparatuses 1-1 to 1-N that have the same projection performance.

However, the image projecting system 90 is characterized in that the projector apparatuses 1-1 to 1-N respectively include magnifying optical systems 95-1 to 95-N. Note that in this fourth embodiment, detailed description of parts that are the same as in the image projecting system 10 according to the first embodiment described above is omitted.

The image projecting system 90 according to the present embodiment includes N projector apparatuses, the screen 2 that is a display screen for projected images, the observation unit 4 that observes the images projected onto the screen 2, and the control apparatus 15 that receives information observed by the observation unit 4 and supplies image signals to the respective projector apparatuses. The projected light of the projector apparatuses 1-1 to 1-N is projected onto the screen via the magnifying optical systems 95-1 to 95-N. For this reason, the image projected onto the screen 2 is produced by superimposing images composed of projected light for the G components and images composed of projected light for the R, B components.

FIGS. 42A to 42C show examples of input images and presented projected images for the R, G, and B components, respectively.

FIG. 42A shows examples of input images for the R, G, B components.

The projector apparatus 1-1 receives an input image 96-1 for the G components, an input image 96-2 for the B components, and an input image 96-3 for the R components.

FIG. 42B shows examples of projected images produced by one projector apparatus.

When the input image 96-1 for the G components, the input image 96-2 for the B components, and the input image 96-3 for the R components are inputted into the projector apparatus 1-1, a projected image 97-1 for the G components, a projected image 97-2 for the B components, and a projected image 97-3 for the R components are projected onto the screen 2. The projected image 97-2 for the B components and the projected image 97-3 for the B components are the same size and are projected so as to be superimposed at the same position. The projected images for the R, B components are incident on a wider region than the projected image for the G components.

FIG. 42C shows examples of projected images produced by a plurality of projector apparatuses.

The projected images of the projector apparatuses 1-1 to 1-3 are presented by being superimposed on the screen 2.

The number of pixels in the images inputted into the R, G, B components of each projector apparatus are all the same. However, the input images of the R, B components differ to the input image for the G components. In the present embodiment, the input images for the R, B components are images for a wider region than the input image for the G components.

For example, even if the user views the input images for the R, G, B components themselves on a monitor connected to a computer apparatus, it will not be possible to see what is depicted in the images. However, when such images are projected on the screen 2 using the image projecting system 90 according to the present embodiment, it will be possible to see what is depicted in the images. In this way, by magnifying the projected images for the R, B components and superimposing the projected images with projected images of adjacent projector apparatuses, there is an effect that it is possible to reduce the fluctuations in characteristics between projector apparatuses.

Here, examples of the input images and the presented projected images for each of the R, G, B components described with reference to FIGS. 42A to 42C will now be described in detail with reference to FIGS. 43A to 44F.

Figure 43A:
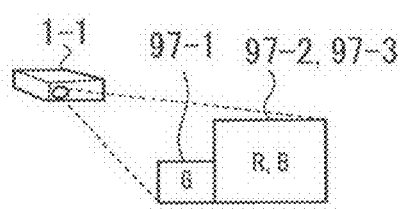

FIGS. 43A to 4G show examples of projected images presented on the screen.

FIG. 43A shows an example of a projected image of one projector apparatus. The projected pattern of the images shown in FIG. 43A is the same as the projected pattern of the images described with reference to FIG. 42A.

Figure 43B:
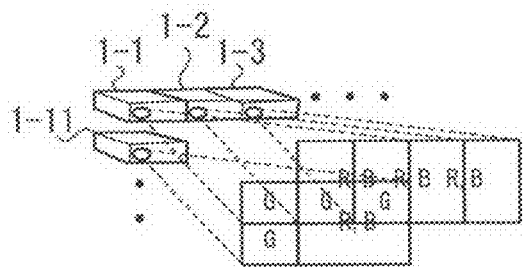

FIG. 43B shows an example of a projected image of a plurality of projector apparatuses.

Here, the plurality of projector apparatuses are laid out so that the projected images for the G components are aligned with no gaps in between.

Figure 43C:
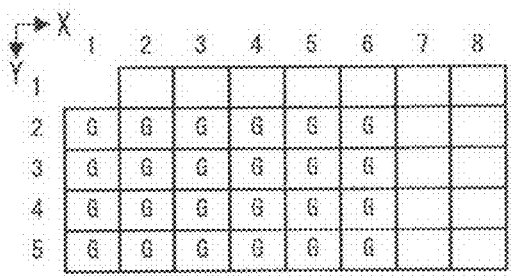

FIG. 43C shows an example where six projector apparatuses are disposed horizontally (in the X direction) and four projector apparatuses are disposed vertically (in the Y direction). When doing so, a total of twenty-four projector apparatuses are used.

Figure 43D:
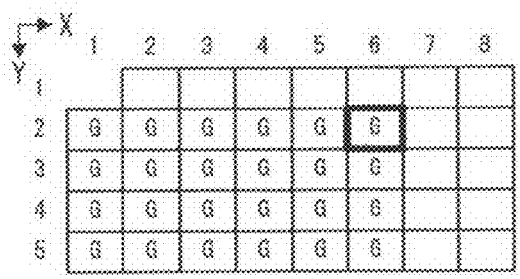

FIG. 43D shows an example where the projector apparatus positioned at (X,Y)=(6,2) is highlighted.

Figure 43E:
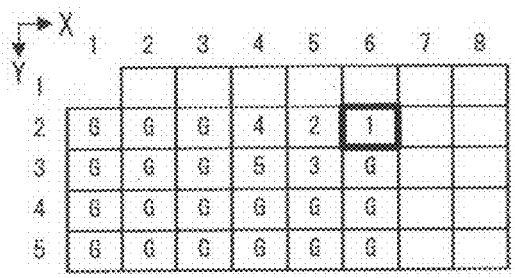

FIG. 43E shows an example of the relationship between the projector apparatus that presents the projected image for the G components at (X,Y)=(6,2) and the other projector apparatuses.

For ease of explanation, the position (X,Y)=(6,2) is assigned the number "1". At number "1", the projected image for the G components of one projector apparatus is presented.

In the same way, the number "2" is assigned to the projector apparatus that presents the projected image for the G components at (X,Y)=(5,2). The number "3" is assigned to the projector apparatus that presents the projected image at (X,Y)= (5,3). The number "4" is assigned to the projector apparatus that presents the projected image at (X,Y)=(4, 2) The number "5" is assigned to the projector apparatus that presents the projected image at (X,Y)=(4,3).

For example, when a projected image for the G components is presented at number 5, the projected images for the R, B components are presented in the regions (X,Y)=(5,2), (5,3), (6,2), (6,3). Projected images for the R, B components relative to the other projected images of the G components are also displayed with the same pattern. This means that in the presentation region indicated by the number "1", projected images for the R, B components that are simultaneously outputted by the projector apparatuses that present the projected images for the G components in numbers 2 to 5 will be presented.

Figure 43F:
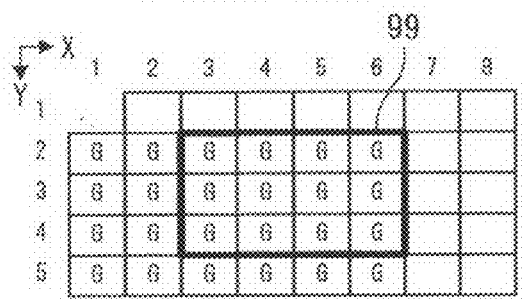

FIG. 43F shows an example of another image presentation region.

It is shown that the projected images for the G components presented by the other projector apparatuses are in a range of 1≦X≦6 and 2≦Y≦5.

Figure 43G:
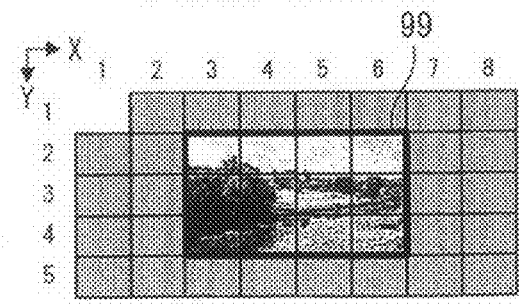

FIG. 43G shows an example of the effective image presentation region.

Out of the projected images presented on the screen 2, the effective image presentation region that can bee seen by the user is the range where 3≦X≦6 and 2≦Y≦4. When the projected images for the G components are presented in this range, the user can see a high-definition projected image 99.

FIGS. 44A to 44F show the relationship between the images that are inputted into the respective projector apparatuses and the projected images.

In the present embodiment, the case of projected images presented by twenty-four projector apparatuses (arranged in four horizontal rows and six vertical columns) will be described.

Figure 44A:

FIG. 44A shows one example of an original image inputted into the projector apparatuses.

However, the image inputted into one projector apparatus is an image produced by dividing the original image 98 into predetermined regions. By joining a plurality of projected images projected by a plurality of projector apparatuses, the original image 98 is presented on the screen. Here, for convenience, the numbers 1 to 24 are assigned to show the positions of the respective projector apparatuses.

FIG. 44B shows examples of G, B, R component images for the original image 98.

By inputting a G component image 98g, an R component image 98r, and a B component image 98b into the projector apparatuses and projecting the images so as to be superimposed on the screen, the user can see the image.

Figure 44C:

FIG. 44C shows examples of projector apparatus that display the G component image.

It is shown that the G component image 98g of the original image 98 is presented using the projected images presented by the projector apparatuses assigned with the numbers 3 to 6, 9 to 12, and 15 to 18.

Also, to the projector apparatuses projecting images in the region where the G component image 98g is not projected, the G component image is not inputted.

FIG. 44D shows examples of images produced by reducing the R component image 98r and the B component image 98b.

Here, the R component image 98r' produced by reducing the R component image 98r by half in the vertical and horizontal directions and the B component image 98b' produced by reducing the B component image 98b by half in the vertical and horizontal directions are generated.

FIG. 44E shows examples of projector apparatuses that present the reduced R component image 98r'. The following explanation also applies to the examples of projector apparatuses that present the reduced C component image 98b'.

The positions of the projector apparatuses that present the R component image 98r' are shown by the thick frames. For example, the images projected by the projector apparatuses with the numbers 7, 9, 11, 19, 21, and 23 are images obtained by sampling the R component image 98r'. That is, out of the sampled images 94a, the image where (X,Y)=(1,1) is projected by the projector apparatus assigned with the number 7. In the same way, the image where (X,Y)=(2,1) is projected by the projector apparatus assigned with the number 9. The image where (X,Y)=(3,1) is projected by the projector apparatus assigned with the number 11. The image where (X,Y)= (1,2) is projected by the projector apparatus assigned the number 19. The image where (X,Y)=(2,2) is projected by the projector apparatus assigned with the number 21. The image where (X,Y)=(3,2) is projected by the projector apparatus assigned with the number 23.

The same also applies to the sampling images 94b to 94d.

Figure 44F:
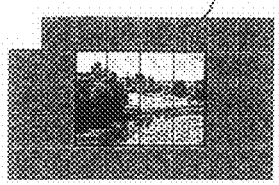

FIG. 44F shows an example of a projected image 99 in the effective image presentation region.

In this way, the projected image 99 is presented by superimposing the projected images of the twenty-four projector apparatuses. This projected image 99 is visible to the user. However, images are not present at the edge portions of the projected image 99.

The image projecting system 90 according to the fourth embodiment described above is characterized by splitting an image composed of projected light for the G components and an image composed of projected light for the B, R components using the BR magnifying optical systems provided in the projector apparatuses and projecting the resulting light onto the screen 2. For this reason, if the superimposed images include at least one image projected by a high-performance projector apparatus, it will be possible to present a high-luminance and high-resolution image on the screen 2. Also, even when one or more out of a plurality of projector apparatuses has inferior luminance performance, for example, it will still be possible to supplement the luminance using a plurality of projector apparatuses, resulting in the effect that a high luminance projected image can be obtained.

The image projecting systems according to the first to fourth embodiments described above are characterized by being constructed so that projected light of different projector apparatuses is superimposed at every part of the image on the screen 2. When doing so, an image with uniform luminance is obtained. Compared to existing technology, it is possible to provide a high-quality image on a large screen. Even if one or more projector apparatuses breaks down or stops during the presentation of images, there is a reduced risk of a part of the presented image becoming blank (i.e., no image being outputted in such part). By using the image projecting system 10 according to the embodiment described above, the vulnerability of an image projecting system to breakdown of a projector apparatus which was a problem in the past is solved. For example, even when one projector apparatus breaks down or stops, some information, even if it is incomplete (such as an image with reduced luminance), will be presented on the screen 2. This is because each pixel is composed of light projected by a plurality of projector apparatuses. This means that the problem of nothing being presented in a region where light was projected by a projector apparatus that has broken down is avoided. As a result, there is the effect that images can be continuously presented.

Also, although an image projecting system where light is shone onto the entire screen to supplement luminance has been known from the past, in such system, the output of a light source lamp of an apparatus that shines light onto a screen needs to be increased as the size of the screen increases. When a light source lamp with a large output is used, there is not only an increase in power consumption but the operating life of the light source lamp itself also tends to decrease. There is also no way to increase the resolution. However, with the image projecting system according to the first to fourth embodiments described above, the layout of the projector apparatuses is adjusted so that the width of an image projected by each of adjacent projector apparatuses is equal to an integer multiple of the distance between the adjacent projector apparatuses. The luminance of the image projected onto the screen is supplemented by having a plurality of adjacent projector apparatuses project images onto the screen. Also, by freely changing the luminance correction coefficients, it is possible to freely change the allocations of luminance of the respective projector apparatuses to achieve the target luminance. This means that the output of the light source lamp may be the same for every projector apparatus. Even when the output of the light source lamps have been lowered, since the luminance can be supplemented using a plurality of projector apparatuses, there is an effect that it is possible to increase the operating life of the light source lamps.

Also, since it is possible to project a high-definition image with little fluctuations in luminance onto a large screen, it is possible for a number of people to view the same image (for example, an image showing the structure of DNA). Also, one group of projector apparatuses (for example, four projector apparatuses) can be laid out in a repeating pattern. Therefore, there are no limits on the size or shape of the screen (i.e., the screen does not need to be rectangular), so that it is possible to apply an embodiment of the present invention to applications such as projecting images in a home theatre or commercially. Further, by superimposing a plurality of projected images, it is possible to present large-screen, natural-looking images on the entire screen 2 without visible joins between adjacent projected images.

Note that although examples where the projector apparatuses are laid out in a grid has been described for ease of understanding in the first to fourth embodiments described above, the projector apparatuses do not need to be laid out in a grid. That is, it is possible to apply an embodiment of the present invention even when projector apparatuses are not aligned in a grid. However, it will not be possible to accurately change the positions of the projected images by merely changing the orientations of the lenses. In this case, it is possible to change the positions of the projected images by having the images reflected once by mirrors and adjusting the orientations of the mirrors. In the second and third embodiments described above also, it is possible to change the positions of the projected images by providing mirrors. In this way, there are no limitations on the layout of the projector apparatuses for the image projecting system according to an embodiment of the present invention.

Note that the series of processes by the first to fourth embodiments described above can be carried out by hardware and can also be carried out by software. When the series of processes is carried out by software, a program that constructs such software is installed into a computer in which dedicated hardware is incorporated or a program that constructs the desired software is installed into a general-purpose personal computer, for example, that is capable of various types of functions when various types of program are installed and then executed.

The present invention may also be accomplished by supplying a system or an apparatus with a recording medium in which a program code of software which realizes the functions of the above described embodiments is recorded, and causing a computer (or a control apparatus such as a CPU) of the system or apparatus to read out and execute the program code stored in the recording medium.

As examples of the recording medium for supplying the program code, it is possible to use a floppy disk, a hard disk, an optical disk, a magneto-optical disk, a CD-ROM, a CD-R, a magnetic tape, a nonvolatile memory card, or a ROM.

Further, the functions of the above described embodiments may be accomplished not only by executing program code read out by a computer, but also by causing an OS (operating system) or the like which operates on the computer to perform a part or all of the actual processing based on instructions of the program code.

An embodiment of The present invention includes both processing where the steps in a program that construct such software are carried out as a time series in the order given in this specification and processing where such steps are not necessarily carried out as a time series and are carried out separately or in parallel.

Note that the present invention is not limited to the embodiments of the invention described above and a variety of constructions can be used without departing from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image projecting system comprising:
   a plurality of projector apparatuses that project images based on inputted image signals onto a screen so that the images are displaced relative to one another by a predetermined amount and superimposed;
   an observation apparatus that observes luminance of an image region composed of a plurality of projected images that have been projected onto the screen; and
   a control apparatus that supplies to the plurality of projector apparatuses the image signals in which a luminance value of each pixel that constructs an image to be projected by each projector apparatus has been adjusted based on an observation result of the observation apparatus,
   wherein the image region composed of the plurality of projected images is presented by superimposing a first projected image and a second projected image that has a higher resolution than the first projected image, the first projected image being based on minimum pixel values for the image region, and the second projected image being based on pixel values that represent differences from the minimum pixel values,
   wherein predetermined pixels in the image region are presented by superimposing corresponding pixels in the projected images from n adjacent projector apparatuses (where n is an integer of two or higher),
   wherein the plurality of projector apparatuses are arranged such that a width of a respective image projected by each of respective adjacent projector apparatus is equal to a multiple (x) of a distance between the adjacent projector apparatus, in which x is an integer of two or higher,
   wherein the image region composed of the plurality of projected images is formed of images projected by respective ones of four or more of the projector apparatuses, and wherein each of the images projected by the respective ones of the four or more of the projector apparatuses comprises a high-resolution image and a low-resolution image.

2. The image projecting system according to claim 1, wherein the observation apparatus includes:
   a projected position observation unit that observes a projected position of a pixel that constructs the image region on the screen;
   a position information calculating unit that calculates, as position information, a position of each pixel that constructs the projected image for each projector apparatus from the projected position of each pixel in the image region observed by the projected image observation unit;
   a luminance observation unit that observes the luminance of the image region on the screen;
   a luminance information calculating unit that calculates, as luminance information, a luminance of each pixel in the image region on the screen, from the luminance of the image region observed by the luminance observation unit and the position information;
   a block dividing unit that divides an image region based on an inputted image signal of the first projected image into predetermined regions;
   a minimum value luminance calculating unit that calculates, based on the position information, a luminance of a minimum value out of the image region divided by the block dividing unit, as minimum value luminance information;
   a difference value luminance calculating unit that calculates, based on the position information, a difference between a luminance in the image region divided by the block dividing unit and a luminance based on the minimum value luminance information, as difference value luminance information;
   a luminance correction coefficient calculating unit that determines, as luminance correction coefficients, allocations of luminance for projected images of respective projector apparatuses, based on the minimum value luminance information and the difference value luminance information of the image region;
   a pixel value calculating unit that determines a target projected luminance for a projected image of each projector apparatus based on the luminance correction coefficients calculated by the luminance correction coefficient calculating unit, the minimum value luminance information, and the difference value luminance information, and calculates a pixel value of each pixel in the image to be projected by each projector apparatus based on the determined target projected luminance, the position information, the minimum value luminance information, and the difference value luminance information; and
   a signal supplying unit that generates image signals based on the pixel values calculated by the pixel value calculating unit and supplies the image signals to the projector apparatuses.

3. The image projecting system according to claim 2, wherein each projector apparatus includes an image magnifying unit so as to provide different image magnification ratios for a predetermined region and another region out of the image to be projected onto a corresponding region of the screen.

4. The image projecting system according to claim 2, wherein the plurality of projector apparatuses comprises m projector apparatuses, and wherein the control unit supplies image signals determined based on the difference value luminance information to k projector apparatuses (where k is an integer of 1 or higher) out of the m projector apparatuses and supplies image signals determined based on the minimum value luminance information to (m−k) projector apparatuses that differ from the k projector apparatuses.

5. The image projecting system according to claim 1, wherein the observation apparatus includes:
   a projected position observation unit that observes a projected position of a pixel that constructs the image region on the screen;

a position information calculating unit that calculates, as position information, a position of each pixel that constructs the projected image for each projector apparatus from the projected position of each pixel in the image region observed by the projected image observation unit;

a luminance observation unit that observes the luminance of the image region on the screen;

a luminance information calculating unit that calculates, as luminance information, a luminance of each pixel in the image region on the screen, from the luminance of the image region observed by the luminance observation unit and the position information;

a block dividing unit that divides an image region based on the inputted image signal of the first projected image and composed of an R image, a G image, and a B image into predetermined regions;

an RB luminance calculating unit that calculates, based on the position information, luminances of the R image and the B image out of the image region divided by the block dividing unit, as RB luminance information;

a G luminance calculating unit that calculates, based on the position information, luminance of the G image out of the image region divided by the block dividing unit, as G luminance information;

a luminance correction coefficient calculating unit that determines, as luminance correction coefficients, allocations of luminance for projected images of respective projector apparatuses, based on the RB luminance information and the G luminance information of the image region;

a pixel value calculating unit that determines a target projected luminance for a projected image of each projector apparatus based on the luminance correction coefficients calculated by the luminance correction coefficient calculating unit, the RB luminance information, and the G luminance information, and calculates a pixel value of each pixel in the image to be projected by each projector apparatus based on the determined target projected luminance, the position information, and the luminance information; and a signal supplying unit that generates image signals based on the pixel values calculated by the pixel value calculating unit and supplies the image signals to the projector apparatuses.

6. The image projecting system according to claim 5, wherein an image signal determined based on the RB luminance information has a reduced frequency bandwidth compared to the image based on the inputted image signal.

7. The image projecting system according to claim 6, wherein the plurality of projector apparatuses comprises m projector apparatuses, and
wherein the control unit supplies image signals determined based on the RB luminance information to k projector apparatuses (where k is an integer of 1 or higher) out of the m projector apparatuses and supplies image signals determined based on the G luminance information to (m−k) projector apparatuses that differ from the k projector apparatuses.

8. The image projecting system according to claim 6, wherein at least one of the projector apparatuses includes an image magnifying unit that magnifies and projects the R image and the B image that have been separated from the image to be projected onto the screen.

9. An image projecting method comprising steps of:
projecting images based on inputted image signals onto a screen using a plurality of projector apparatuses so that the images are displaced relative to one another by a predetermined amount and superimposed;
observing luminance of an image region composed of a plurality of projected images that have been projected onto the screen;
supplying image signals in which luminance values of pixels that construct an image projected by each projector apparatus have been adjusted based on a result of observing the luminance, to the plurality of projector apparatuses; and
presenting the image region composed of the plurality of projected images by superimposing a first projected image and a second projected image that has a higher resolution than the first projected image, the first projected image being based on minimum pixel values for the image region, and the second projected image being based on pixel values that represent differences from the minimum pixel values,
wherein predetermined pixels in the image region are presented by superimposing corresponding pixels in the projected images from n adjacent projector apparatuses (where n is an integer of two or higher), and
wherein the plurality of projector apparatuses are arranged such that a width of a respective image projected by each of respective adjacent projector apparatus is equal to a multiple (x) of a distance between the adjacent projector apparatus, in which x is an integer of two or higher,
wherein the image region composed of the plurality of projected images is formed of images projected by respective ones of four or more of the projector apparatuses, and wherein each of the images projected by the respective ones of the four or more of the projector apparatuses comprises a high-resolution image and a low-resolution image.

10. A recording medium having stored thereon a computer program comprising computer program instructions which when executed by a computer performs an image projecting method, the method comprising steps of:
projecting images based on inputted image signals onto a screen using a plurality of projector apparatuses so that the images are displaced relative to one another by a predetermined amount and superimposed;
observing luminance of an image region composed of a plurality of projected images that have been projected onto the screen;
supplying image signals in which luminance values of pixels that construct an image projected by each projector apparatus have been adjusted based on a result of observing the luminance, to the plurality of projector apparatuses; and
presenting the image region composed of the plurality of projected images by superimposing a first projected image and a second projected image that has a higher resolution than the first projected image, the first projected image being based on minimum pixel values for the image region, and the second projected image being based on pixel values that represent differences from the minimum pixel values,
wherein predetermined pixels in the image region are presented by superimposing corresponding pixels in the projected images from n adjacent projector apparatuses (where n is an integer of two or higher), and
wherein the plurality of projector apparatuses are arranged such that a width of a respective image projected by each of respective adjacent projector apparatus is equal to a multiple (x) of a distance between the adjacent projector apparatus, in which x is an integer of two or higher, wherein the image region composed of the plurality of projected images is formed of images projected by respective ones of four or more of the projector apparatuses, and wherein each of the images projected by the respective ones of the four or more of the projector apparatuses comprises a high-resolution image and a low-resolution image.

* * * * *